(12) United States Patent
Baghsorkhi et al.

(10) Patent No.: US 11,520,331 B2
(45) Date of Patent: Dec. 6, 2022

(54) METHODS AND APPARATUS TO UPDATE AUTONOMOUS VEHICLE PERSPECTIVES

(71) Applicant: Intel Corporation, Santa Clara, CA (US)

(72) Inventors: Sara Baghsorkhi, Los Gatos, CA (US); Justin Gottschlich, Santa Clara, CA (US); Alexander Heinecke, San Jose, CA (US); Mohammad Mejbah Ul Alam, Milpitas, CA (US); Shengtian Zhou, Palo Alto, CA (US); Sridhar Sharma, Palo Alto, CA (US); Patrick Andrew Mead, Portland, OR (US); Ignacio Alvarez, Portland, OR (US); David Gonzalez Aguirre, Hillsboro, OR (US); Kathiravetpillai Sivanesan, Portland, OR (US); Jeffrey Ota, Morgan Hill, CA (US); Jason Martin, Beaverton, OR (US); Liuyang Lily Yang, Portland, OR (US)

(73) Assignee: Intel Corporation, Santa Clara, CA (US)

(*) Notice: Subject to any disclaimer, the term of this patent is extended or adjusted under 35 U.S.C. 154(b) by 30 days.

(21) Appl. No.: 16/236,291

(22) Filed: Dec. 28, 2018

(65) Prior Publication Data

US 2019/0138007 A1    May 9, 2019

(51) Int. Cl.
*G05D 1/00*    (2006.01)
*G05D 1/02*    (2020.01)
(Continued)

(52) U.S. Cl.
CPC .......... *G05D 1/0088* (2013.01); *B60W 30/08* (2013.01); *G05D 1/0231* (2013.01);
(Continued)

(58) Field of Classification Search
CPC .................................................. G05D 1/0088
See application file for complete search history.

(56) References Cited

U.S. PATENT DOCUMENTS 8,849,494 B1* 9/2014 Herbach ........... B60W 60/0015
                                                      701/24
9,494,439 B1* 11/2016 Ross .................... G05D 1/0022
(Continued)

OTHER PUBLICATIONS

Xu, Ruifeng, High Dynamic Range Image Display Using a Level Set Framework, Journal of WSCG, vol. 11, No. 1., ISSN 1213-6972, WSCG'2003, Feb. 3-7, 2003, Plzen, Czech Republic. Copyright UNION Agency-Science Pres, (http://wscg.zcu.cz/wscg2003/Papers_2003/B37.pdf) (2003)(hereinafter "Xu").*

(Continued)

*Primary Examiner* — Jean Paul Cass
(74) *Attorney, Agent, or Firm* — Hanley, Flight & Zimmerman, LLC

(57) ABSTRACT

Methods, apparatus, systems and articles of manufacture are disclosed that provide an apparatus to analyze vehicle perspectives, the apparatus comprising a profile generator to generate a first profile of an environment based on a profile template and first data generated by a first vehicle; a data analyzer to: determine a difference between the first profile and a second profile obtained from a first one of one or more nodes in the environment; and in response to a trigger event, update the first profile based on the difference; and a vehicle control system to: in response to the trigger event, update a first perspective of the environment based on one or more of second data from the first one of the one or more nodes or the updated first profile; update a path plan for the first vehicle based on the updated first perspective; and execute the updated path plan.

24 Claims, 16 Drawing Sheets

(51) Int. Cl.
  *G08G 1/16* (2006.01)
  *B60W 30/08* (2012.01)
(52) U.S. Cl.
  CPC .............. *G05D 1/0278* (2013.01); *G08G 1/16* (2013.01); *G05D 2201/0213* (2013.01)

(56) References Cited

U.S. PATENT DOCUMENTS

| | | | |
|---|---|---|---|
| 9,632,502 B1* | 4/2017 | Levinson | G01S 17/87 |
| 9,697,606 B2* | 7/2017 | Stout | G06T 7/521 |
| 9,751,476 B2* | 9/2017 | Kraft | G06F 13/409 |
| 9,983,590 B2* | 5/2018 | Templeton | G05D 1/0231 |
| 10,108,850 B1* | 10/2018 | Das | G06K 9/00885 |
| 10,345,437 B1* | 7/2019 | Russell | G01S 7/497 |
| 10,452,068 B2* | 10/2019 | Djuric | G06N 3/04 |
| 10,474,162 B2* | 11/2019 | Browning | G06T 7/70 |
| 10,600,322 B2* | 3/2020 | Hosokawa | G06F 16/489 |
| 10,620,011 B2* | 4/2020 | Cheaz | G06Q 10/083 |
| 10,627,825 B2* | 4/2020 | Gutmann | B60W 30/08 |
| 10,640,111 B1* | 5/2020 | Gutmann | B60W 30/143 |
| 10,662,696 B2* | 5/2020 | Bradley | G06Q 10/08 |
| 10,678,240 B2* | 6/2020 | Pollach | G06N 20/00 |
| 10,679,312 B2* | 6/2020 | Matthiesen | G06Q 10/06315 |
| 10,684,361 B2* | 6/2020 | Valois | G05D 1/021 |
| 10,694,331 B1* | 6/2020 | Brooks Powell | H04W 4/023 |
| 10,710,633 B2* | 7/2020 | Carlson | G05D 1/0234 |
| 10,712,160 B2* | 7/2020 | Rander | B60W 30/18172 |
| 10,712,742 B2* | 7/2020 | Valois | G01S 13/931 |
| 10,712,750 B2* | 7/2020 | Kentley-Klay | G07C 5/00 |
| RE48,322 E * | 11/2020 | Fairfield | G05D 1/0214 |
| 2003/0076414 A1* | 4/2003 | Sato | G01S 11/12 348/148 |
| 2012/0173594 A1* | 7/2012 | Jogand-Coulomb | G06F 3/064 707/812 |
| 2013/0188012 A1* | 7/2013 | Bellis | H04N 5/2251 348/42 |
| 2014/0082238 A1* | 3/2014 | Ahmad | G06F 13/42 710/110 |
| 2017/0300059 A1* | 10/2017 | Rust | G01S 7/003 |
| 2017/0344023 A1* | 11/2017 | Laubinger | B60W 50/14 |
| 2018/0284802 A1* | 10/2018 | Tsai | G06K 9/00664 |
| 2018/0285734 A1* | 10/2018 | Chen | G06N 3/0454 |
| 2018/0286072 A1* | 10/2018 | Tsai | G06K 9/4604 |
| 2018/0293102 A1* | 10/2018 | Ray | G06T 1/20 |
| 2018/0293490 A1* | 10/2018 | Ma | G06N 3/0445 |
| 2018/0293491 A1* | 10/2018 | Ma | G06N 3/08 |
| 2018/0293691 A1* | 10/2018 | Nurvitadhi | G06F 9/4881 |
| 2018/0308201 A1* | 10/2018 | Appu | G09G 5/363 |
| 2018/0308203 A1* | 10/2018 | Appu | G06F 9/544 |
| 2018/0308206 A1* | 10/2018 | Surti | G09G 5/363 |
| 2018/0308256 A1* | 10/2018 | Appu | G06N 3/063 |
| 2018/0314250 A1* | 11/2018 | Lewis | B60W 30/095 |
| 2018/0314521 A1* | 11/2018 | Chen | G06N 3/063 |
| 2018/0335777 A1* | 11/2018 | Gibbs | G05D 1/0297 |
| 2018/0349715 A1* | 12/2018 | Gupta | G08G 1/0141 |
| 2019/0047579 A1* | 2/2019 | Fahim | B60W 50/0098 |
| 2019/0120946 A1* | 4/2019 | Wheeler | G01S 17/89 |
| 2019/0138007 A1* | 5/2019 | Baghsorkhi | G05D 1/0278 |
| 2019/0156507 A1* | 5/2019 | Zeng | G06T 7/70 |
| 2019/0205745 A1* | 7/2019 | Sridharan | G06F 9/5061 |
| 2019/0266779 A1* | 8/2019 | Kulkarni | G06T 11/001 |
| 2019/0311209 A1* | 10/2019 | Ducote | G06K 9/3233 |
| 2019/0354815 A1* | 11/2019 | Yun | G06N 3/082 |
| 2019/0362452 A1* | 11/2019 | Brunets | G06F 16/122 |
| 2019/0363430 A1* | 11/2019 | Wang | H01Q 21/24 |
| 2019/0366989 A1* | 12/2019 | James | B60T 7/20 |
| 2019/0371044 A1* | 12/2019 | Yu | G06T 7/38 |
| 2019/0377349 A1* | 12/2019 | van der Merwe | G06Q 50/28 |
| 2019/0381860 A1* | 12/2019 | Credo | B60H 1/00785 |
| 2019/0382007 A1* | 12/2019 | Casas | G06K 9/00335 |
| 2020/0012531 A1* | 1/2020 | Li | G06F 9/546 |
| 2020/0019799 A1* | 1/2020 | Shen | G06K 9/00825 |
| 2020/0026925 A1* | 1/2020 | Yu | G06K 9/3208 |
| 2020/0027229 A1* | 1/2020 | Shen | G06K 9/6211 |
| 2020/0074729 A1* | 3/2020 | Yan | G06T 19/20 |
| 2020/0109954 A1* | 4/2020 | Li | G01C 21/32 |
| 2020/0132477 A1* | 4/2020 | Averilla | G06T 19/00 |
| 2020/0135014 A1* | 4/2020 | De La Guardia Gonzalez | G08G 1/0145 |
| 2020/0142032 A1* | 5/2020 | Chen | G01S 7/4802 |
| 2020/0158875 A1* | 5/2020 | Feng | G01S 17/93 |
| 2020/0189608 A1* | 6/2020 | Braley | G05D 1/0061 |
| 2020/0193195 A1* | 6/2020 | Doria | G06K 9/00798 |
| 2020/0209856 A1* | 7/2020 | Huang | H04L 12/40195 |
| 2020/0210721 A1* | 7/2020 | Goel | G06K 9/3233 |
| 2020/0211265 A1* | 7/2020 | Brownlee | G06T 15/06 |
| 2021/0006332 A1* | 1/2021 | Pandit | H04B 10/11 |
| 2021/0150799 A1* | 5/2021 | Yang | G06T 9/002 |
| 2021/0197852 A1* | 7/2021 | Fairfield | B60W 60/001 |

OTHER PUBLICATIONS

Google Machine Translation of Chinese Patent Application Pub. No. CN104992467B to Shen that was filed in 2015 and published on Oct. 21, 2015 (hereinafter "Shen").*
Wang, A Point Cloud-Based Robust Road Curb Detection and Tracking Method—IEEE Journals & Magazine (2019).*
Qiu, Hang et al., "AVR: Augmented Vehicular Reality", MobiSys '18, Jun. 10-15, 2018, Munich, Germany, 15 pages.
Tatarchenko, Maxim et al., "Tangent Convolutions for Dense Prediction in 3D", Proceedings of the IEEE Conference on Computer Vision and Pattern Recognition, Jun. 6, 2018, 13 pages.
Su, Hang et al., "SPLATNet: Sparse Lattice Networks for Point Cloud Processing", Lattice Networks for Point Cloud Processing, Proceedings of the IEEE Conference on Computer Vision and Pattern Recognition, 2018, 10 pages.
Hartley, Richard et al., "Multiple View Geometry in Computer Vision", Second Edition, 2004, published by Cambridge University Press, New York, 673 pages.
Rangesh, Akshay et al.,"No Blind Spots: Full-Surround Multi-Object Tracking for Autonomous Vehicles using Cameras & LiDARs", Sep. 10, 2018, retrieved from https://arxiv.org/abs/1802.08755, 12 pages.
Moore, Samuel, K., "Superaccurate GPS Chips Coming to Smartphones in 2018", Spectrum-IEEE, Sep. 21, 2017, retrieved from https://spectrum.ieee.org/tech-talk/semiconductors/design/superaccurate-gps-chips-coming-to-smartphones-in-2018, accessed on Jan. 8, 2019, 3 pages.
Hedgecock, Will, et al., "Accurate Real-Time Relative Localization Using Single-Frequency GPS", 2014, Institute for Software Integrated Systems, Vanderbilt University, Nashville, TN, 15 pages.
Forsyth, D. A., et al., "Computer Vision: A Modern Approach", 2002, Prentice Hall Professional Technical Reference, 328 pages (uploaded in two parts).
Kato, Shinpei et al., "An Open Approach to Autonomous Vehicles", 2015, published by the IEEE Computer Society, 9 pages.
Kato, Shinpei et al., "Autoware on Board: Enabling Autonomous Vehicles with Embedded Systems", 2018, 2018 9th ACM/IEEE International Conference on Cyber-Physical Systems, 10 pages.
Kumar, Vijay, "Rigid Body Transformations", University of Pennsylvania, Jul. 30, 2010, 16 pages.
IEEE Standards Association, "IEEE Standard for Wireless Access in Vehicular Environments—Security Services for Applications and Management Messages", 2017, 123 pages.
Kurihara, T.M. et al. "IEEE 1609.2™-2016, Standard for Wireless Access in Vehicular Environments—Security Services for Applications and Management Messages", Jul. 5, 2016, Tokyo, Japan, 20 pages.
Petit, Jonathan, et al. "Pseudonym Schemes in Vehicular Networks: a Survey", IEEE Communication Surveys & Tutorials vol. 17, No. 1, First Quarter 2015, 28 pages.
github.com, "Overview—CPFL/ Autoware Wiki", retrieved from https://github.com/CPFL/Autoware/wiki/Overview, accessed on Nov. 16, 2018, 8 pages.

(56) References Cited

OTHER PUBLICATIONS

"Lavelle, Steven M., 3.2 Rigid-Body Transformations", Apr. 20, 2012, retrieved from http://planning.cs.uiuc.edu/node91.html, 1 page.

* cited by examiner

METHODS AND APPARATUS TO UPDATE AUTONOMOUS VEHICLE PERSPECTIVES

FIELD OF THE DISCLOSURE

This disclosure relates generally to autonomous vehicles, and, more particularly, to methods and apparatus to update autonomous vehicle perspectives.

BACKGROUND

In recent years, autonomous vehicles have become popular in the automotive industry. Autonomous vehicles, such as autonomous automotive vehicles, can be used to streamline transportation of people and goods to desired locations. Autonomous automotive vehicles include sensors (e.g., a Global Positioning System (GPS) sensor, a global timer sensor, a Light Detection and Ranging (LIDAR) sensor, cameras, radar sensor, etc.) that generate data on the environment in which the vehicles are operating. Autonomous automotive vehicles include on-board systems that process the data generated by the sensors and generate a perspectives of the environments in which the vehicles are operating. The perspectives of the environments assist the autonomous automotive vehicles in navigating the environments.

BRIEF DESCRIPTION OF THE DRAWINGS

FIG. 6b is a diagram of an example response retrieved by the vehicle control system of FIG. 2 in response to the example request of FIG. 6a.

FIG. 7b is a diagram of an example response retrieved by the vehicle control system of FIG. 2 in response to the example request of FIG. 7a.

The figures are not to scale. In general, the same reference numbers will be used throughout the drawing(s) and accompanying written description to refer to the same or like parts.

DETAILED DESCRIPTION

Figure 1:
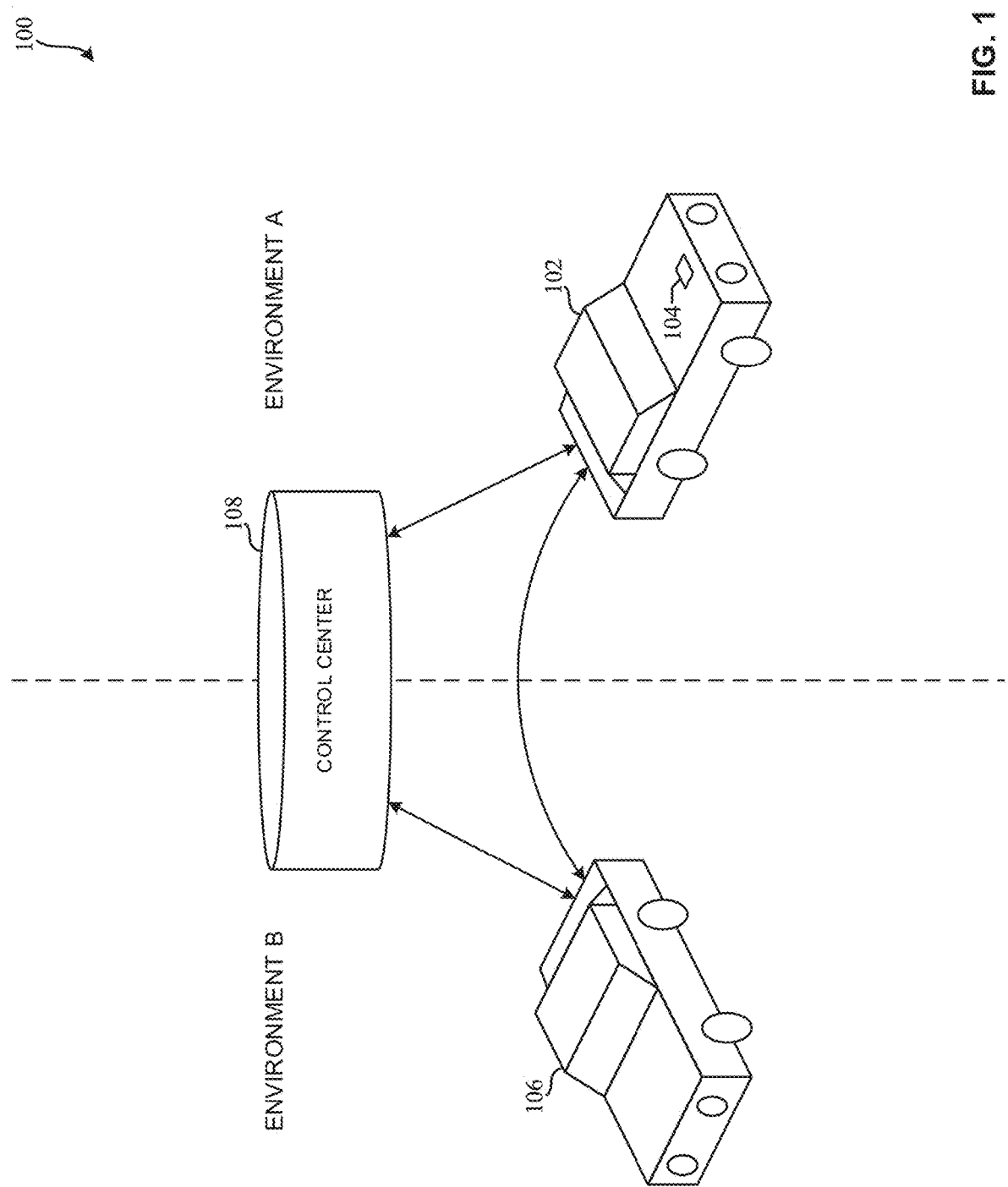
FIG. 1 is a schematic illustration of an example environment in which a first autonomous vehicle communicates with a second vehicle and a control center.

Autonomous vehicles are vehicles that operate at least partially without the assistance of humans. For example, a fully autonomous automotive vehicle navigates from a first destination (e.g., an owner's home) to a second destination (the owner's workplace) without the assistance of human (e.g., the owner driving the vehicle). In other examples, a human assists the autonomous automotive vehicle either completely or in a limited capacity (e.g., the autonomous automotive vehicle maintaining the ability to operate independent of the human). In another example, an autonomous automotive vehicle monitors an environment in which it operates and assists a human operator (e.g., by applying emergency braking) when the human does not correctly operate the autonomous automotive vehicle.

Typical autonomous automotive vehicles operate by using sensors (e.g., one or more of a GPS sensor, a global timer sensor, a LIDAR sensor, a camera, a radar sensor, etc.) that generate data on an environment in which the autonomous automotive vehicle is operating. Such autonomous automotive vehicles have systems on board that process the data generated by the sensors and generate a perspective of the environment. A perspective of the environment corresponds to the viewpoint of the autonomous automotive vehicle such that the perspective is the viewpoint. The perspective is generated from data collected by the various sensors included in the autonomous automotive vehicle. The perspective of the environment assists the autonomous automotive vehicle in navigating the environment.

In these examples, the autonomous automotive vehicle operates in the environment with automotive vehicles that lack the capability for autonomous operation (e.g., legacy automotive vehicles). Legacy automotive vehicles operate with human assistance. For example, some legacy automotive vehicles include cruise control systems, autopilot modes, or other types of partial automation. However, in such an example, the legacy automotive vehicles to utilize human intervention to safely navigate an environment. In other examples, legacy automotive vehicles do not include any type of partial automation and require full human intervention to safely navigate an environment. The autonomous vehicle operates in environments that include nodes such as, for example, other autonomous and non-autonomous vehicles, network access points, pedestrians, roadway infrastructure elements, etc. The nodes in the environment may collect data on the environment using sensors or other data collection methods and may communicate with other nodes in the environment.

Autonomous automotive vehicles, and other nodes in an environment may utilize one or more of Vehicle-to-Vehicle (V2V), Vehicle-to-Infrastructure (V2I), Vehicle-to-Network (V2N), or Vehicle-to-Pedestrian (V2P) communication protocols that allow the autonomous automotive vehicles and other nodes to communicate with other nodes in the environment. Automotive vehicles in the environment that include all or more than the previously mentioned methods of communication are considered to have Vehicle-to-Everything (V2X) communication. V2X communication is characterized as communication between a vehicle and any entity that affects the vehicle. V2X and other internode communication methods utilize Wireless Local Area Network (WLAN) infrastructure or cellular network infrastructure. When communicating between automotive vehicles in the environment, the automotive vehicles utilize V2V communication. To secure the V2V communications among automotive vehicle nodes in an environment, some automotive vehicles utilize pseudonym schemes. A pseudonym is an identifier for an automotive vehicle that can be changed to prevent observers (e.g., other nodes, a malevolent entity, etc.) that receive broadcast communications from an automotive vehicle from tracking the automotive vehicle over time.

A pseudonym may be issued by a pseudonym issuing authority and transmitted/forwarded/issued to at least one vehicle in the environment so that messages between vehicles can be verified (e.g., to avoid false messages/observations from being transmitted through the V2V communication/V2X communication). Accordingly, the pseudonyms assigned to vehicles in the environment are used for communication (e.g., V2V communication/V2X communication) between vehicles in the environment. In particular, the pseudonyms can be authenticated and/or verified between the vehicles. In some examples, the pseudonyms are changed by the recipient vehicles. Additionally or alternatively, the pseudonym can be verified by authorities (e.g., law enforcement authorities). In some examples, the pseudonym is revoked (e.g., to be reused, upon unsuccessful verification, etc.). In some examples, the pseudonym issuing authority verifies the pseudonyms. In other examples, the vehicles in the environment generate their own pseudonyms. In some examples, the pseudonyms and/or messages transmitted throughout the V2V communication/V2X communication are encrypted. In other examples, pseudonyms are assigned to a group of vehicles.

In some examples, a pseudonym is determined/designated first to be sent with a broadcast message. Additionally or alternatively, the V2V/V2X messages are sent without a pseudonym and includes a characteristic-based scheme. As used herein, a pseudonym, or alias, is an alternative identity of vehicles using V2V communication/V2X communication. The identity is assigned across the radio network (e.g., WLAN, cellular network, etc.) as a pseudo-random identifier and is verified by a third party authority as pertaining to a vehicle in the environment. The third-party authority that performs verification does not take into account which vehicle the identifier is attached to, for example.

In some examples, each identifier is bound to a key pair and the public key is certified (e.g., certified by the aforementioned third party authority) as belonging to the identifier and the private key. When a packet (e.g., a BSM or CAM message) is signed using the participant's private key, the packet can be verified by any receiver holding the public key that it comes from a real vehicle. When using identifier certificates in this manner, the transmitter is in control of how much they want to reveal of their identity by how often they change their pseudonym. However, as each pseudonym is to be independently verified and every verification takes time, which can be a non-trivial calculation. Accordingly, in some examples, V2X communication uses the cryptographic certificate scheme defined in IEEE 1609.2. The cryptographic basis can be an elliptical curve asymmetric cryptography and, for the application utilizing V2X communication, can take advantage of some of the capabilities of this branch of mathematics to allow auto generation of new certified identities from a single authorization.

Sensors on the autonomous automotive vehicles typically generate data at a specified frequency (e.g., the sensors generate data at every n time step, 100 megabytes/second (MB/s)). The autonomous automotive vehicles use the data generated by the sensors to generate a perspective of the vehicle. The perspective includes the nodes in the environment and the environment in general. The autonomous vehicle generates the perspective by fusing sensor data together (e.g., the perspective corresponding to a fusion of sensor data). For example, an autonomous vehicle fuses the sensor data together by combining data generated from different sensors to obtain additional information on the environment. For example, an autonomous vehicle may include two cameras and a LIDAR sensor. In such an example, the two cameras together may not accurately determine the distance of objects in the field of view (FOV) of the cameras, so the autonomous vehicle uses the camera data as well as the LIDAR data to determine the distance. Additionally, in the example including the two cameras and the LIDAR sensor, the first camera data from the first camera and the second camera data from the second camera are each offset to the center of the autonomous vehicle by a distance related to the location of the first camera and the second camera on the autonomous vehicle. Additionally, in the example including the two cameras and the LIDAR sensor, the LIDAR data from the LIDAR sensor is offset to the center of the autonomous vehicle by a distance related to the location of the LIDAR sensor on the autonomous vehicle. By offsetting the data generated by the sensors to the center of the autonomous vehicle and combining sensor data to obtain additional information, the autonomous vehicle fuses the sensor data and generates a perspective of the environment. The autonomous vehicle continuously fuses the sensor data and generates an up-to-date perspective of the environment.

An example autonomous vehicle generates perspectives for each n time step that the sensors generate data based on the environment. The autonomous vehicle tracks objects (e.g., other nodes in the environment, wildlife, debris, etc.) in the environment by determining objects in each n time step perspective, identifying the objects, and tracking the location of the object in the environment. The autonomous vehicle also determines an intent of the objects in the environment based on the current location of the object and past locations of the object. Tracking objects allows autonomous vehicles to avoid collisions with the objects and streamline transportation of people or goods between locations.

However, if an autonomous vehicle loses track of an object (e.g., the autonomous vehicle does not have current sensor data related to an object), the autonomous vehicle must rely on prior time step perspectives to track the object. Because autonomous vehicles travel at high speeds (e.g., 25 miles per hour (MPH), 50 MPH, 70 MPH, etc.), the autonomous vehicle generates perspectives at a high frequency (e.g., 100 Hz). Thus, losing track of an object for even a short amount of time can be detrimental to the object tracking and safety of the vehicle. Furthermore, the time it takes to process the raw data obtained from the environment can be extensive and can cause an autonomous vehicle to react abruptly or to not react at all to rapidly changing conditions in the environment. This can cause collisions and/or harm to the owners and or users of autonomous vehicles.

In order to gain information about the environment, an autonomous vehicle may obtain information broadcast by other nodes in the environment. However, in some examples, the amount of information that one autonomous vehicle can send to another autonomous vehicle or other nodes in the environment (e.g., by V2V, V2X, etc.) is limited by the network infrastructure that the communication is sent over. For example, in a 4G network, if a first autonomous vehicle wants to send sensor data to a second autonomous vehicle, the first autonomous vehicle cannot send all of the sensor data to the second autonomous vehicle because the communication between the first autonomous vehicle and the second autonomous vehicle would be too large for the network infrastructure to support. Furthermore, in such an example, even if all the raw sensor data were transmitted, in order to analyze the large amount of data generated by the sensors, a processor in the second autonomous vehicle will require a significant number of processing cycles in order to fuse the data, generate a perspective of the environment, track objects and produce a path plan to transport the autonomous vehicle from one location to another location. The significant number of processing cycles may be disadvantageous because the second autonomous vehicle may have higher priority tasks to accomplish and the overall processing of the second autonomous vehicle may be slowed by processing the large amount of data generated by the first autonomous vehicle. Processing and or otherwise reducing the size of the data (e.g., compression techniques, profiling, state estimates) allows for smaller amounts of information that are broadcast to/from other nodes in the environment. In other examples, the network infrastructure supports sending all the raw sensor data. For example, in a 5G network, the network infrastructure supports larger amounts of information that can be sent over the network. In such an example, it is possible to send the raw sensor data, however, processing and or otherwise reducing the size of the data allows for an autonomous vehicle receiving the information to reduce the number of processing cycles required to analyze the information. Examples disclosed herein provide a framework for communication of raw sensor data, state estimates (e.g., kinematics based on the dynamic motion of objects in an environment), and/or profiles of environments among vehicles. A profile of an environment is a data structure that describes the environment according to predefined data elements selected by a developer. The profile of an environment is smaller in size (e.g., bits) as compared to a perspective of an autonomous vehicle and the profile of the environment may highlight different features of the environment. The profiles of environments allow autonomous vehicles to collaboratively detect anomalous activity in environments. Examples disclosed herein provide an apparatus to analyze vehicle perspectives, the apparatus comprising: a profile generator to generate a first profile of an environment based on a profile template and first data generated by a first vehicle, the first profile characterizing the environment; a data analyzer to: determine a difference between the first profile and a second profile obtained from a first one of one or more nodes in the environment; and in response to a trigger event, update the first profile based on the difference; and a vehicle control system to: in response to the trigger event, update a first perspective of the environment based on one or more of second data from the first one of the one or more nodes or the updated first profile, the first perspective corresponding to a fusion of the first data; update a path plan for the first vehicle based on the updated first perspective; and execute the updated path plan.

FIG. 1 is an example schematic illustration 100 of an example environment A and an example environment B in which a first autonomous vehicle 102 including an example environment analyzer 104 communicates with a second vehicle 106 and an example control center 108.

In the example, the schematic illustration 100 includes the example environment A, the example environment B, and the control center 108. The example environment A includes the example first autonomous vehicle 102. The first autonomous vehicle 102 includes the example environment analyzer 104. The example environment B includes the example second vehicle 106. In some examples, the second vehicle 106 includes the environment analyzer 104.

In the example, the first autonomous vehicle 102 includes one or more sensors that generate first data based on environment A. For example, the first autonomous vehicle 102 includes radar sensors, cameras, LIDAR sensors, GPS sensors, inertial measurement sensors, proximity sensors, sonar sensors, global timer sensors, etc. In the example schematic illustration 100, the environment analyzer 104 fuses the first data and the environment analyzer 104 generates a first perspective of environment A. In the example, environment analyzer 104 generates a first profile of the environment based on the first data. The environment analyzer 104 estimates the state of the environment (e.g., environment A) based on one or more of the first perspective or the first profile.

In the example schematic illustration 100, the second vehicle 106 is a legacy vehicle that supports V2X communication. The second vehicle 106 includes one or more sensors that generates second data based on environment B. In further examples, the second vehicle 106 is a second autonomous vehicle 106 and the second autonomous vehicle 106 fuses the second data and the second autonomous vehicle 106 generates a second perspective of environment B. In additional examples, the second autonomous vehicle 106 generates a second profile of environment B and estimates the state of the environment based on one or more of the sensor data, the second perspective, or the second profile.

In the example, the control center 108 includes profiles and data of one or more environments (e.g., environment A, environment B, etc.). The control center 108 is a cloud based datacenter that stores and analyzes data and profiles from multiple vehicular environments. In some examples, the control center 108 includes a profile of environment A, a profile of environment B, data based on environment A, and data based on environment B. In some examples, environment A is at a first time and environment B is the same as environment A but at a second time. In other examples, environment A is different than environment B. In further examples, environment A is the same as environment B.

In the example schematic illustration 100, the first autonomous vehicle 102 uses sensors to generate the first data from environment A. The environment analyzer 104 generates a first perspective of environment A based on the first data. The environment analyzer 104 utilizes machine vision to generate the first perspective of environment A. For example, the environment analyzer 104 processes data generated by one or more sensors (e.g., cameras, radar, LIDAR) and combines the data to generate a first perspective of environment A. The environment analyzer 104 fuses the first data for each time step of the n time steps. The environment analyzer 104 tracks objects in the perspective between different time steps. Additionally, the environment analyzer 104 estimates a first state of environment A based on tracking the objects in environment A. The environment analyzer 104 prepares a path plan based on the first perspective, the first profile, and the first state estimate of environment A.

In the example of FIG. 1, the environment analyzer 104 updates the first profile by requesting one or more of the second data from the second vehicle 106 or the additional data from the control center 108. The environment analyzer 104 compares the first profile with the second data and the additional data and determines the differences between the profiles. The environment analyzer 104 compares the profiles to determine the robustness of the first profile. For example, the environment analyzer 104 determines the type of difference between the profiles and the significance of the difference to the first profile. In alternative examples, the environment analyzer 104 generates a steady state profile for environment A based on the comparison between the profiles.

The environment analyzer 104 also identifies missing data in the first data for objects in the first perspective. The environment analyzer 104 identifies the missing data by tracking objects in the first perspective between different time steps. The environment analyzer 104 determines that the first data associated with an object in the first perspective at a first time is not in the first perspective at a second time. The environment analyzer 104 determines whether the missing data is due to an impairment. The impairment is, for example, a condition (e.g., mud, weather, bird feces) of the environment (e.g., environment A) that affect the sensors in the first autonomous vehicle 102. If the environment analyzer 104 determines that the missing sensor data is not due to an impairment (e.g., the missing object left the environment), the environment analyzer 104 updates the path plan based on one or more of the first data or the first profile. However, if the environment analyzer 104 determines that the missing sensor data is due to an impairment, the environment analyzer 104 identifies nodes in the environment that can provide sensor data for the missing object. The environment analyzer 104 identifies nodes in the environment that can provide sensor data for the missing object based on the relative location of the nodes in the environment (e.g., close to the last location of the missing object, in front of the first autonomous vehicle 102, behind the first autonomous vehicle 102, adjacent to the first autonomous vehicle 102, etc.).

The environment analyzer 104 updates the first perspective by requesting one or more of the second data or the additional data from one or more of the second vehicle 106 or the control center 108. The request for one or more of the second data or the additional data indicates that one or more of the second vehicle 106 or the control center 108 is to send the first autonomous vehicle 102 one or more of the second data or the additional data for a missing object, the missing object identified by an attribute of the missing object. After obtaining one or more of the second data or the additional data, the environment analyzer 104 updates the first path plan based on one or more of the second data or the additional data. The environment analyzer 104 executes the first path plan on the first autonomous vehicle 102 and determines whether to continue operating. In some examples, the environment analyzer 104 determines to continue operating when the first autonomous vehicle 102 is in an active mode (e.g., the first autonomous vehicle 102 is on). In other examples, the environment analyzer 104 determines not to continue operating when the first autonomous vehicle 102 is in a nonactive mode (e.g., the first autonomous vehicle is off).

In the example schematic illustration 100, the control center 108 collects the first data, the second data, additional data, the first profile, the second profile, and additional profiles obtained from additional nodes in the environment to generate a steady state profile for environment A, environment B, and additional environments. The control center 108 decides the significance and/or type of event (e.g., impairment) that caused differences between one or more of the first profile, the second profile, or the additional profiles. The control center 108 compares the first profile, the second profile, and the additional profiles to determine the common data between the profiles. Based on the common data, the control center 108 can filter excess data that is not common to an environment. By filtering excess data that is not common to an environment, the control center 108 generates a steady state profile for one or more of environment A, environment B, or additional environments. In some examples, when the first autonomous vehicle 102 transitions from a first environment (e.g., environment A) to a second environment (e.g., environment B), the environment analyzer 104 requests the steady state profile for the second environment from the control center 108. The control center 108 sends the steady state profile to the environment analyzer 104. Obtaining the steady state profile from the control center 108 and supplementing it with the first sensor data allows the environment analyzer 104 to reduce the computational intensity of analyzing an environment. The environment analyzer 104 only needs to compare the first data generated by the sensors of the first autonomous vehicle 102 in order to generate a perspective of the environment (e.g., environment A, environment B, etc.). The environment analyzer 104 uses the steady state profile to prepare and execute the path plan rather than analyzing the first data, the second data, the additional data, the second profile, or additional profiles.

Figure 2:
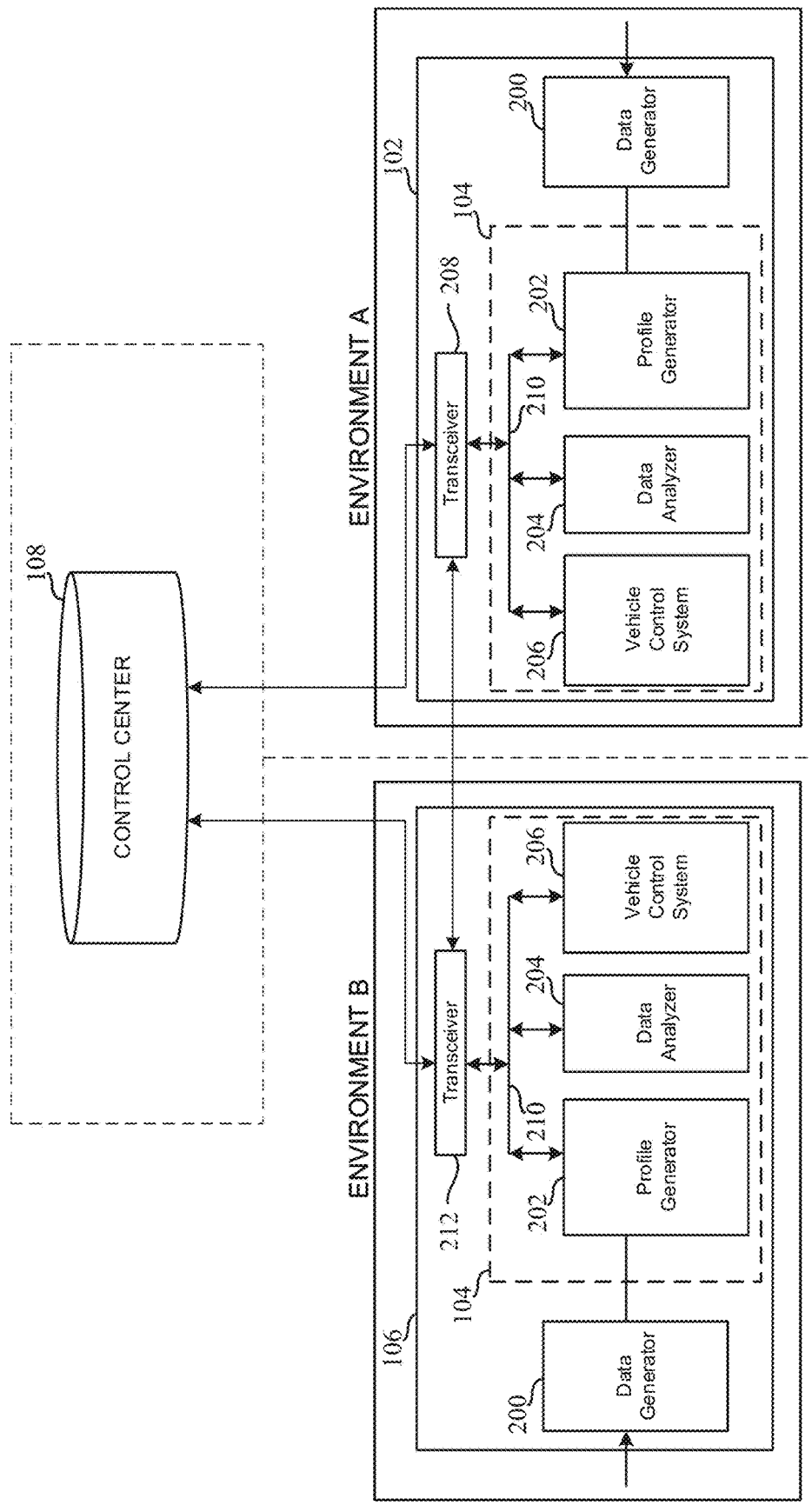
FIG. 2 is an example block diagram showing further detail of the example schematic illustration of FIG. 1.

FIG. 2 is an example block diagram showing further detail of the example schematic illustration 100 of FIG. 1. FIG. 2 illustrates the example schematic illustration 100 of FIG. 1 where the second vehicle 106 is a second autonomous vehicle 106 including the environment analyzer 104. The example schematic illustration 100 of FIG. 2 includes an example environment A, an example environment B, and an example control center 108.

The example environment A includes the first autonomous vehicle 102. The first autonomous vehicle 102 includes an example data generator 200, the example environment analyzer 104, and a first transceiver 208. The example environment analyzer 104 includes an example profile generator 202, an example data analyzer 204, and an example vehicle control system 206 and an example communication bus 210.

The example environment B includes the second autonomous vehicle 106. The second autonomous vehicle 106 includes the example data generator 200, the example environment analyzer 104, and a second transceiver 212. The example environment analyzer 104 includes the example profile generator 202, the example data analyzer 204, and the example vehicle control system 206 and the example communication bus 210.

In the example illustration of FIG. 2, the data generator 200 generates data (e.g., the first data, the second data, etc.) from the environment (e.g., environment A, environment B, etc.). The example data generator 200 is coupled to the example profile generator 202. The example profile generator 202 is coupled to the data analyzer 204 and an example transceiver (e.g., the first transceiver 208, the second transceiver 212, etc.) via the example communication bus 210. The example data analyzer 204 is coupled to the example vehicle control system 206 and the example transceiver (e.g., the first transceiver 208, the second transceiver 212, etc.) via the example communication bus 210. The example transceiver (e.g., the first transceiver 208, the second transceiver 212, etc.) is coupled to one or more other transceivers (e.g., the first transceiver 208, the second transceiver 212, etc.) and the example control center 108.

In the illustrated example of FIG. 2, the example transceiver 208, and the example transceiver 212 are hardware circuits that transmit and receive data from the nodes (e.g., the first autonomous vehicle 102, the second autonomous vehicle 106, the control center 108, etc.) in the environment (e.g., environment A, environment B, etc.). The example transceiver 208, and the example transceiver 212 are coupled to the example communication bus 210, additionally transmitting data to and receiving data from the profile generator 202, the data analyzer 204, and the vehicle control system 206.

In the illustrated example of FIG. 2, the example data generator 200 generates data from an environment. The example data generator 200 includes one or more sensors that generate data from an environment (e.g., environment A, environment B, etc.). For example, the data generator 200 include GPS sensors, global timer sensors, LIDAR sensors, cameras, radar sensors, etc. The sensors included in the example data generator 200 generate data from the environment at a frequency of 100 MB/s.

In the illustrated example of FIG. 2, the example profile generator 202 is a hardware logic circuit that generates a profile of the environment (e.g., environment A, environment B, etc.). In the example, the profile generator 202 generates a profile (e.g., the first profile, the second profile, additional profiles, etc.) for an environment (e.g., environment A, environment B, etc.). The profile generator 202 interprets the data generated by the data generator 200 using sensor interpreters. Depending on the sensor, the sensor interpreter changes. For example, for a GPS sensor or a global timer sensor, the sensor interpreter is a software interface (e.g., the Garmin software development kit (SDK)). However, for LIDAR sensors, cameras, or radar sensors, the sensor interpreter is a deep learning system that can analyze the data generated by the LIDAR sensor, the cameras, and/or the radar sensors to generate a perspective of the environment. The deep learning system is, for example, YOLO: Real-Time Object Detection. However, other example deep learning systems may be used so long as the deep learning system suitably interprets the data generated by the data generator 200 quickly enough for the environment analyzer 104 to effectively control the first autonomous vehicle 102 or the second autonomous vehicle 106.

The example profile generator 202 filters the first data for the second data. For example, a GPS sensor generates data including time data, longitudinal data, latitudinal data, data for the number of satellites used, altitude data, and location identity (ID) data. The profile generator 202 filters the first data generated by the data generator 200 using the sensor interpreters. For example, an SDK software interface filters the GPS data for the longitudinal data, the latitudinal data, and the location ID data. For LIDAR sensor, cameras, and/or radar sensors, the YOLO deep learning system analyzes and filters the LIDAR data, camera data, and the radar data for one or more of way data, edge data, background data, or other visual sensor data. In the example, the way data includes the surface material of the environment, the number of lanes available to the vehicle in the environment, and the number of lanes available to bicycles in the environment. The example edge information includes the number of amenities in the environment (e.g., convenience stores, gas stations, etc.), landscape data for the environment, pedestrian zones in the environment, etc.).

The profile generator 202 includes a profile template for the environment (e.g., environment A, environment B, etc.). The profile template includes data objects defined by a developer of the profile template. The developer defines the data objects for the profile template based on the desired output of the profile. For example, if the desired output of the profile is a road patch profile, the developer defines the data objects to be elements of the road (e.g., edge data, way data, background data, position data, etc.). In other examples, the desired output of the profile is the weather conditions in the environment. If the desired output of the profile is the weather conditions in the environment, the developer defines the data objects to be seasonal conditions of the environment (e.g., winter conditions, summer conditions, spring conditions, fall conditions, etc.). The weather conditions of the environment include the likelihood of precipitation during a season, types of visibility problems during a season (e.g., precipitation, fog, dusty, etc.), average temperature during a season, etc. The example profile generator 202 inputs the second data filtered from the first data by the sensor interpreters into the profile template to generate the first profile.

In the example, the first profile generated by the profile generator 202 is updated with the second data at a frequency of 199 bits/s. In the example, the profile generator 202 compresses the first profile and transmits, via the first transceiver 208, the first profile to other nodes in the environment (e.g., the second autonomous vehicle 106, the control center 108, etc.). The compressed first profile allows for autonomous vehicles in the environment to transmit and receive, via transceivers, sensor data and profiles of the environment via WLAN and/or cellular communication. The profile generator 202 can send and receive via WLAN and/or cellular communication because the first profile is updated at a much lower data frequency than the first data generated by the sensors in the first autonomous vehicle 102 (e.g., 199 bits/s as compared to 100 MB/s).

In the example illustration of FIG. 2, the example data analyzer 204 is a hardware logic circuit that compares the first profile with a second profile generated by the second autonomous vehicle 106 and additional profiles generated by other autonomous vehicles and the control center 108. In other examples, the data analyzer 204 is implemented by software. For example, the data analyzer 204 analyzes the second profile and the additional profiles via a consistency event check model to remove faulty/incorrect profiles. Moreover, the consistency event check model run by the data analyzer 204 filters faulty/incorrect profiles for profile generated within a threshold proximity to the first autonomous vehicle 102 and within a threshold amount of time from when the first profile was generated. Filtering the second profile and additional profiles allows the data analyzer 204 to generate a comprehensive profile from the viewpoints of the other nodes in the environment. The example data analyzer 204 additionally compares the first profile with the comprehensive profile using a Euclidian Distance comparison. Other types of suitable comparison algorithms can be used depending on the application. Additionally, based on the comparison, the data analyzer 204 determines the significance and the type of the differences between the first profile and the comprehensive profile. For example, the data analyzer 204 determines whether the first profile meets a first threshold value of similarity to the comprehensive profile. If the first profile does not meet the first threshold value of similarity to the comprehensive profile (e.g., in response to a trigger event), the data analyzer 204 classifies the differences between the first profile and the comprehensive profile as an anomaly and transmits, via the first transceiver 208, a notification including the anomaly to the second autonomous vehicle 106 and the control center 108 (e.g., the other nodes in the environment). The second autonomous vehicle 106 receives the notification at the second transceiver 212. The data analyzer 204 also transmits the notification to the vehicle control system 206 via the communication bus 210.

In the illustrated example of FIG. 2, the example first autonomous vehicle 102 includes the example environment analyzer 104 and the example environment analyzer 104 includes the example vehicle control system 206. In the example, the vehicle control system 206 is implemented using hardware logic circuits. In other examples, the vehicle control system 206 is implemented using software. In further examples, the example vehicle control system 206 is implemented using a combination of hardware and software. The example vehicle control system 206 fuses the data generated by the data generator 200. The vehicle control system 206 fuses the data generated by the data generator 200 by changing the orientation of the data generated by each sensor in the data generator 200 to a central vantage point. Changing the orientation of the data generated by the data generator 200 allows the vehicle control system 206 to generate a first perspective of the first autonomous vehicle. The first perspective is representative of the point of view of the first autonomous vehicle 102.

The vehicle control system 206 identifies objects in the perspective utilizing object identification algorithms (e.g., YOLO, Single Shot MultiBox Detector (SSD), etc.). The vehicle control system 206 generates new version of the first perspective for each time step n that the first autonomous vehicle 102 is in operation. For example, the vehicle control system 206 determines tracks objects in the first perspective by tracking the location of identified objects between versions of the first perspective. Tracking objects between versions of the first perspective allows the vehicle control system 206 to safely navigate environments (e.g., environment A, environment B, etc.). The example vehicle control system 206, determines the state of the environment (e.g., environment A, environment B, etc.). The vehicle control system 206 determines the state of the environment by tracking the objects in the first perspective over time and determining the trajectory of the objects for future states. For example, the vehicle control system 206 determines the state of the environment using Kalman filters. In other examples, the vehicle control system 206 determines the state of the environment using variations of a Kalman filter or other particle filters. Based on the state of the environment, the vehicle control system 206 prepares a first path plan for the first autonomous vehicle 102. If the vehicle control system 206 loses track of an object in the first perspective for multiple time steps (e.g., multiple iterations), the vehicle control system 206 determines if the cause of the missing object is due to an impairment. The impairment is, for example, a cracked camera lens, a blocked sensor, a weather condition that reduces visibility, or any other type of impairment that prevents the vehicle control system 206 from effectively tracking objects in the first perspective. In other examples, the impairment is due to a node in the environment blocking the vehicle control system 206 of the first autonomous vehicle 102 from tracking an object to determine the state of the environment. In further examples, the impairment is a weather condition (e.g., fog, precipitation, etc.) that prevents the vehicle control system 206 of the first autonomous vehicle 102 from tracking an object to determine the state of the environment. If the missing object is due to an impairment rather than, for example, the object leaving the first perspective because it left the environment, the vehicle control system 206 identifies nodes in the environment that can provide sensor data for the missing object. The vehicle control system 206 identifies nodes in the environment based on the nodes in the perspective with better FOVs of the missing object than the first autonomous vehicle 102. Nodes with better FOVs of the missing object than the first autonomous vehicle 102 are identified based on the relative position of the nodes in relation to the first autonomous vehicle 102. For example, a node in the environment with a better FOV than the first autonomous vehicle 102 is a node located in front of the first autonomous vehicle. In the example, the node has a better FOV than the first autonomous vehicle 102 because the node is not blocked from tracking the missing object by the same impairment as the first autonomous vehicle 102.

After identifying the nodes in the environment with better FOVs of the missing object than the first autonomous vehicle 102, the vehicle control system 206 updates the first perspective of the environment (e.g., generates an updated perspective).

The example vehicle control system 206 updates the first perspective by transmitting a request to the identified nodes in the environment. The request is prioritized based on whether the missing object is in the immediate path of the first autonomous vehicle 102. For example, the vehicle control system 206 assigns a priority level to the request based on whether the missing object intersects with the local path plan of the first autonomous vehicle 102. The local path plan is, for example, a path plan for the first autonomous vehicle, generated by the vehicle control system 206 included in the first autonomous vehicle 102, that describes the immediate path of the first autonomous vehicle 102 in the environment. The vehicle control system 206 determines whether the missing object is in the immediate path of the vehicle by comparing the location and trajectory of the missing object from previous time step. For example, the first autonomous vehicle 102 uses a previous state estimate (e.g., from a time step n−1). Additionally, there is a confidence rating associated with each state estimate and if the missing object remains missing for multiple time steps the confidence rating diminishes. The diminished confidence rating corresponds to a lower confidence for where the missing object is in the environment (e.g., environment A, environment B). For example, the diminished confidence rating corresponds to a lower confidence for the kinematics of the missing object. A diminished confidence rating reduces the area of an environment in which the vehicle control system 206 can prepare a path plan for the first autonomous vehicle 102 without intersecting the missing object. Additionally, a reduced confidence rating corresponds to, for example, an extension of the space occupied by the missing object, thereby reducing the free space in the environment. In such an example, the extended space occupied by the missing object is factored into path planning by the vehicle control system 206 for the first autonomous vehicle 102 to prevent a possible collision with the first autonomous vehicle 102. In other words, the extended space occupied by the missing object limits the free space in which the vehicle control system 206 can prepare a path plan, with a high confidence rating, for the first autonomous vehicle 102 without intersecting with the missing object.

If, due to the missing object, the confidence rating for previous state estimates indicates to the vehicle control system 206 that there is a conflict with the trajectory and intent of the missing object (e.g., a possible collision), the vehicle control system 206 indicates that the missing object is in the immediate path of the first autonomous vehicle 102 (e.g., the local path for the first autonomous vehicle for the next n+1, n+2, etc. time steps). If the vehicle control system 206 indicates that the missing object is in the immediate path of the first autonomous vehicle 102 (e.g., the local path for the first autonomous vehicle for the next n+1, n+2, etc. time steps), the vehicle control system 206 prepares a high priority request and transmits the high priority request to the identified nodes in the environment. If, after factoring in the diminished confidence ratings, previous state estimates indicates to the vehicle control system 206 that there is not a conflict (e.g., a possible collision) with the missing object and the immediate path of the first autonomous vehicle 102 (e.g., the local path for the first autonomous vehicle for the next n+1, n+2, etc. time steps), the vehicle control system 206 prepares a medium priority request and transmits the medium priority request to the identified nodes in the environment.

The example vehicle control system 206 monitors the identified nodes in the environment for a response to the request. If the vehicle control system 206 does not receive a response to the request, the vehicle control system 206 determines whether a threshold amount of time has passed between the transmission of the request and the current time step. If the threshold amount of time between the transmission and the current time step has not passed, the vehicle control system 206 continues to monitor the identified nodes (e.g., wait for a transmission from the identified nodes). If the threshold amount of time between the transmission and the current time step has passed and the request is high priority, the vehicle control system 206 cancels the first local path plan (e.g., the local path plan computed for the first autonomous vehicle 102). After the vehicle control system 206 cancels the first local path plan, the vehicle control system 206 updates the local path plan. For examples, the vehicle control system 206 maintains the previous local path plan to avoid intersecting the missing object. If the threshold amount of time between the transmission and the current time step has passed and the request is medium priority, the vehicle control system 206 determines a confidence rating for the past state estimate of the environment. If the confidence rating meets a confidence threshold, the vehicle control center 206 updates the first local path plan by confirming that the first local path plan is safe, in other words, the vehicle control system 206 resets the path plan for the first autonomous vehicle 102 to the first path plan. The confidence threshold is, for example, a value for the confidence rating for a previous state estimate that corresponds to a low probability of intersecting with the missing object. If the confidence rating does not meet the confidence threshold, the vehicle control system 206 recomputes the local path plan. The vehicle control system 206 recomputes the local path plan by generating a second local path plan. The second local path plan does not intersect with the trajectory of the missing object. For example, the vehicle control system 206 computes the second local path plan based on the kinematics (velocity, trajectory, etc.) of the missing object obtained from state estimates from previous time steps. In such an example, the second local path plan causes the first autonomous vehicle 102 to avoid the lanes in which the missing object is predicted to be in.

However, if the vehicle control system 206 receives the request within the threshold amount of time between transmission and the current time step, the vehicle control system 206 determines whether the response to the request includes state estimates or sensor data for the missing object. If the response includes state estimates for the missing object, the vehicle control system 206 fuses (e.g., probabilistically fuses) the state estimates for the missing object with the state estimates for the first perspective using a confidence rating based on a metric (e.g., the FOV of the identified nodes in the environment). Fusing state estimates from multiple nodes in the environment and the vehicle control system 206 of first autonomous vehicle 102 provides an increased confidence rating for the state of the environment. In other examples, the metric is related to the make, model, manufacturer, or other factors related to a level of confidence in the state estimates from the identified nodes in the environment. In other examples, when the confidence rating for the state estimate from the vehicle control system 206 is low and the confidence ratings for the state estimates from the response are high, the vehicle control system 206 could fuse the state estimates from the responses and replaces the state estimate for the vehicle control system 206 with the fused state estimate from the responses from the identified nodes in the environment.

If the response does not include state estimates, but rather sensor data from the identified nodes in the environment, the vehicle control system 206 transforms the sensor data from the identified nodes to the first perspective of the first autonomous vehicle 102 and then fuses the sensor data from the identified nodes with the sensor data generated by the data generator 200. The vehicle control system 206 generates a new state estimate for the environment from the fused sensor data from the identified nodes, the fused sensor data including information on the missing object. Additionally, the sensor data from the identified nodes includes information on other object and/or nodes in the environment, providing the vehicle control system 206 of the first autonomous vehicle 102 with more information providing a higher confidence rating for the environment as a whole.

The example vehicle control system 206 determines whether the missing object, now located by the sensor data and/or state estimates that were transmitted from the identified nodes, is in the immediate path of the first autonomous vehicle 102. If the missing object is in the immediate path of the first autonomous vehicle 102 (e.g., the local path for the first autonomous vehicle for the next n+1, n+2, etc. time steps), the vehicle control system 206 recomputes the local path plan by generating the second local path plan to avoid a possible collision with the missing object.

The example vehicle control system 206 updates the local path plan. The vehicle control system 206 updates local the path plan of the first autonomous vehicle 102 by replacing the first local path plan with the second local path plan. The vehicle control system 206 executes the second local path plan for the first autonomous vehicle 102.

Figure 3:
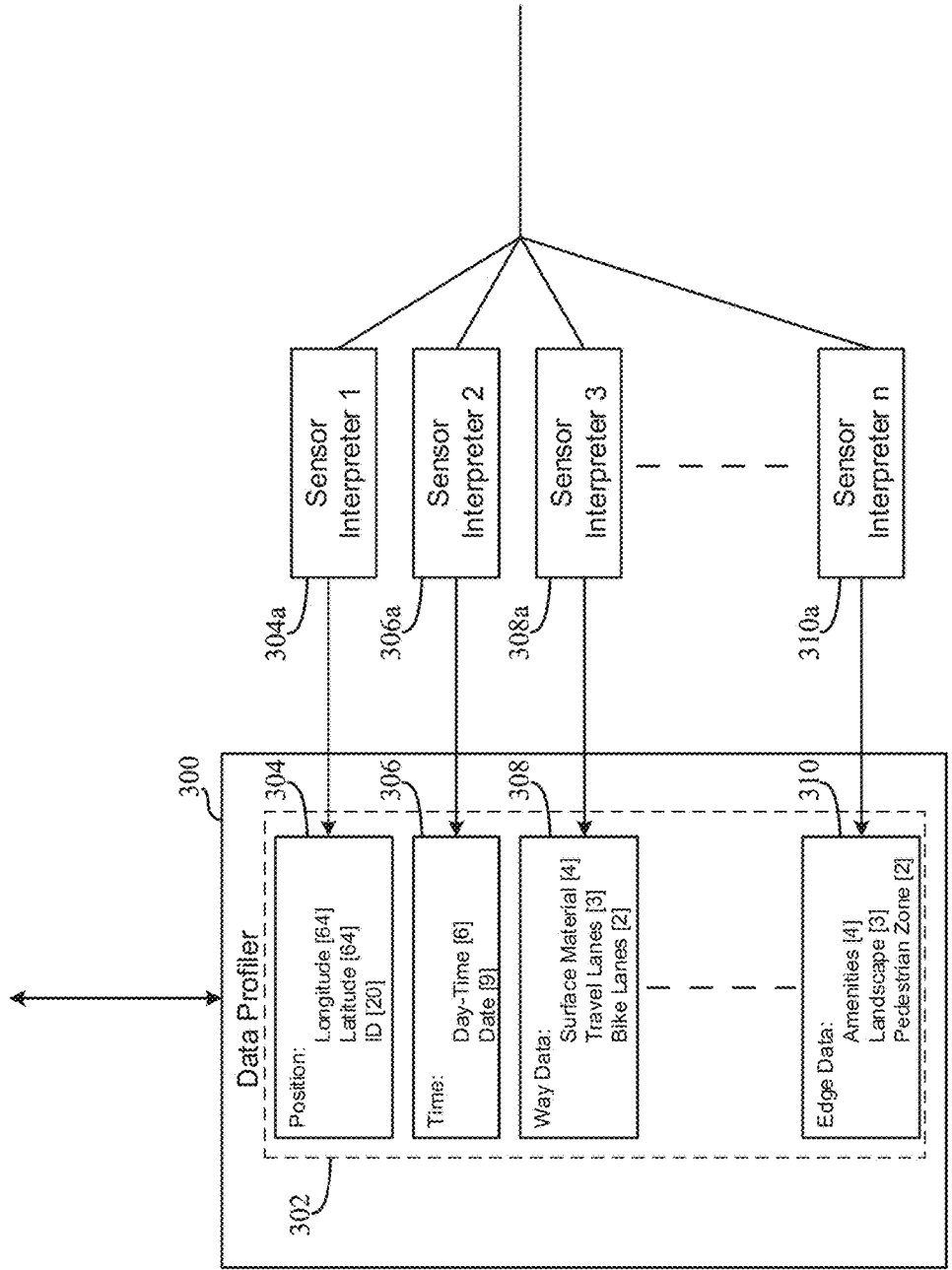
FIG. 3 is a block diagram of an example implementation of the profile generator of FIG. 2.

FIG. 3 is an example block diagram showing further detail of the example profile generator 202 of FIG. 2. The example profile generator 202 includes a data profiler 300, a first sensor interpreter 304a, a second sensor interpreter 306a, a third sensor interpreter 308a, and a nth sensor interpreter 310a. The data profiler 300 includes a profile template 302, the profile template 302 is a profile template for an urban road. The profile template 302 includes a first data object 304, a second data object 306, a third data object 308, and an nth data object 310.

In the illustrated example of FIG. 3, the first sensor interpreter 304a is coupled to the first data object 304, the second sensor interpreter 306a is coupled to the second data object 306, the third sensor interpreter 308a is coupled to the third data object 308, and the nth sensor interpreter 310a is coupled to the nth data object 310.

In the illustrated example of FIG. 3, the first sensor interpreter 304a, the second sensor interpreter 306a, the third sensor interpreter 308a, and the nth sensor interpreter 310a filter the first data generated by the data generator 200 respectively for the second data pertinent to the first data object 304, the second data object 306, the third data object 308, and the nth data object 310.

The data profiler 300 inserts the pertinent data filtered by the first sensor interpreter 304a, the second sensor interpreter 306a, the third sensor interpreter 308a, and the nth sensor interpreter 310a into the first data object 304, the second data object 306, the third data object 308, and the nth data object 310, respectively, into the profile template 302.

In the example, the first data object 304 is a position data object. In the example, the first sensor interpreter 304a is a Garmin SDK. The example first sensor interpreter 304a is coupled to an example GPS sensor in the data generator 200. The first sensor interpreter 304a filters the GPS data for longitude data, latitude data and location ID data. The example longitude data includes 64 bits. The example latitude data includes 64 bits. The example location ID data includes 20 bits. The example position data object describes the latitude and longitude as well as the ID of the location at which the first profile is generated by the data profiler 300.

In the example, the second data object 306 is a time data object. In the example, the second sensor interpreter 306a is an example SDK, for example, a Garmin SDK. The example second sensor interpreter 306a is coupled to an example global timer sensor in the data generator 200. The second sensor interpreter 306a filters the global timer data for day-time data and date data. The example day-time data includes 6 bits. The example date data includes 9 bits. The example time data object describes the time at which the first profile is generated by the data profiler 300.

In the example, the third data object 308 is a way data object. In the example, the third sensor interpreter 308a is an example deep learning system, for example YOLO. The example third sensor interpreter 308a is coupled to an example LIDAR sensor, an example radar sensor, and example cameras in the data generator 200. The third sensor interpreter 308a filters the LIDAR data, the radar data, and the camera data for surface material data, travel lane data, and bike lane data. The example surface material data includes 4 bits and describes the surface material of the roadway. The example travel lane data includes 3 bits and describes the number of lanes specified for vehicles on the roadway. The example bike lane data includes 2 bits and describes the number of lanes specified for bicycles on the roadway. The way data object describes the roadway in the urban road. In some examples, the way data object includes descriptive data for the roadway including common vehicle types, common animal crossings, and other types of data to describe and characterize the roadway.

In the example, the nth data object 310 is an edge data object. In the example, the nth sensor interpreter 310a is a deep learning system, for example YOLO. The example nth sensor interpreter 310a is coupled to an example LIDAR sensor, an example radar sensor, and example cameras in the data generator 200. The nth sensor interpreter 310a filters the LIDAR data, the radar data, and the camera data for amenities data, landscape data, and pedestrian zone data. The example amenities data includes 4 bits and describes the road side services available alongside the roadway. The example landscape data includes 3 bits and describes the landscape surrounding the roadway. The example pedestrian zone data includes 2 bits and describes areas alongside the road that pedestrians use (e.g., sidewalks). The edge data object describes the area surrounding that roadway at the time the first profile is generated by the data profiler 300.

The first data object 304, the second data object 306, the third data object 308, and the nth data object 310 characterize the environment in which the first profile is generated by the data profiler 300. The first sensor interpreter 304a, the second sensor interpreter 306a, the third sensor interpreter 308a, and the nth sensor interpreter 310a reduce the size of the first data generated by the data generator 200 from 100 MB/s to 199 bits/s by filtering the first data for the second data (e.g., the first data object 304, the second data object 306, the third data object 308, and the nth data object) and compressing the first profile before transmitting the first profile via the first transceiver 208.

The first profile generated by the data profiler 300, and more generally the profile generator 202 allows for other nodes (e.g., the second autonomous vehicle 106, the control center 108, etc.) in an environment (e.g., environment A, environment B, etc.) to generate comprehensive profiles of the environment to detect anomalies in the environment. Additionally, autonomous vehicles (e.g., the second autonomous vehicle 106) in the environment can prefetch the first profile from the first autonomous vehicle 102 to reduce the computational complexity of generating a perspective of an environment. The autonomous vehicles (e.g., the second autonomous vehicle 106) in the environment uses the first profile generated by the first autonomous vehicle 102 to generate the perspective of the environment. The first profile is already compiled and reduces the number of computational cycles that the environment analyzer 104 executes to profile the environment.

Figure 4:
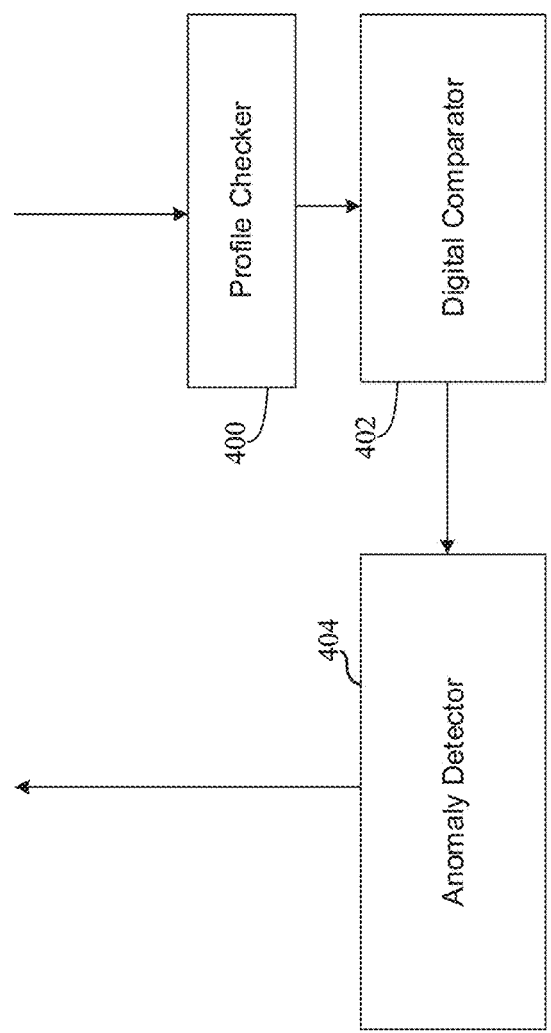
FIG. 4 is a block diagram of an example implementation of the data analyzer of FIG. 2.

FIG. 4 is an example block diagram showing further detail of the example data analyzer 204 of FIG. 2. The example data analyzer 204 includes an example profile checker 400, an example digital comparator 402, and an example anomaly detector 404. The example data analyzer 204 compares the first profile with a second profile generated by the second autonomous vehicle 106 and additional profiles generated by other autonomous vehicles and the control center 108.

The example profile checker 400 analyzes the second profile and the additional profiles via a consistency event check model to remove faulty/incorrect profiles. Moreover, the consistency event check model run by the profile checker 400 filters faulty/incorrect profiles for profile generated within a threshold proximity to the first autonomous vehicle 102 and within a threshold amount of time from when the first profile was generated. Filtering the second profile and additional profiles allows the profile checker 400 to generate a comprehensive profile from the viewpoints of the other nodes in the environment. The example digital comparator 402 compares the first profile with the comprehensive profile using a Euclidian Distance comparison. Other types of suitable comparison algorithms can be used depending on the application. The digital comparator 402 compares the first profile with the comprehensive profile to determine whether the first profile matches one or more of the second profile, the additional profiles, or the comprehensive profile.

The digital comparator 402 determines the first profile matches one or more of the second profile, the additional profiles, or the comprehensive profile if the first profile meets a first threshold value of profile similarity. If the digital comparator 402 does not determine that the first profile matches one or more of the second profile, the additional profiles, or the comprehensive profile, the digital comparator generates a signal indicating that the anomaly detector 404 is to transmit the complete first profile (e.g., a part of the first profile, a full value of the first profile) to the additional nodes in the environment. If the digital comparator 402 determines that the first profile matches one or more of the second profile, the additional profiles, or the comprehensive profile the digital comparator 402 determines whether the first profile exactly matches one or more of the second profile, the additional profiles, or the comprehensive profile. The digital comparator 402 determines the first profile exactly matches one or more of the second profile, the additional profiles, or the comprehensive profile is the first profile meets a second threshold of profile similarity. The second threshold value of profile similarity higher than the first threshold value of profile similarity. If the first profile meets the second threshold value of similarity, the digital comparator 402 generates a signal to the anomaly detector 404 that indicates the anomaly detector 404 is to transmit an acknowledgement to the other nodes in the environment that the first profile is exactly the same as one or more of the second profile, the additional profiles, or the comprehensive profile. If the first profile does not meet the second threshold value of profile similarity, the digital comparator 402 transmits a signal to the anomaly detector 404 that the first profile does not meet the second threshold value of similarity.

The anomaly detector 404 detects differences between the first profile and one or more of the second profile, the additional profiles, or the comprehensive profile. The anomaly detector 404 determines the significance and the type of the differences between the first profile and one or more of the second profile, the additional profiles, or the comprehensive profile based on the comparison between the first profile, the second profile, the additional profiles, and the comprehensive profile. The anomaly detector 404 determines whether the first profile is significantly the same as one or more of the second profile, the additional profiles, or the comprehensive profile. For example, the anomaly detector 404 determines the first profile is significantly the same as one or more of the second profile, the additional profiles, or the comprehensive profile if the first profile meets a third threshold value of profile similarity to one or more of the second profile, the additional profiles, or the comprehensive profile. If the first profile does not meet the third threshold value of profile similarity to one or more of the second profile, the additional profiles, or the comprehensive profile, the anomaly detector 404 classifies the differences between the first profile and one or more of the second profile, the additional profiles, or the comprehensive profile as an anomaly and transmits, via the first transceiver 208, a notification including the anomaly to the second autonomous vehicle 106 and the control center 108 (e.g., the other nodes in the environment). The second autonomous vehicle 106 receives the notification at the second transceiver 212. The anomaly detector 404 also transmits the notification to the vehicle control system 206 via the communication bus 210.

Figure 5:
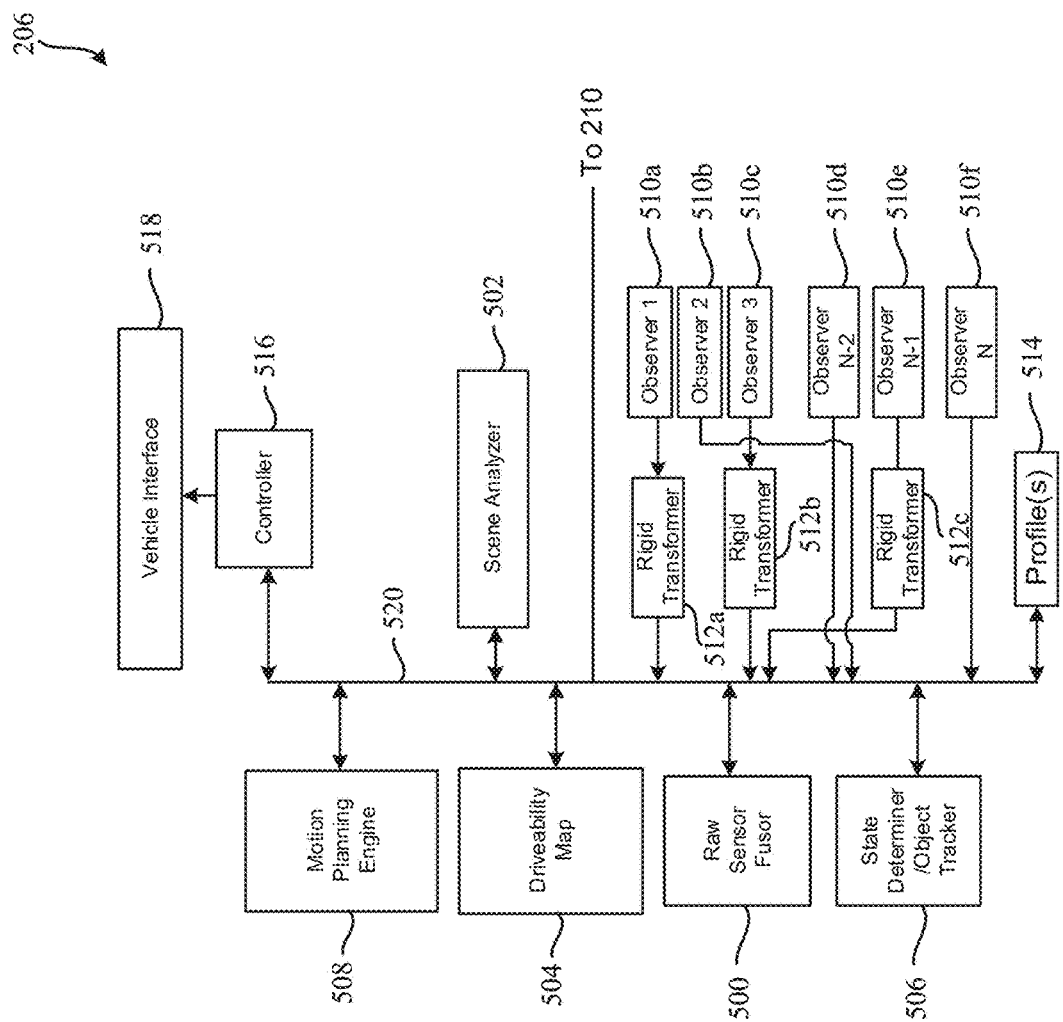
FIG. 5 is a block diagram of an example implementation of the vehicle control system of FIG. 2.

FIG. 5 is an example block diagram showing further detail of the vehicle control system 206 of FIG. 2. The example vehicle control system 206 includes an example raw sensor fusor 500, an example scene analyzer 502, an example drivability map 504, an example state determiner/object tracker 506, an example motion planning engine 508, an example first observer input 510a, an example second observer input 510b, an example third observer input 510c, an example nth−2 observer input 510d, an example nth−1 observer input 510e, an example nth observer input 510f, an example first rigid transformer 512a, an example second rigid transformer 512b, an example third rigid transformer 512c, an example profile input 514, an example controller 516, an example vehicle interface 518, and an example control system bus 520.

The example raw sensor fusor 500 is coupled to the example control system bus 520. The example scene analyzer 502 is coupled to the example control system bus 520. The example drivability map 504 is coupled to the example control system bus 520. The example state determiner/object tracker 506 is coupled to the example control system bus 520. The example motion planning engine 508 is coupled to the example control system bus 520. The example first observer input 510a is coupled to the example first rigid transformer 512a. The example second observer input 510b is coupled to the example control system bus 520. The example third observer input 510c is coupled to the example second rigid transformer 512b. The example nth−2 observer input 510d is coupled to the example control system bus 520. The example nth−1 observer input 510e is coupled to the example third rigid transformer 512c. The example nth observer input 510f is coupled to the example control system bus 520. The example first rigid transformer 512a is coupled to the example control system bus 520. The example second rigid transformer 512b is coupled to the example control system bus 520. The example third rigid transformer 512c is coupled to the example control system bus 520. The example profile input 514 is coupled to the example control system bus 520. The example controller 516 is coupled to the example control system bus 520. The example controller 516 is coupled to the example vehicle interface 518.

In the illustrated example, the raw sensor fusor 500 fuses the first data generated by the data generator 200. For example, the raw sensor fusor 500 fuses the sparse or dense point clouds (e.g., the first data) generated by the data generator 200 by transforming the unordered point cloud (e.g., the first data) into an evenly spaced rectangular grid. The raw sensor fusor 500 fuses the first data by processing the first data through a deep convolution network. For example, the deep convolution system can be accomplished as described in SPLATNET. In other examples, the deep convolution system is accomplished by tangent convolutions. In other examples the deep convolution system is accomplished through any suitable convolution system that can fuse the first data from the environment. The raw sensor fusor 500 fuses the first data generated by the data generator 200 into the first perspective of the first autonomous vehicle 102. The example raw sensor fusor 500 transmits the first perspective to the state determiner/object tracker 506. The raw sensor fusor 500 determines the area of the environment that is available for the first autonomous vehicle 102 to drive on. For example, when the environment is an urban road, the drivable area is the number of lanes prescribed for vehicles in the same direction as the first autonomous vehicle 102. In other examples, when the environment is an off-road environment, the drivable area is the whole area if the first autonomous vehicle 102 is, for example, a truck.

In further examples, the profile input 514 obtains profiles from the identified nodes in the environment. The profile input 514 transmits the profiles form the identified nodes to the raw sensor fusor 500. In the example, the profiles include a sparse 3D map of the environment (e.g., a perspective of the environment). The raw sensor fusor 500 extracts 3D features from the first perspective and compares the 3D features extracted from the first perspective to the 3D features in the 3D map of the environment. Additionally, the raw sensor fusor can compare the location of the first autonomous vehicle 102 to the location of the 3D features in the 3D map of the environment.

The example scene analyzer 502 analyzes the environment via the first perspective. In some examples, the scene analyzer 502 analyzes the sensor data included in the first perspective to determine high level characteristics of an environment. For example, the scene analyzer 502 determines attributes of objects in the environment based on the first perspective. For example, the attributes include characteristics of the objects in the environment, pseudonyms of objects, etc. Examples of characteristics of nodes include, license plate numbers, object color, vehicle make, vehicle model, vehicle manufacturer, vehicle size, etc. Additionally, the scene analyzer 502 determines the traffic markers (e.g., a stop sign, a stop light, traffic lanes, road signs, etc.). Such attributes are examples of attributes that are determined by the scene analyzer 502. The example scene analyzer 502 can also identify any other attribute that identifies an object in an environment. The example scene analyzer 502 is implemented through the use of one or more of semantic segmentation, semantic instance segmentation, scene graph reconstruction, or motion prediction.

The example state determiner/object tracker 506 tracks objects between iterations of the first perspective and determines the state of the environment (e.g., environment A, environment B, etc.). For example, the state determiner/object tracker 506 tracks objects in the environment using Kalman filters, alternative object tracking software, or other suitable object tracking methods. The example state determiner/object tracker 506 determines the state of the environment utilizing multimodal probabilistic techniques. For example, the state determiner/object tracker 506 determines the state of the environment by applying a Kalman filter or its variants to the iterations of the first perspective. For example, when the state determiner/object tracker 506 determines the state of the environment, the state determiner/object tracker 506 determines the position, velocity, acceleration, orientation, joint configuration, etc., of the objects in the environment in the FOV (e.g., the first perspective) of the first autonomous vehicle 102. Additionally, the state determiner/object tracker 506 determines the trajectory and intent of the objects in the environment in the FOV of the first autonomous vehicle 102. In some examples, the state determiner/object tracker 506 determines a confidence rating for the state estimate (e.g., based on the number of iterations of the first perspective for which some of the first data is missing for the object). Furthermore, the example state determiner/object tracker 506 identifies objects in the environment for which sensor data is missing across multiple time steps (e.g., multiple iterations). Objects in the environment include nodes in the environment as well as other objects in the environment (e.g., pedestrians, bicycles, animals, etc.). For example, if the state determiner/object tracker 506 is loses track of an object for multiple time steps, the state determiner/object tracker 506 identifies the object as potentially missing.

The example state determiner/object tracker 506 determines the trajectory and intent of the objects in the environment (e.g., environment A, environment B, etc.). If the state determiner/object tracker 506 determines that an immediate trajectory of an object (e.g., the immediate next location of the object) in the environment intersects the path plan of the first autonomous vehicle 102, the state determiner/object tracker 506 indicates to the motion planning engine 508 that the immediate trajectory of the object intersects the path plan of the first autonomous vehicle 102 (e.g., the local path for the first autonomous vehicle for the next n+1, n+2, etc. time steps). Because the example state determiner/object tracker 506 relies on the accuracy of the state estimates (e.g., the confidence rating), the state determiner/object tracker 506 cannot properly determine the trajectory and intent of the objects in the environment if the sensor data (e.g., the first data) generated by the data generator 200 is impaired. Additionally, the example state determiner/object tracker 506 determines whether the missing sensor data for objects in the environment is due to an impairment. An example of an impairment is a condition (e.g., mud, weather, bird feces) of the environment (e.g., environment A) that affect the sensors in the first autonomous vehicle 102. For example, a pebble on the roadway could come into contact with the lens of a camera or sensor on the first autonomous vehicle 102, impairing the FOV of the camera or the sensor. If the missing sensor is not due to an impairment, the missing object is due to, for example, the object that is being tracked leaving the environment. If the state determiner/object tracker 506 determines that the missing sensor data is due to an impairment, the state determiner/object tracker 506 identifies the nodes in the environment that can provide sensor data and/or state estimates for the missing object. The state determiner/object tracker 506 identifies the nodes in the environment that can provide sensor data and/or state estimates for the missing object based on the relative location of the nodes in the environment to the first autonomous vehicle 102.

For example, the state determiner/object tracker 506 identifies the nodes in the environment that have the best FOV of the missing object. In some examples, a sensor is impaired because there is another vehicle in between the first autonomous vehicle 102 and the missing object. In the example with the other vehicle in between the first autonomous vehicle 102 and the missing object, the state determiner/object tracker 506 identifies vehicles in front of or behind the first autonomous vehicle 102 as having a better FOV than the first autonomous vehicle 102. The vehicle control system 206 prepares a request for data from the other nodes in the environment. The example vehicle control system 206 prepares the request for data by determining if all of the identified nodes in the environment and the missing object have a corresponding pseudonym. If either (a) one of the identified nodes in the environment or (b) the missing object does not have a corresponding pseudonym, the scene analyzer 502 determines a first characteristic of the identified nodes in the environment. The example scene analyzer 502 additionally determines a second characteristic of the missing object. The example state determiner/object tracker 506 assigns a number of nodes to which to the send request. The number of nodes to send the request to corresponds to the number of nodes that have been identified by the state determiner/object tracker 506 as having a better FOV of the missing object than the first autonomous vehicle 102. The example state determiner/object tracker 506 assigns a first characteristic corresponding to the identified nodes in the environment to request. The first characteristic is determined by the scene analyzer 502. Additionally, the example state determiner/object tracker 506 assigns a second characteristic of the missing object to the request. The second characteristic is determined by the scene analyzer 502. The example state determiner/object tracker 506 assigns a priority level to the request. The priority level is based on the trajectory of the missing object and the trajectory of the first autonomous vehicle 102. For example, if the trajectory of the missing object intersects with the trajectory of the first autonomous vehicle 102 (e.g., the first path plan), the state determiner/object tracker 506 assigns a high priority level to the request. If the trajectory of the missing object does not intersect with the trajectory of the first autonomous vehicle 102, the example state determiner/object tracker 506 assigns a medium priority level to the request.

If the example state determiner/object tracker 506 determines that there are pseudonyms for all of the identified nodes in the environment (e.g., the nodes in the environment with a better FOV of the missing object than the first autonomous vehicle 102) and the missing object, the example state determiner/object tracker 506 assigns a number of nodes to which to the send request. The number of nodes to send the request to corresponds to the number of nodes that have been identified by the state determiner/object tracker 506 as having a better FOV of the missing object than the first autonomous vehicle 102 and a corresponding confidence rating for the sensor measurements and/or state estimates of each of the nodes. The example state determiner/object tracker 506 then accesses the pseudonym for each of the identified nodes, the pseudonyms identified by the scene analyzer 502, and assigns the pseudonym of each of the identified nodes to the request for data (e.g., raw sensor data and/or state estimates). The example state determiner/object tracker 506 assigns a priority level to the request. The priority level is based on the trajectory of the missing object and the trajectory of the first autonomous vehicle 102. For example, if the trajectory of the missing object intersects with the trajectory of the first autonomous vehicle 102 (e.g., the first path plan), the state determiner/object tracker 506 assigns a high priority level to the request. If the trajectory of the missing object does not intersect with the trajectory of the first autonomous vehicle 102, the example state determiner/object tracker 506 assigns a medium priority level to the request.

In further examples, the state determiner/object tracker 506 included in the first autonomous vehicle 102 obtains a request for one or more of sensor data or state estimates for an object in the environment that is missing to the second autonomous vehicle 106. The state determiner/object tracker 506 generates a response to the request indicating a priority level to match the priority level of the request. The example state determiner/object tracker 506 indicates an attribute of the node in the environment requesting one or more of the sensor data or the state estimates for the object. The attribute is determined by the scene analyzer 502. The example state determiner/object tracker 506 includes one or more of the sensor data or the state estimates for the object in the response, indicating an attribute of the object in the response.

In an alternative examples, if the state determiner/object tracker 506 determines that there is not a corresponding pseudonym available for all of the nodes in the environment, the state determiner/object tracker 506 assigns pseudonyms for one or more of the identified nodes or missing object that have a corresponding pseudonym to the request. In such an example, the state determiner/object tracker 506 also determines one or more characteristics for the one or more of the identified nodes or missing object that do not have a corresponding pseudonym and assigns the one or more characteristics to the request.

In additional alternative examples, state determiner/object tracker 506 sends a request indicating the corresponding pseudonym or characteristic of the missing object to the missing object.

The example motion planning engine 508 determines a global path plan and one or more local path plans. The global path plan relates to a path plan that routes the first autonomous vehicle from a first location to a second location. The global path plan includes waypoints that separate the global path plan into the one or more local path plans. Each of the one or more local path plans describes the path plan for a portion of the global path plan. To determine the global path plan, the example motion planning engine 508 accesses the drivability map 504 to determine a route to a destination. Additionally, the motion planning engine 508 updates the drivability map 504 based on the state estimates and trajectory and intent of the objects in the environment generated by the state determiner/object tracker 506. In one example, motion planning engine 508 models an environment as a grid and identifies grid points as occupied when the state estimates and trajectory and intent indicate objects occupy the grid points. The grid points that are not identified as occupied correspond to the free space in the environment. In such an example, when there is missing sensor data, and as a result, no state estimate or trajectory and intent for some objects, the motion planning engine 508 extends the space occupied by the missing object, thereby reducing the free space in the environment. In such an example, as the missing sensor data persists for multiple time steps, the motion planning engine 508 extends the space occupied by the missing object at each time step, further limiting the free space in which the motion planning engine 508 can prepare the path plan for the first autonomous vehicle 102. In some examples, the motion planning engine 508 determines the global path plan based on the traffic conditions of the environment. In such an example, the traffic conditions are indicated by the drivability map 504. To determine the local path plan, the motion planning engine 508 determines a first path plan for the first autonomous vehicle 102 based on the state estimate and the trajectory and intent of the objects in the environment. For example, the motion planning engine 508 computes a path in the environment that is on the drivable area described in the drivability map 504 and does not intersect with any of the trajectories of the objects in the environment. The motion planning engine 508 determines the first path plan and transmits the first path plan to controller 516. If the example motion planning engine 508 receives a notification from the state determiner/object tracker 506 indicating that the immediate trajectory of an object in the environment intersects with the path plan of the first autonomous vehicle 102, the motion planning engine 508 determines the first path plan including actions for emergency stopping (e.g., emergency braking), object avoidance, etc.

The example first observer input 510a, the example second observer input 510b, the example third observer input 510c, the example nth–2 observer input 510d, the example nth–1 observer input 510e, and the example nth observer input 510f monitor the identified nodes in the environment for a response to the request. The response includes the second data from the other nodes in the environment. In the example the second data includes one or more of state estimates for the missing objects or raw sensor data for the missing objects in the environment.

For example, the first observer input 510a, the third observer input 510c, and the nth–1 observer input 510e obtain responses from the identified nodes including sensor data from the identified nodes in the environment (e.g., the second vehicle 106). For example, the second vehicle 106 in the environment is a legacy vehicle. In the example, the second vehicle 106 includes V2X communication capabilities and a data generator 200. The example first observer input 510*a*, the example third observer input 510*c*, and the example nth−1 observer input 510*e* obtain the response including sensor data from the second vehicle 106.

In the example, the first observer input 510*a*, the third observer input 510*c*, and the nth−1 observer input 510*e* send the sensor data included in the responses from the identified nodes in the environment to the first rigid transformer 512*a*, the second rigid transformer 512*b*, and the third rigid transformer 512*c*, respectively. In the example, the first rigid transformer 512*a*, the second rigid transformer 512*b*, and the third rigid transformer 512*c* transform the sensor data from the identified nodes to the first perspective of the first autonomous vehicle 102.

In some examples, transforming the sensor data to the perspective of the first autonomous vehicle 102 includes populating a rigid transformation matrix $T_{cw}$ with the sensor data from the identified nodes $$T_{cw} = \begin{bmatrix} RotX \cdot x & RotY \cdot x & RotZ \cdot x & Translation \cdot x \\ RotX \cdot y & RotY \cdot y & RotZ \cdot y & Translation \cdot y \\ RotX \cdot z & RotY \cdot z & RotZ \cdot z & Translation \cdot z \\ 0 & 0 & 0 & 1 \end{bmatrix} \quad \text{Equation-1}$$

The transformation matrix shown in Equation 1 can be populated by utilizing one or more of the sensor data or the state estimates for the missing object. For example, GPS coordinates and inertial sensor data can be used to determine the 6 degrees of freedom (DOF) and rotation and translation of the missing object. In some examples, the rigid transformation is accomplished using a single-frequency GPS signal and a network of receivers to share raw GPS data. Using the raw GPS data (e.g., from GPS satellites) a map of the location of the other nodes in the environment can be identified by establishing 3D position vectors for nodes in the environment.

In other examples, rigid transformation is accomplished by generating a dense disparity map of the missing vehicle based on the sensor data included in the response to the request. The dense disparity map describes the depth (e.g., the distance from the identified node) of the missing object. Based on the distance of the identified node from the first autonomous vehicle 102, the first rigid transformer 512*a*, the second rigid transformer 512*b*, and the third rigid transformer 512*c* can offset the distance of the missing object from the identified node by the distance of the identified node from the first autonomous vehicle 102.

In further examples, the first rigid transformer 512*a*, the second rigid transformer 512*b*, and the third rigid transformer 512*c* transform the vantage point of the raw sensor data obtained from the identified nodes in the environment by utilizing the 3D map of the environment obtained from the profile input 514 and analyzed by the raw sensor fusor 500.

Additionally, the example second observer input 510*b*, the example nth−2 observer input 510*d*, and the example nth observer input 510*f* obtain responses from the identified nodes including state estimates for the missing objects. In examples where the example second observer input 510*b*, the example nth−2 observer input 510*d*, and the example nth observer input 510*f* obtain responses from the identified nodes including state estimates for the missing objects, the responses are from the second autonomous vehicle 106. In the example, the second autonomous vehicle 106 includes the environment analyzer 104.

The example second observer input 510*b*, the example nth−2 observer input 510*d*, and the example nth observer input 510*f* obtain responses from the identified nodes including state estimates for the missing objects send the state estimates for the missing objects to the state determiner/object tracker 506 via the control system bus 520.

In the example, the raw sensor fusor 500 fuses the transformed raw sensor data obtained in the response to the request with the raw sensor data generated by the data generator 200 in the first autonomous vehicle 102. The scene analyzer 502 identifies objects in the environment. The state determiner/object tracker 506 tracks the objects in the environment using one or more of the raw sensor data obtained from the identified nodes fused with the raw sensor data generated by the first autonomous vehicle 102 or the state estimates obtained from the identified nodes. Based on the updated state estimates and object tracking, the state determiner/object tracker 506 can accurately determine the trajectory and intent of the objects in the environment. The motion planning engine 508 determines a second path plan based on one or more of the sensor data generated by the first autonomous vehicle 102, the sensor data obtained from the identified nodes, the state estimates obtained from the identified nodes, the first profile generated by the first autonomous vehicle 102, or other profile obtained from other nodes via the profile input 514. The motion planning engine 508 transmits the second path plan to the controller 516. The example controller 516 determines a control sequence to execute the path plan for the first autonomous vehicle 102 and executes the first path plan on the first autonomous vehicle 102 via the vehicle interface 518.

Figure 6A:
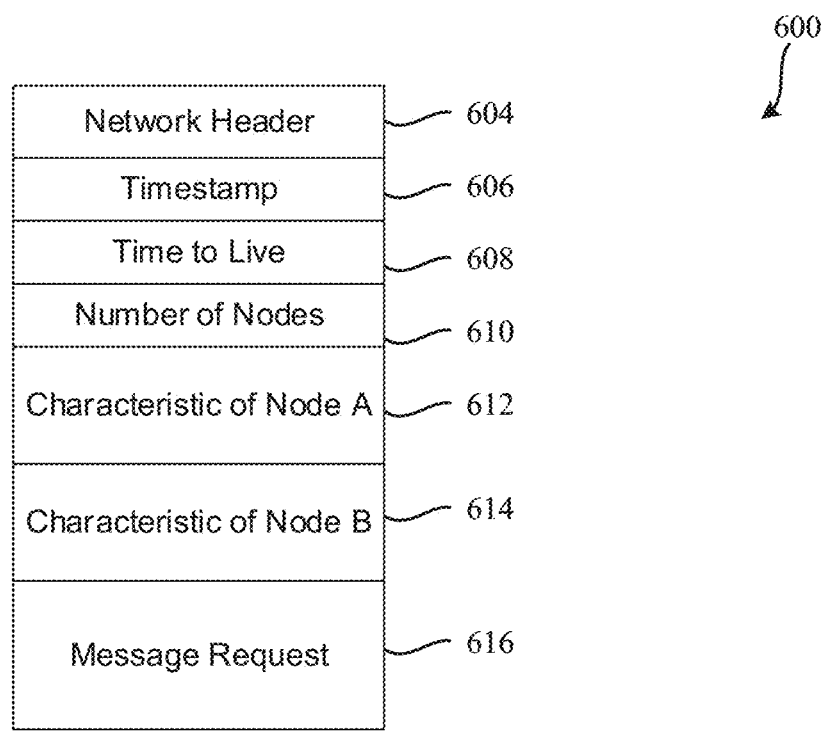
FIG. 6a is a diagram of an example request based on characteristics of objects in an environment, sent by the vehicle control system of FIG. 2.

FIG. 6*a* is a diagram of an example request 600 based on characteristics of objects in an environment (e.g., environment A, environment B), sent by the vehicle control system 206 of FIG. 2. In the example, the vehicle control system 206 prepares and sends the request 600 to the identified nodes in the environment. The example request 600 includes an example network header field 604, an example timestamp field 606, an example time to live field 608, an example number of nodes field 610, an example first characteristic of an identified node field 612, an example second characteristic of an identified node field 614, and an example message request field 616.

In the example, the network header field 604 includes transparent information about the request 600. In the example, the network header field 604 includes the priority level of the request 600. Additionally, the example network header field 604 includes communication protocols (e.g., Media Access Control (MAC) address, Internet Protocol (IP) address, etc.) for the other nodes in the environment to communicate with vehicle control system 206 and more generally the first autonomous vehicle 102.

The example timestamp field 606 indicates the time at which the request 600 was prepared and transmitted by the vehicle control system 206. The timestamp field 606 is populated using data (e.g., global timer data) generated by the data generator 200.

The example time to live field 608 indicates the amount of time that the request 600 is to be active. If an identified node processes the request 600 after the time to live has expired, the identified node will determine that a response to the request 600 is irrelevant. Alternatively, if an identified node processes the request 600 before the time to live has expired, the identified node determines that the response to the request 600 is relevant and prepares a response to the request 600. In examples where the priority level is high, the time to live field 608 is short. The short time to live field 608 indicates that the request 600 is only relevant for a short amount of time. In examples where the priority level is medium, the time to live field 608 is longer than the time to live field 608 for a high priority request. The longer time to live field 608 indicates that the request 600 is relevant for a longer amount of time.

The example number of nodes field 610 describes the number of identified nodes to send the request 600 to. In the example, the number of nodes field 610 is set to 2. The example first characteristic of an identified node field 612 describes a first characteristic of an identified node in the environment that the state determiner/object tracker 506 is requesting one or more of sensor data or state estimates from. The example second characteristic of an identified node field 614 describes a second characteristic of an identified node in the environment that the state determiner/object tracker 506 is requesting one or more of sensor data or state estimates from. The example message request field 616 includes an indication that the state determiner/object tracker 506 is requesting one or more of sensor data or state estimates for a missing object in the FOV of the first autonomous vehicle 102. The missing object is identified to the identified nodes in the environment by a characteristic of the missing object.

Figure 6B:
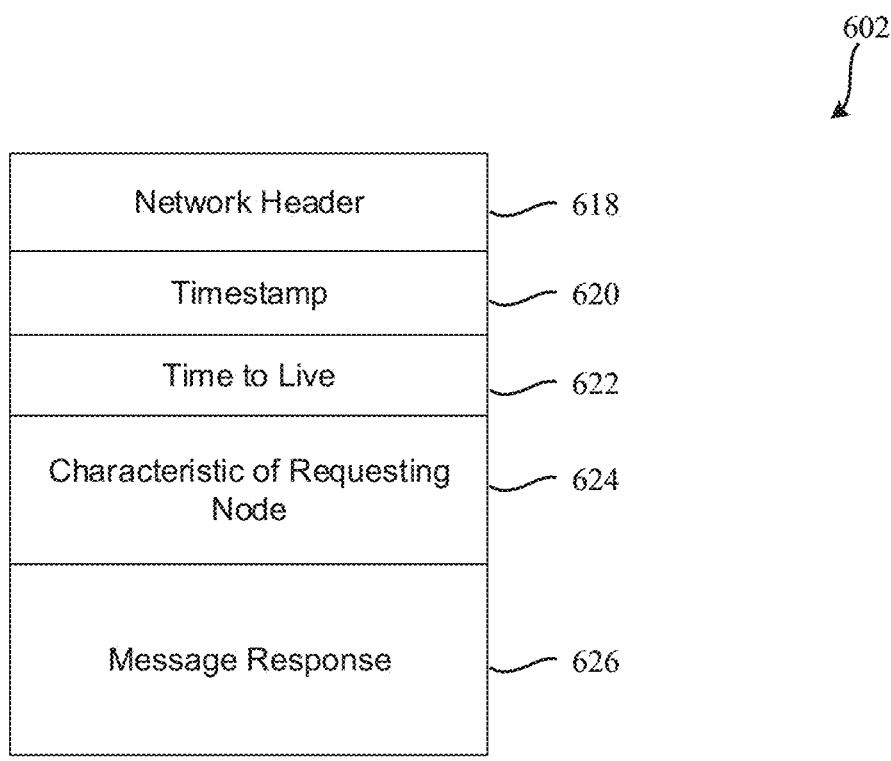

FIG. 6b is a diagram of an example response 602 retrieved by the vehicle control system 206 of FIG. 2 in response to the example request 600 of FIG. 6a. In the example, the vehicle control system 206 prepares and transmits the response 602 to the request 600. The response 602 includes an example network header field 618, an example timestamp field 620, an example time to live field 622, an example characteristic of the requesting node field 624, and an example message response field 626.

The example network header field 618 includes transparent information about the response 602. In the example, the network header field 618 includes a priority level to match the priority level of the request 600. Additionally, the example network header field 618 includes communication protocols (e.g., MAC address, Internet IP address, etc.) to match the communication protocols of the request 600.

The example timestamp field 620 indicates the time at which the response 602 was prepared and transmitted by the vehicle control system 206. The timestamp field 620 is populated using data (e.g., global timer data) generated by the data generator 200. The example time to live field 622 indicates the amount of time that the response 602 is to be active. The time to live field 622 is to be populated by an amount of time that is not longer than the time to live field 608 of the request 600.

The example characteristic of the requesting node field 624 describes a characteristic of the node that requested one or more of the sensor data or the state estimates. The example scene analyzer 502 identifies the characteristic of the requesting node based on the first perspective.

The example message response field 626 includes one or more of the sensor data or the state estimates for the object identified in the request 600. The missing object is identified to the identified nodes in the environment by a characteristic of the missing object. In some examples, the characteristic is a physical characteristic of the missing object. In some examples, the network infrastructure supports sending the raw sensor data. In other examples, the raw sensor data is filtered according to sensor data pertinent to the missing object. In further examples, only the state estimates are included in the response. State estimates are preferred because less bandwidth is required to send state estimates, however, in some examples, lower level autonomous vehicles have the capability to generate raw sensor data but not state estimates. In such examples, the lower level autonomous vehicles include raw sensor data in the response to the requests.

When the identified nodes receive a high priority request, the identified nodes respond as quickly as possible with one or more of the sensor data or the state estimates for the missing object. When the identified nodes receive a medium priority request, the identified nodes respond when the identified nodes are capable of handling (e.g., processing) the request 600. Many different priority levels may exist depending on the application and a stratification of priority levels (e.g., a hierarchy of priority levels) may be developed to instruct recipients of the request on how to handle the request 600.

Figure 7A:
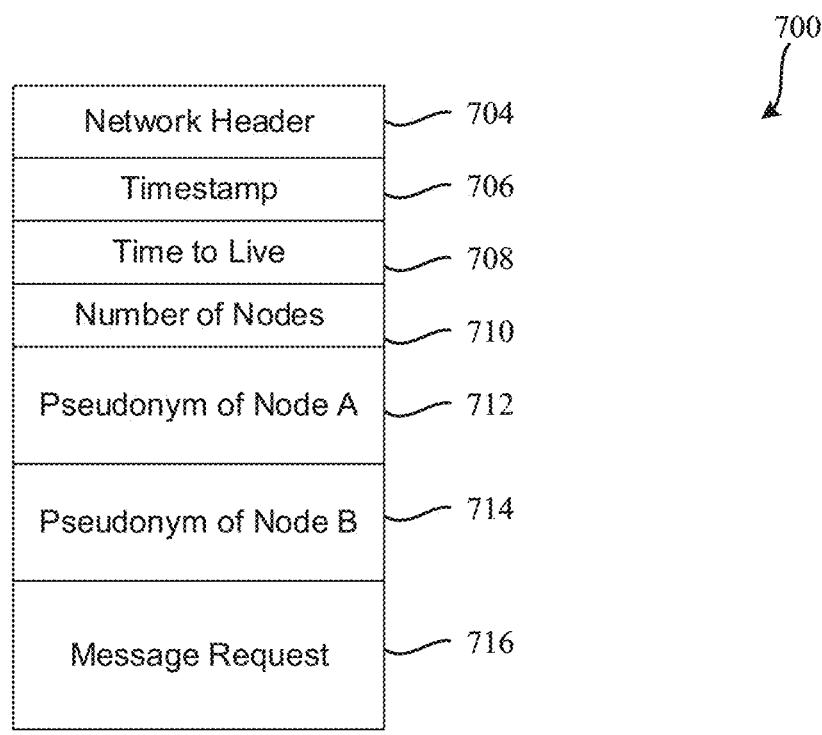
FIG. 7a is a diagram of an example request based on pseudonyms of objects in an environment, sent by the vehicle control system of FIG. 2.

FIG. 7a is a diagram of an example request 700 based on pseudonyms of objects in an environment (e.g., environment A, environment B), sent by the vehicle control system 206 of FIG. 2. In the example, the vehicle control system 206 prepares and sends the request 600 to the identified nodes in the environment. The example request 700 includes an example network header field 704, an example timestamp field 706, an example time to live field 708, an example number of nodes field 710, an example first pseudonym of an identified node field 712, an example second pseudonym of an identified node field 714, and an example message request field 716.

In the example, the network header field 704 includes transparent information about the request 700. In the example, the network header field 704 includes the priority level of the request 700. Additionally, the example network header field 704 includes communication protocols (e.g., MAC address, IP address, etc.) for the other nodes in the environment to communicate with vehicle control system 206 and more generally the first autonomous vehicle 102.

The example timestamp field 706 indicates the time at which the request 700 was prepared and transmitted by the vehicle control system 206. The timestamp field 706 is populated using data (e.g., global timer data) generated by the data generator 200.

The example time to live field 708 indicates the amount of time that the request 700 is to be active. If an identified node processes the request 700 after the time to live has expired, the identified node will determine that a response to the request 700 is irrelevant. Alternatively, if an identified node processes the request 700 before the time to live has expired, the identified node determines that the response to the request 700 is relevant and prepares a response to the request 700. In examples where the priority level is high, the time to live field 708 is short. The short time to live field 708 indicates that the request 700 is only relevant for a short amount of time. In examples where the priority level is medium, the time to live field 708 is longer than the time to live field 708 for a high priority request. The longer time to live field 708 indicates that the request 700 is relevant for a longer amount of time.

The example number of nodes field 710 describes the number of identified nodes to send the request 700 to. In the example, the number of nodes field 710 is set to 2. The example first pseudonym of an identified node field 712 describes a first pseudonym of an identified node in the environment that the state determiner/object tracker 506 is requesting one or more of sensor data or state estimates from. The example second pseudonym of an identified node field 714 describes a second pseudonym of an identified node in the environment that the state determiner/object tracker 506 is requesting one or more of sensor data or state estimates from. The example message request field 716 includes an indication that the state determiner/object tracker 506 is requesting one or more of sensor data or state estimates for a missing object in the FOV of the first autonomous vehicle 102. The missing object is identified to the identified nodes in the environment by a pseudonym of the missing object.

Figure 7B:
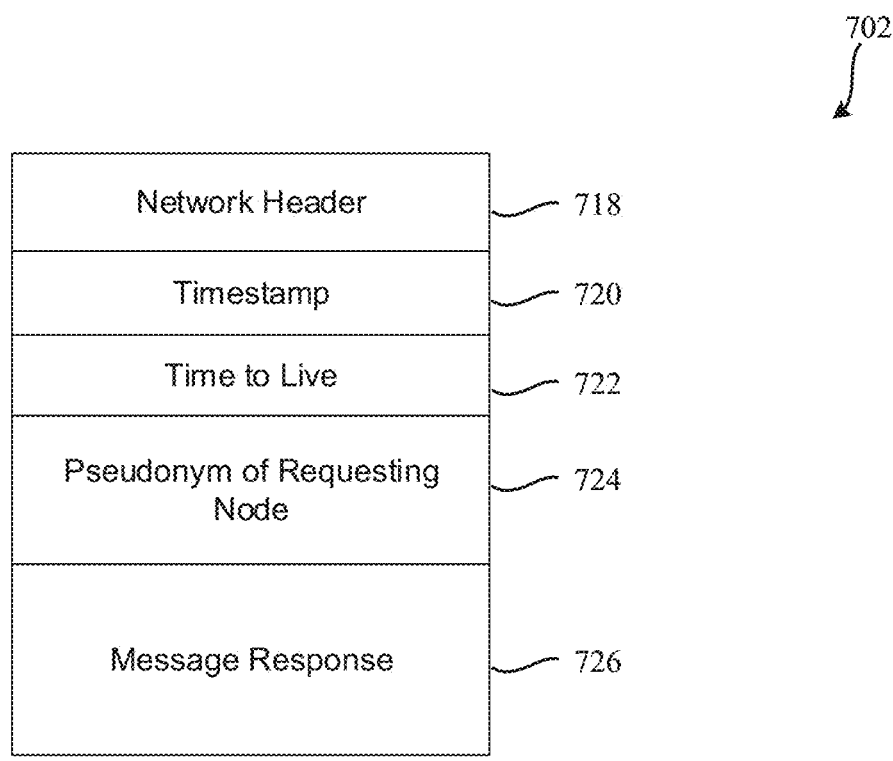

FIG. 7b is a diagram of an example response 702 retrieved by the vehicle control system 206 of FIG. 2 in response to the example request 700 of FIG. 7a. In the example, the vehicle control system 206 prepares and transmits the response 702 to the request 700. The response 702 includes an example network header field 718, an example timestamp field 720, an example time to live field 722, an example pseudonym of the requesting node field 724, and an example message response field 726.

The example network header field 718 includes transparent information about the response 702. In the example, the network header field 718 includes a priority level to match the priority level of the request 700. Additionally, the example network header field 718 includes communication protocols (e.g., MAC address, Internet IP address, etc.) to match the communication protocols of the request 700.

The example timestamp field 720 indicates the time at which the response 702 was prepared and transmitted by the vehicle control system 206. The timestamp field 720 is populated using data (e.g., global timer data) generated by the data generator 200. The example time to live field 722 indicates the amount of time that the response 702 is to be active. The time to live field 722 is to be populated by an amount of time that is not longer than the time to live field 708 of the request 700.

The example pseudonym of the requesting node field 724 describes a pseudonym of the node that requested one or more of the sensor data or the state estimates. The example scene analyzer 502 identifies the pseudonym of the requesting node based on the first perspective, and the example state determiner/object tracker 506 assigns the pseudonym of the node that requested one or more of the sensor data or the state estimate to the requesting node field 724.

The example message response field 726 includes one or more of the sensor data or the state estimates for the object identified in the request 700. The missing object is identified to the identified nodes in the environment by a pseudonym of the missing object. In some examples, the network infrastructure supports sending the raw sensor data. In other examples, the raw sensor data is filtered according to sensor data pertinent to the missing object. In further examples, only the state estimates are included in the response. State estimates are preferred because less bandwidth is required to send state estimates, however, in some examples, lower level autonomous vehicles have the capability to generate raw sensor data but not state estimates. In such examples, the lower level autonomous vehicles include raw sensor data in the response to the requests.

In additional examples, as the pseudonym of the identified node changes during the time that the request 700 is sent, the network header field 718 is populated with updated communication protocols that correspond with the updated pseudonym. In alternative examples, as the vehicle control system 206 populates the pseudonym of the requesting node field 724 with the previous pseudonym of the identified node.

When the identified nodes receive a high priority request, the identified nodes respond as quickly as possible with one or more of the sensor data or the state estimates for the missing object. When the identified nodes receive a medium priority request, the identified nodes respond when the identified nodes are capable of handling (e.g., processing) the request 700. Many different priority levels may exist depending on the application and a stratification of priority levels (e.g., a hierarchy of priority levels) may be developed to instruct recipients of the request on how to handle the request 700.

FIG. 8 is an example schematic illustration of example environments in which an autonomous vehicle analyzes an environment. FIG. 8 includes FIG. 8a, FIG. 8b, FIG. 8c, and FIG. 8d. The example schematics of FIG. 8a, FIG. 8b, FIG. 8c, and FIG. 8d illustrate four environments in which an autonomous vehicle analyzes an environment.

Figure 8A:
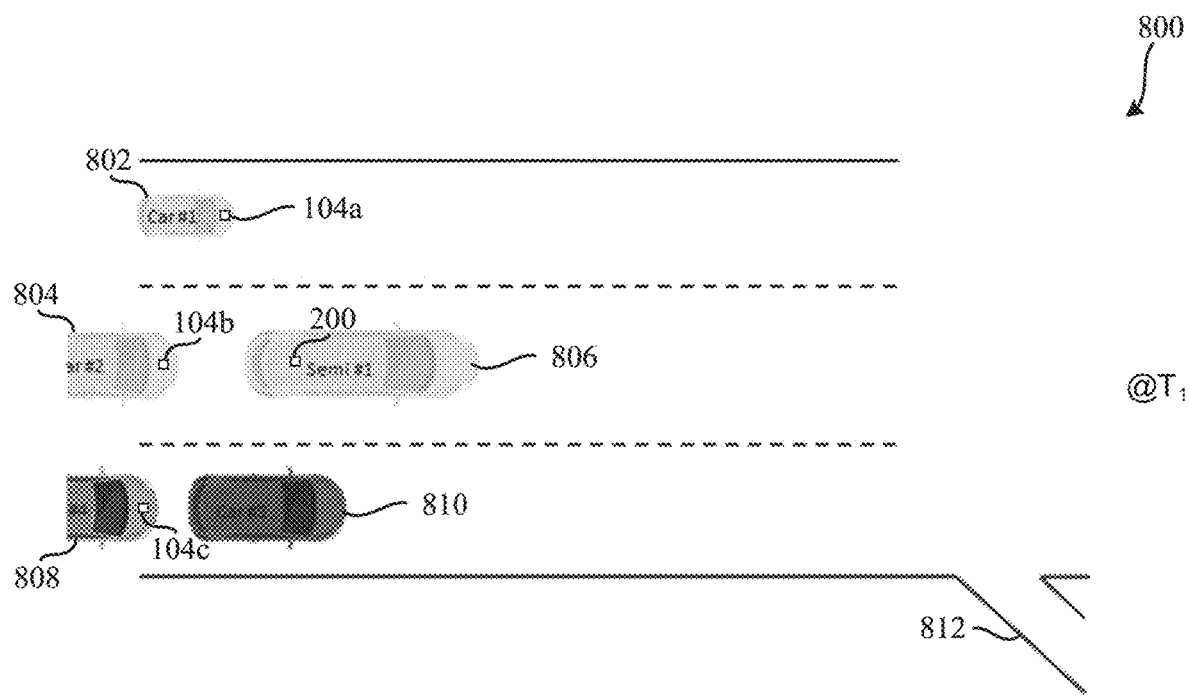
FIG. 8a, FIG. 8b, FIG. 8c, and FIG. 8d are example schematic illustrations of example environments in which an autonomous vehicle analyzes an environment.

FIG. 8a is an example schematic illustration of an example environment 800 at a time $T_1$. The example schematic illustration of FIG. 8a includes a first vehicle 802, a second vehicle 804, a third vehicle 806, a fourth vehicle 808, a target vehicle 810, and an exit 812. In the illustrated example environment of FIG. 8a, the first vehicle 802 is an autonomous vehicle supporting V2X communication and includes the environment analyzer 104a as well as sensors to generate data from the environment. In the example schematic illustration of FIG. 8a, the second vehicle 804, the third vehicle 806, and the fourth vehicle 808 are automotive vehicles. The second vehicle 804 and the fourth vehicle 808 include sensors to generate data from the environment. The second vehicle 804 and the fourth vehicle 408 support V2X communication. The second vehicle 804 includes the environment analyzer 104b and the fourth vehicle 808 includes the environment analyzer 104c. The third vehicle 806 supports at least V2V communication. The third vehicle 806 includes the data generator 200. In the example schematic of FIG. 8a, the target vehicle 810 is a legacy automotive vehicle that does not support any inter-vehicular communication. In alternative examples, the target vehicle 810 supports at least V2V communication.

In the illustrated example of FIG. 8a, the example environment 800, the first vehicle 802 generates first data based on the environment 800 via sensors (e.g., a GPS sensor, a global timer sensor, a LIDAR sensor, cameras, a radar sensor, etc.) included in the first vehicle 802. In the illustrated example of FIG. 8a, the environment analyzer 104a generates a first perspective of the environment 800 based on the first data generated by the sensors. In the illustrated example of FIG. 8a, the environment analyzer 104a in the first vehicle 802 tracks the second vehicle 804, the third vehicle 806, and the target vehicle 810 (e.g., the environment analyzer 104a in the first vehicle 802 tracks an object in the environment 800).

Figure 8B:
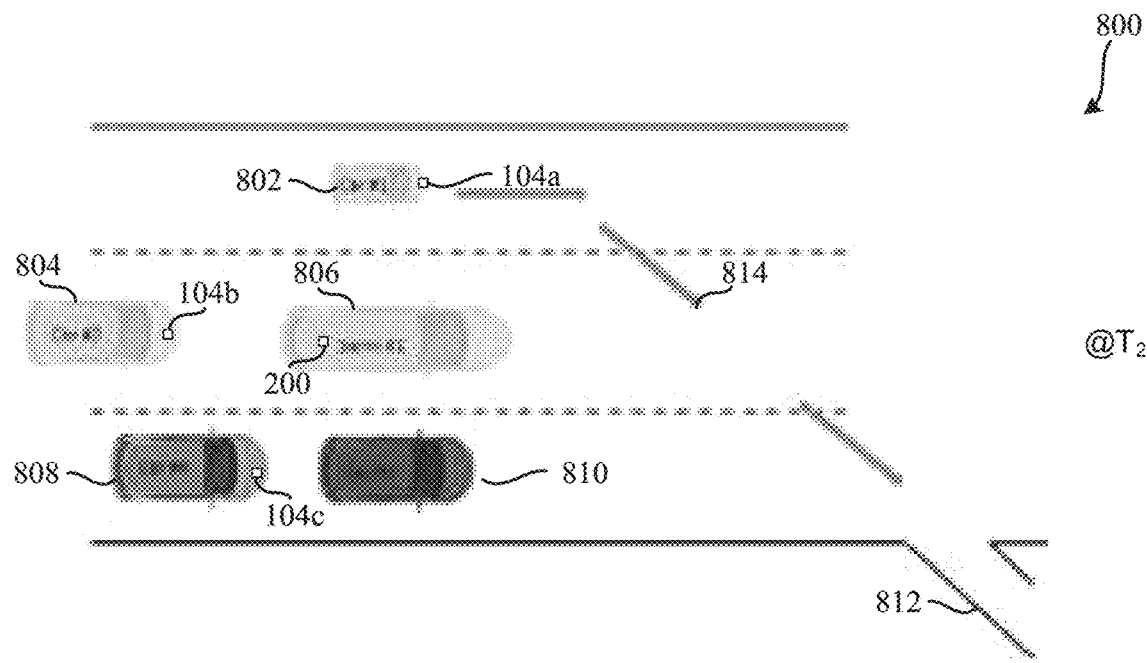

FIG. 8b is an example schematic illustration of the example environment 800 at a time $T_2$. The example schematic illustration of FIG. 8b includes the first vehicle 802, the second vehicle 804, the third vehicle 806, the fourth vehicle 808, the target vehicle 810, and the exit 812. In the illustrated example environment of FIG. 8b, the first vehicle 802 is an autonomous vehicle supporting V2X communication and includes the environment analyzer 104a as well as sensors to generate data from the environment. In the example schematic illustration of FIG. 8b, the second vehicle 804, the third vehicle 806, and the fourth vehicle 808 are automotive vehicles. The second vehicle 804 and the fourth vehicle 808 include sensors to generate data from the environment. The second vehicle 804 and the fourth vehicle 408 support V2X communication. The second vehicle 804 includes the environment analyzer 104b and the fourth vehicle 808 includes the environment analyzer 104c. The third vehicle 806 supports at least V2V communication. The third vehicle 806 includes the data generator 200. In the example schematic illustration of FIG. 8b, the target vehicle 810 is a legacy automotive vehicle that does not support any inter-vehicular communication. In alternative examples, the target vehicle 810 supports at least V2V communication.

In the example schematic illustration of FIG. 8b, the environment analyzer 104a generates a first path plan 814 for the first vehicle 802. The first path plan 814 is generated to move the first vehicle 802 from the environment 800 to the exit 812. The environment analyzer 104a identifies that sensor data is missing for the target vehicle 810. The environment analyzer 104a determines that the missing sensor data is due to an impairment. The impairment is due to the third vehicle 806 blocking the FOV of the first vehicle 802. The environment analyzer 104a identifies nodes in the environment that can provide sensor data for the target vehicle 810. The environment analyzer 104a identifies nodes in the environment based on the relative location of the nodes in the environment to the first vehicle 802. For example, the environment analyzer 104a determines that the second vehicle 804 and the fourth vehicle 808 have a better FOV of target vehicle 810 than the first vehicle 802 because the second vehicle 804 is behind the first vehicle 802 and in an adjacent lane to the first vehicle 802 closer to the target vehicle 810 and the fourth vehicle 808 is behind the first vehicle 802 and in an adjacent lane to the first vehicle 802 closer to the target vehicle 810. The environment analyzer 104a prepares and transmits a request. Because the last known state of the target vehicle 810 intersects with the first path plan 814, the request is a high priority request. The request includes a data field that indicates the request is for 2 vehicles and that the request is for the second vehicle 804 based on a first attribute of the second vehicle 804 (e.g., grey autonomous vehicle). The request also includes a data field that indicates the request is for the fourth vehicle 808 based on a second attribute of the fourth vehicle 808 (e.g., blue autonomous vehicle). The request also includes a data field that specifies the type of data requested (e.g., sensor data, state estimates, second profile, second data, etc.) and a third attribute of the target vehicle 810 (e.g., red legacy vehicle).

The environment analyzer 104a transmits the request to the identified nodes in the environment (e.g., the second vehicle 804 and the fourth vehicle 808). The environment analyzer 104b and the environment analyzer 104c detect the request and prepares a response to the request. The response to the request includes a data field that indicates the response is for the node in the network that transmitted the request. The data field indicates the response is for the requesting vehicle (e.g., the first vehicle 802) based on attribute of the first vehicle 802 (e.g., small, grey autonomous vehicle). The response also includes the requested data (e.g., sensor data, state estimates, second profile, second data, etc.). The response indicates that the requested data is for the missing object based on an attribute of the missing object (e.g., red legacy vehicle). The environment analyzer 104b and the environment analyzer 104c compress the response to the request and transmit the response to the request over a network infrastructure (e.g., WLAN, cellular network, etc.).

The environment analyzer 104a obtains the response to the request from the environment analyzer 104b and the environment analyzer 104c. The environment analyzer 104a transforms the sensor data from the environment analyzer 104b and the sensor data from the environment analyzer 104c to the vantage point of the first vehicle 802. The environment analyzer 104a fuses the transformed sensor data and the sensor data generated by the first vehicle 802 into an updated first perspective. The environment analyzer 104a tracks the objects in the environment 800 (e.g., the second vehicle 804, the third vehicle 806, the fourth vehicle 808) and now the target vehicle 810 despite the impairment of the third vehicle 806 blocking the target vehicle 810. The environment analyzer 104a determines the state of the environment 800 based on the fused sensor data as well as the state estimates from the environment analyzer 104b and the environment analyzer 104c. The environment analyzer 104a determines whether the trajectory of the target vehicle 810 intersects with the first path plan 814 of the first vehicle 802. In the example, the trajectory of the target vehicle 810 intersects the first path plan 814 of the first vehicle 802. Because the trajectory of the target vehicle 810 intersects the first path plan 814 of the first vehicle 802, the environment analyzer 104a cancels the first path plan and recomputes a second path plan that does not intersect with the trajectory of the target vehicle 810. In some examples, the environment analyzer 104a requests data on the missing object from the third vehicle 806 over V2V communications.

Figure 8C:
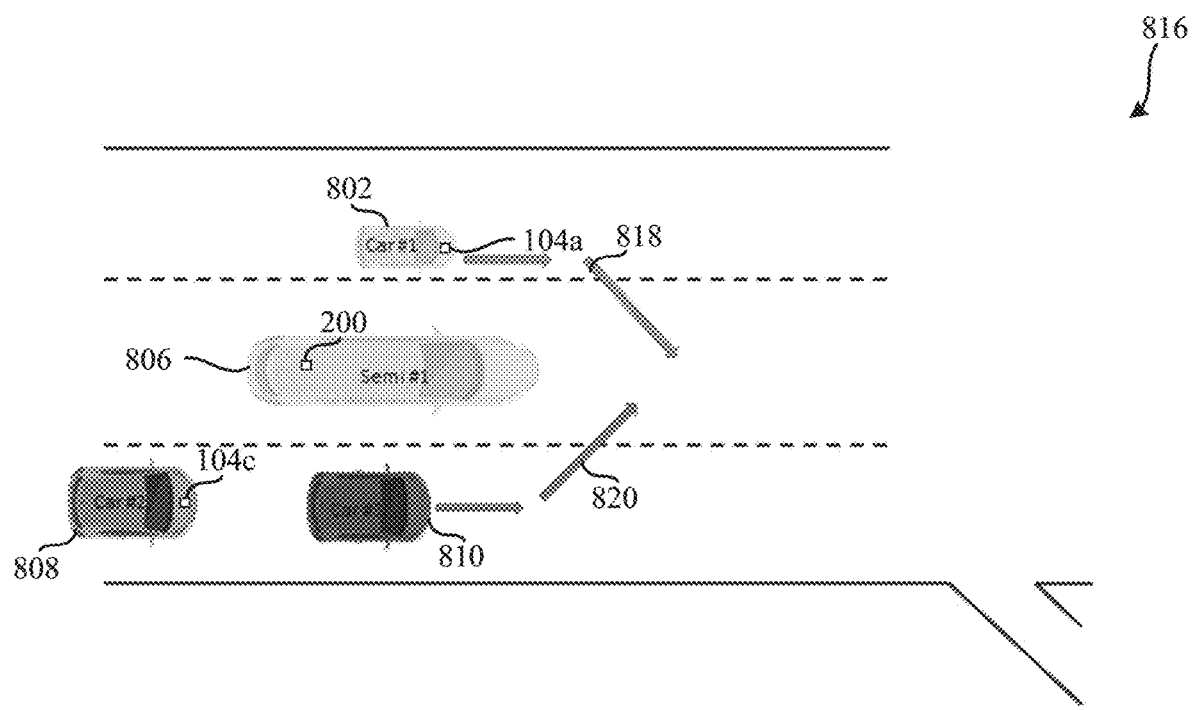

FIG. 8c is an example schematic illustration of the example environment 816. The example schematic illustration of FIG. 8c includes the first vehicle 802, the third vehicle 806, the fourth vehicle 808, and the target vehicle 810. In the illustrated example environment of FIG. 8c, the first vehicle 802 is an autonomous vehicle supporting V2X communication and includes the environment analyzer 104a as well as sensors to generate data from the environment. In the example schematic illustration of FIG. 8c, the third vehicle 806 and the fourth vehicle 808 are automotive vehicles. The second vehicle 804 and the fourth vehicle 808 include sensors to generate data from the environment. The fourth vehicle 408 support V2X communication. The fourth vehicle 808 includes the environment analyzer 104c. The third vehicle 806 supports at least V2V communication. The third vehicle 806 includes the data generator 200. In the example schematic illustration of FIG. 8c, the target vehicle 810 is a legacy automotive vehicle that does not support any inter-vehicular communication. In alternative examples, the target vehicle 810 supports at least V2V communication.

The environment analyzer 104a and the environment analyzer 104c operate as described in conjunction with FIGS. 8a and 8b. In the example illustration of FIG. 8c, the environment analyzer 104a generates a first path plan 818 for the first vehicle 802. The target vehicle 810 generates a second path plan 820. In the illustrated example, the environment analyzer 104a determines the intent of the target vehicle 810 based on the sensor data obtained from the environment analyzer 104c. The environment analyzer 104a determines the intent of the target vehicle 810 based on the state estimate of the environment analyzer 104c. For example, the state estimate of the environment analyzer 104c includes the target vehicle 810 switching lanes via the second path plan 820 because the target vehicle 810 indicates that it is switching lanes (e.g., a turn signal, change in lane position, lateral acceleration, etc.). Because the first path plan 818 and the second path plan 820 intersect, the environment analyzer 104a cancels the first path plan 818 and recomputes a third path plan to avoid intersection.

Figure 8D:
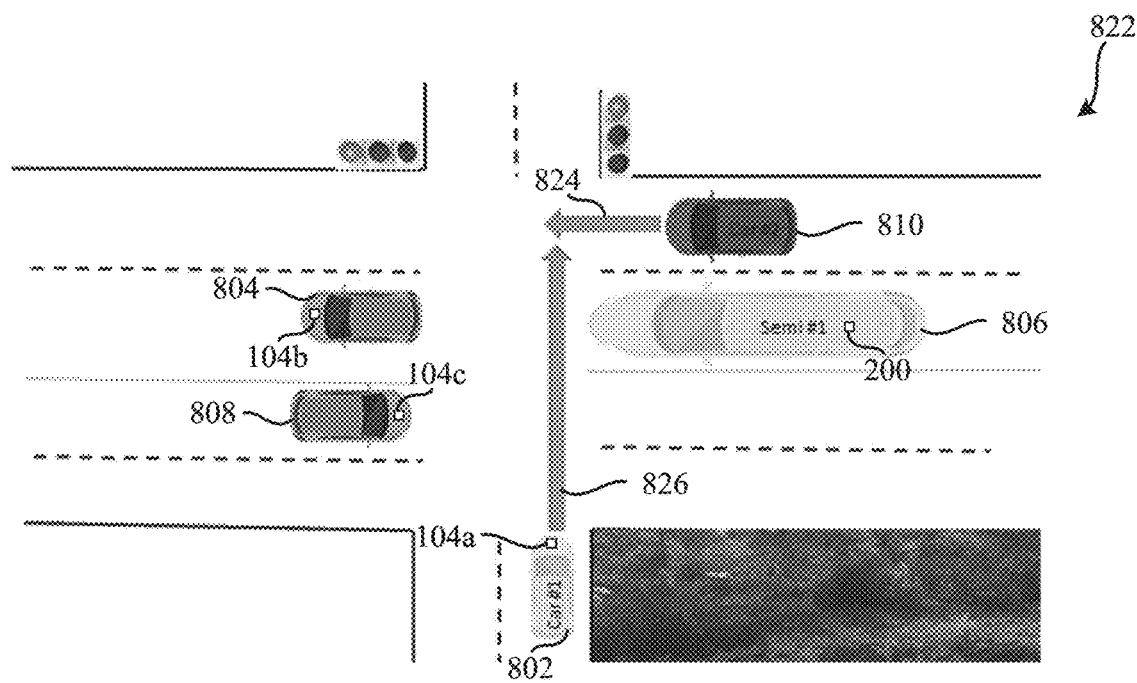

FIG. 8d is an example schematic illustration of the example environment 822. The example schematic illustration of FIG. 8d includes the first vehicle 802, the second vehicle 804, the third vehicle 806, the fourth vehicle 808, the target vehicle 810. In the illustrated example environment of FIG. 8c, the first vehicle 802 is an autonomous vehicle supporting V2X communication and includes the environment analyzer 104a as well as sensors to generate data from the environment. In the example schematic illustration of FIG. 8c, the second vehicle 804, the third vehicle 806, and the fourth vehicle 808 are automotive vehicles. The second vehicle 804 and the fourth vehicle 808 include sensors to generate data from the environment. The second vehicle 804 and the fourth vehicle 408 support V2X communication. The second vehicle 804 includes the environment analyzer 104b and the fourth vehicle 808 includes the environment analyzer 104c. The third vehicle 806 supports at least V2V communication. The third vehicle 806 includes the data generator 200. In the example schematic illustration of FIG. 8c, the target vehicle 810 is a legacy automotive vehicle that does not support any inter-vehicular communication. In alternative examples, the target vehicle 810 supports at least V2V communication.

In the illustrated example of FIG. 8d, the environment analyzer 104a, the environment analyzer 104b, and the environment analyzer 104c operate as described in conjunction with FIGS. 8a, 8b, and 8c. In the example illustration of FIG. 8d, the environment analyzer 104a generates a first path plan 826 for the first vehicle 802. The target vehicle 810 generates a second path plan 824. In the example, the environment analyzer 104a profiles the environment 822. In some examples, the environment analyzer 104a prefetches the profile of the environment 822 from one or more of the environment analyzer 104b or the environment analyzer 104c. Because the environment analyzer 104a profiles the environment 822 or prefetches the profile of the environment 822, the environment analyzer 104a determines that there is a travel lane outside of the FOV of the first vehicle 802. Based on the determination that there is a travel lane outside of the FOV of the first vehicle 802, the first vehicle 802 requests information from the environment analyzer 104b, the environment analyzer 104c, and the third vehicle 806 on any objects in the missing travel lane. One or more of the environment analyzer 104b, the environment analyzer 104c, or the third vehicle 806 transmits a response to the environment analyzer 104a, the response indicates the message is for the first vehicle 802 based on an attribute of the first vehicle 802. The response also indicates that one or more of the sensor data, the state estimates, profiles, etc. for the objects in the missing travel lane, collectively, the second data, based on an attribute of the objects in the missing travel lane (e.g., red vehicle).

In the illustrated example, the environment analyzer 104a determines the intent of the target vehicle 810 based on the sensor data obtained from the environment analyzer 104b, the environment analyzer 104c, and the third vehicle 806. The environment analyzer 104a determines the intent of the target vehicle 810 based on the state estimate of the environment analyzer 104b and the environment analyzer 104c. For example, the state estimates of the environment analyzer 104b and the environment analyzer 104c includes the target vehicle 810 proceeding according to the second path plan 824 because the target vehicle 810 does not indicate that it is switching lanes or changing path (e.g., no turn signal, no change in lane position, no lateral acceleration, etc.). Because the first path plan 826 and the second path plan 824 intersect, the environment analyzer 104a cancels the first path plan 826 and recomputes a third path plan to avoid intersection.

While an example manner of implementing the environment analyzer 104 of FIG. 1 is illustrated in FIGS. 2, 3, 4, and 5, one or more of the elements, processes and/or devices illustrated in FIGS. 2, 3, 4, and 5 may be combined, divided, re-arranged, omitted, eliminated and/or implemented in any other way. Further, the profile generator 202, the example data analyzer 204, the example vehicle control system 206 and/or, more generally, the example environment analyzer 104 of FIG. 1 may be implemented by hardware, software, firmware and/or any combination of hardware, software and/or firmware. Thus, for example, any of the example profile generator 202, the example data analyzer 204, the example vehicle control system 206 and/or, more generally, the example environment analyzer 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example profile generator 202, the example data analyzer 204, the example vehicle control system 206, and/or the example environment analyzer 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example environment analyzer 104 of FIG. 1 may include one or more elements, processes and/or devices in addition to, or instead of, those illustrated in FIGS. 2, 3, 4, and 5 and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the environment analyzer 104 of FIG. 1 is shown in FIGS. 9, 10, 11, 12, 13, and 14. The machine readable instructions may be an executable program or portion of an executable program for execution by a computer processor such as the processor 1512 shown in the example processor platform 1500 discussed below in connection with FIG. 15. The program may be embodied in software stored on a non-transitory computer readable storage medium such as a CD-ROM, a floppy disk, a hard drive, a DVD, a Blu-ray disk, or a memory associated with the processor 1512, but the entire program and/or parts thereof could alternatively be executed by a device other than the processor 1512 and/or embodied in firmware or dedicated hardware. Further, although the example program is described with reference to the flowchart illustrated in FIGS. 9, 10, 11, 12, 13, and 14 many other methods of implementing the example environment analyzer 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operationalamplifier (op-amp), a logic circuit, etc.) structured to perform the corresponding operation without executing software or firmware.

As mentioned above, the example processes of FIGS. 9, 10, 11, 12, 13, and 14 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one of A and at least one of B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least A, (2) at least B, and (3) at least A and at least B. Similarly, as used herein in the context of describing the performance or execution of processes, instructions, actions, activities and/or steps, the phrase "at least one of A or B" is intended to refer to implementations including any of (1) at least A, (2) at least B, and (3) at least A and at least B.

Figure 9:
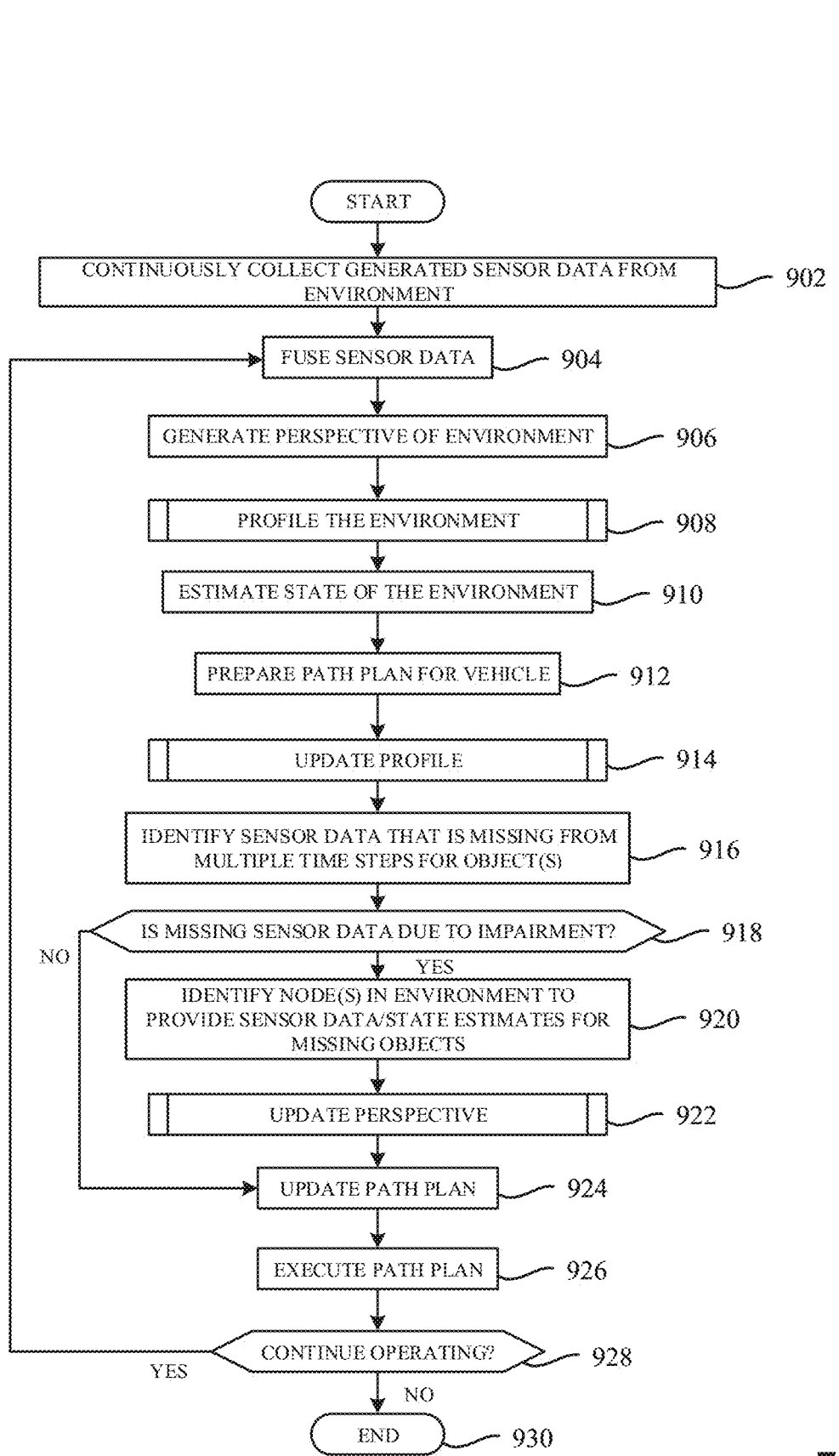
FIG. 9 is a flowchart representative of example machine readable instructions that may be executed to implement the environment analyzer of FIG. 2.

FIG. 9 is a flowchart representative of machine readable instructions that may be executed to implement the environment analyzer 104 of FIG. 2. The example program 900 begins at the block 902. At block 902, the example profile generator 202 continuously collects data generated by the data generator 200. The example profile generator also transmits collected data to the example vehicle control system 206 via the communication bus 210. Next, at block 904, the example vehicle control system 206 fuses the raw sensor data obtained from the example profile generator 202. More specifically, at block 904, the example raw sensor fusor 500 included in the example vehicle control system 206 fuses the raw sensor data obtained from the data generator 200 via the profile generator 202. At block 904, the example raw sensor fusor 500 fuses the sparse or dense point clouds (e.g., the first data, the raw sensor data) obtained from the data generator 200 via the profile generator 202 by transforming the unordered point cloud (e.g., the first data) into an evenly spaced rectangular grid. The raw sensor fusor 500, at block 904, fuses the first data by processing the first data through a deep convolution network.

At block 906, the example vehicle control system 206 generates a first perspective of the environment. More specifically, at block 906, the example raw sensor fusor 500 fuses the first data generated by the data generator 200 into the first perspective of an autonomous vehicle (e.g., the first autonomous vehicle 102, the second autonomous vehicle 106, etc.).

At block 908, the example profile generator 202 profiles the environment (e.g., environment A, environment B, etc.). For example, the profile generator 202 interprets the data generated by the data generator 200 using sensor interpreters. Depending on the sensor, the sensor interpreter changes. For example, for a GPS sensor or a global timer sensor, the sensor interpreter is a software interface (e.g., the Garmin software development kit (SDK)). However, for LIDAR sensor, cameras, or radar sensors, the sensor interpreter is a deep learning system that can analyze the data generated by the LIDAR sensor, the cameras, and/or the radar sensors to generate a perspective of the environment. The deep learning system is, for example, YOLO. In other examples, the deep learning system is a Kalman filter. At block 908, the example profile generator 202 filters the first data for the second data. In the example, the second data is data pertinent to a profile template. At block 908, the profile generator 202 filters the first data generated by the data generator 200 using the sensor interpreters. Additionally, at block 908, the profile generator 202 populates the profile template including data objects defined by a developer of the profile template. At block 908, the example profile generator 202 inputs the second data filtered from the first data by the sensor interpreters into the profile template to generate the first profile. Furthermore, at block 908, the profile generator 202 requests profiles from the nodes in the environment.

At block 910, the example vehicle control system 206 estimates the state of the environment. More specifically, at block 910, the example state determiner/object tracker 506 determines the state of the environment utilizing multimodal probabilistic techniques. For example, at block 910, the state determiner/object tracker 506 determines the state of the environment by applying, for example, a Kalman filter to the first perspective. In other examples, at block 910 the state determiner/object tracker 506 determines the state of the environment by applying a variation of the Kalman filter to the first perspective.

At block 912, the example vehicle control system 206 prepares a path plan for a vehicle (e.g., the first autonomous vehicle 102, the second autonomous vehicle 106, etc.) More specifically, at block 912, the example motion planning engine 508 determines the first path plan for a vehicle based on the state estimate and the trajectory and intent of the objects in the environment. For example, at block 912, the motion planning engine 508 computes a path in the environment that is on the drivable area described in the drivability map 504 and does not intersect with any of the trajectories of the objects in the environment. The motion planning engine 508 determines the first path plan and transmits the first path plan to controller 516.

At block 914, the example data analyzer 204 updates the first profile. At block 914, the example data analyzer 204 compares the first profile generated by a first vehicle with a second profile generated by a second vehicle and additional profiles generated by other autonomous vehicles and other nodes in the environment (e.g., the control center 108). For example, at block 914, the data analyzer 204 analyzes the second profile and the additional profiles via a consistency event check model to remove faulty/incorrect profiles. Moreover, the consistency event check model run by the data analyzer 204 at block 914 filters faulty/incorrect profiles for profile generated within a threshold proximity to the first vehicle and within a threshold amount of time from when the first profile was generated. Filtering the second profile and additional profiles, at block 914, allows the data analyzer 204 to generate a comprehensive profile from the viewpoints of the other nodes in the environment. The example data analyzer 204 additionally compares the first profile with the comprehensive profile, at block 914, using a Euclidian Distance comparison. Other types of suitable comparison algorithms can be used depending on the application. Additionally, based on the comparison, the data analyzer 204, at block 914, determines the significance and the type of the differences between the first profile and the comprehensive profile. For example, at block 914, the data analyzer 204 determines whether the first profile meets a first threshold value of similarity to the comprehensive profile. If the first profile does not meet the first threshold value of similarity to the comprehensive profile, the data analyzer 204, at block 914, classifies the differences between the first profile and the comprehensive profile as an anomaly and transmits, via the first transceiver 208, a notification including the anomaly to the second vehicle and other nodes in the environment (e.g., the control center 108). The data analyzer 204 transmits a notification to the vehicle control system 206 via the communication bus 210 at block 914.

At block 916, the vehicle control system 206 identifies sensor data that is missing from multiple time steps of the generated data. More specifically, at block 916, the example state determiner/object tracker 506 identifies objects in the environment for which sensor data is missing across multiple time steps.

At block 918, the example vehicle control system 206 determines whether the missing sensor data is due to an impairment. More specifically, at block 918, the example state determiner/object tracker 506 determines whether the missing sensor data for objects in the environment is due to an impairment. The example state determiner/object tracker 506, at block 918, determines whether the missing sensor data for objects in the environment is due to an impairment by determining whether the object associated with the missing sensor data has left the first perspective based on the most recent state estimate of the environment. For example, at block 918, the state determiner/object tracker 506 determines based on the past trajectory of the missing object if the missing object is blocked by other objects in the environment, if the missing object has left the environment, if the sensors responsible for collecting the first data for the missing object are unresponsive, etc. If the state determiner/object tracker 506 determines, at block 918, that the missing sensor data for an object in the environment is due to an impairment, the program 900 proceeds to block 920. However, if the state determiner/object tracker 506 determines, at block 918, that the missing sensor data for an object in the environment is not due to an impairment, the program 900 proceeds to block 924.

At block 920, the example vehicle control system 206 identifies nodes in the environment that can provide sensor data and/or state estimates for the missing object in the environment. More specifically, the example state determiner/object tracker 506 identifies the nodes in the environment that can provide sensor data and/or state estimates for the missing object based on the relative locations of the other nodes to the first vehicle. In some example, a node in the environment that is in front of or behind the first vehicle does not suffer from the impairment causing the sensor data to be missing for one or more objects in the environment. At block 920, the state determiner/object tracker 506 identifies the nodes in the environment that can provide sensor data and/or state estimates for the first vehicle by identifying the nodes in the environment that have the best FOV of the missing object. In some examples, a sensor is impaired because there is another vehicle in between the first autonomous vehicle 102 and the missing object.

At block 922, the example vehicle control system 206 updates the first perspective. At block 922, the example vehicle control system 206 prepares a request for data from the identified nodes in the environment. The state determiner/object tracker 506 transmits the request for data to the identified nodes in the environment at block 922. In response to receiving a response to the request for data, at block 922, the raw sensor fusor 500 fuses transformed raw sensor data from the identified nodes with the sensor data collected from the data generator 200 via the profile generator 202. The state determiner/object tracker 506, at block 922, tracks the objects in the environment using the obtained sensor data (e.g., the second data) and estimates the state of the environment. At block 922, the state determiner/object tracker 506 determines whether the trajectory of the missing object intersects with the first path plan of the first vehicle.

At block 924, the example vehicle control system 206 updates the path plan of the vehicle. More specifically, at block 924 the motion planning engine 508 updates the first path plan based on one or more of the first profile, the second profile, additional profiles, the first data, the second data, or additional data from other nodes in the environment. For example, at block 924, the motion planning engine 508 resets the path plan for the first autonomous vehicle 102 to the first path plan. At block 926, the example vehicle control system 206 executes the updated path plan. More specifically, the controller 516 executes the updated path plan via the vehicle interface 518.

At block 928, the vehicle control system 206 determines whether to continue operating. More specifically, the controller 516 determines whether to continue operating, at block 928, based on the previous path plan and state estimate determined by the motion planning engine 508 and the state determiner/object tracker 506, respectively. If the controller 516, at block 928, determines to stop operating, the program 900 proceeds to block 930 and ends. However, if the controller 516 determines to continue operating, at block 928, the program 900 continues to block 904. Examples of previous path plan and state estimate that cause the controller 516 to determine to stop operating include parking the first vehicle and turning the power off, a vehicle accident, etc.

Figure 10:
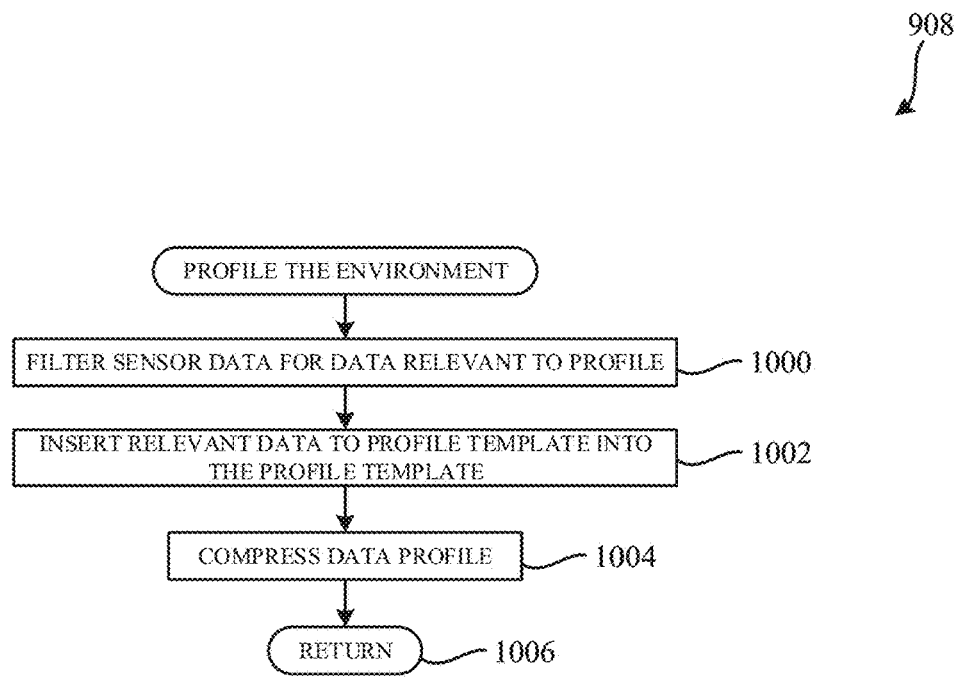
FIG. 10 is a flowchart representative of example machine readable instructions that may be executed to implement the environment analyzer of FIG. 2 to profile an environment.

FIG. 10 is a flowchart representative of machine readable instructions that may be executed to implement the environment analyzer 104 of FIG. 2 to profile an environment at block 908 of the program 900 of FIG. 9. The sub-program of block 908 begins at block 1000 where the profile generator 202 filters the sensor data generated by the data generator 200 for relevant data to the profile template 302. More specifically, at block 1000, the first sensor interpreter 304*a*, the second sensor interpreter 306*a*, the third sensor interpreter 308*a*, and the nth sensor interpreter 310*a* filter the first data generated by the data generator 200 respectively for the second data pertinent to the first data object 304, the second data object 306, the third data object 308, and the nth data object 310 in the profile template 302.

At block 1002, the profile generator 202 inserts the relevant data to the profile template 302 into the profile template 302. More specifically, at block 1002, the data profiler 300 inserts the pertinent data filtered by the first sensor interpreter 304*a*, the second sensor interpreter 306*a*, the third sensor interpreter 308*a*, and the nth sensor interpreter 310*a* into the first data object 304, the second data object 306, the third data object 308, and the nth data object 310, respectively into the profile template 302, generating a first profile of the environment. The first data object 304, the second data object 306, the third data object 308, and the nth data object 310 characterize the environment in which the first profile is generated by the data profiler 300. The first sensor interpreter 304*a*, the second sensor interpreter 306*a*, the third sensor interpreter 308*a*, and the nth sensor interpreter 310*a* reduce the size of the first data from the data generator 200 from 100 MB/s to 199 bits/s by filtering the first data for the second data (e.g., the first data object 304, the second data object 306, the third data object 308, and the nth data object).

At block 1004, the profile generator 202 compresses the first profile. More specifically, the data profiler 300, at block 1004 compresses the first profile before transmitting the first profile to one or more of the first transceiver 208, the data analyzer 204, or the vehicle control system 206. At block 1006, the sub-program of block 908 returns to the program 900 at block 910.

Figure 11:
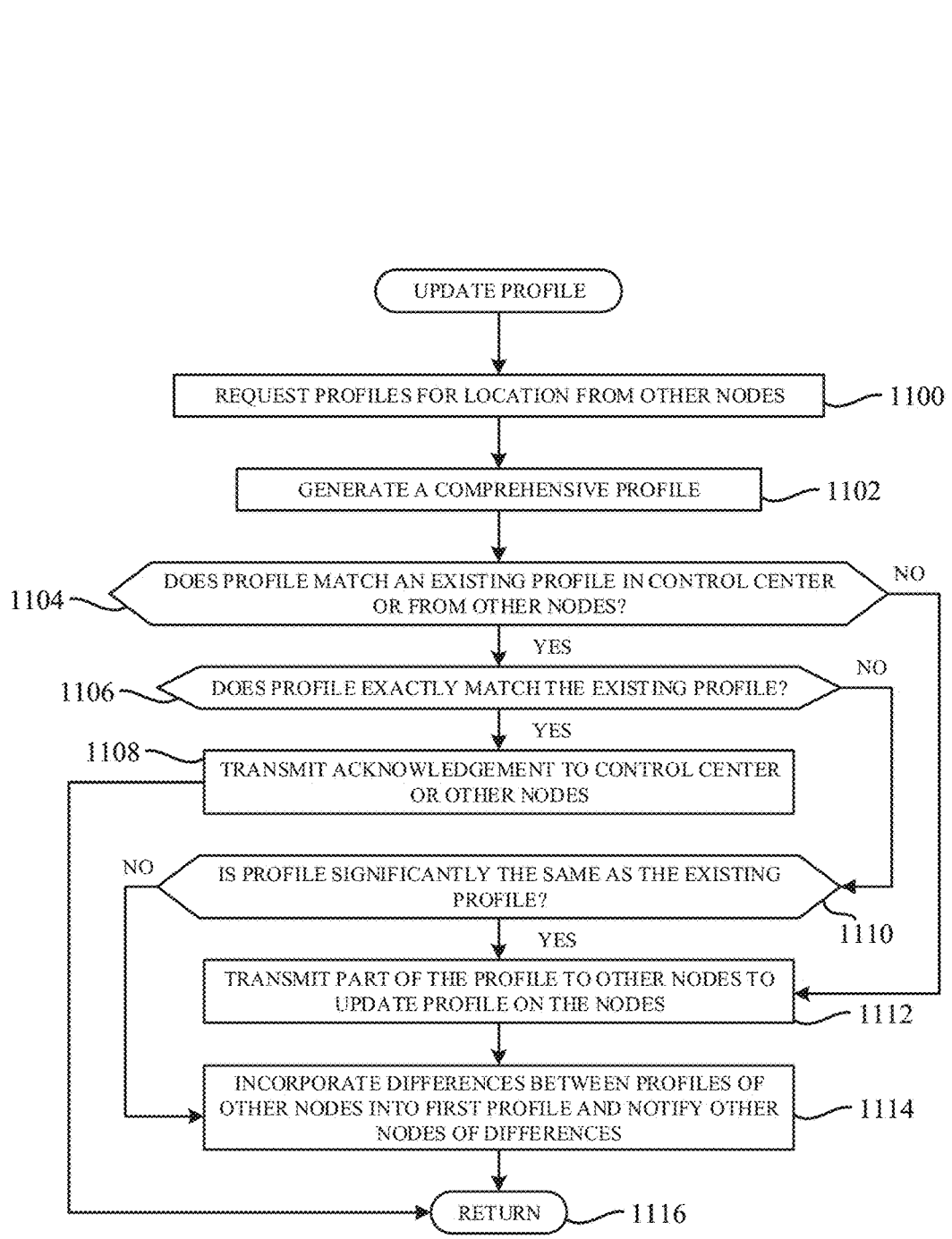
FIG. 11 is a flowchart representative of example machine readable instructions that may be executed to implement the environment analyzer of FIG. 2 to update a profile of an environment.

FIG. 11 is a flowchart representative of machine readable instructions that may be executed to implement the environment analyzer of FIG. 2 to update a profile of an environment at block 914 of the program 900 of FIG. 9. The sub-program of block 914 begins at block 1100 where the data analyzer 204 requests profiles for the environment from the other nodes in the environment. More specifically, at block 1100, the example profile checker 400 requests profiles for the environment from the other nodes in the environment. The profile checker 400 requests profiles from the environment, at block 1100, by transmitting a request to the other nodes in the environment via the transceiver 208. The request indicates that the environment ID (e.g., location ID) for the environment.

At block 1102, the example data analyzer 204 generates a comprehensive profile for the environment. More specifically, at block 1102, the example profile checker 400 analyzes the second profile and the additional profiles via a consistency event check model to remove faulty/incorrect profiles. Moreover, the consistency event check model run by the profile checker 400 at block 1102 filters faulty/incorrect profiles for profile generated within a threshold proximity to the first autonomous vehicle 102 and within a threshold amount of time from when the first profile was generated. Filtering the second profile and additional profiles allows the profile checker 400, at block 1102, to generate the comprehensive profile from the viewpoints of the other nodes in the environment.

At block 1104, the data analyzer 204 determines whether the first profile matches an existing profile from the other nodes in the environment. More specifically, at block 1104, the example digital comparator 402 determines with the first profile matches an existing profile from the other nodes in the environment by comparing the first profile with the comprehensive profile using a Euclidian Distance comparison. At block 1104, the digital comparator 402 compares the first profile with the comprehensive profile to determine whether the first profile matches one or more of the second profile, the additional profiles, or the comprehensive profile. The digital comparator 402, at block 1104, determines the first profile matches one or more of the second profile, the additional profiles, or the comprehensive profile if the first profile meets a first threshold value of profile similarity. If the first profile meets the first threshold value of profile similarity, the sub-program of block 914 proceeds to block 1106. If the digital comparator 402 does not determine that the first profile matches one or more of the second profile, the additional profiles, or the comprehensive profile, the digital comparator generates a signal indicating that the anomaly detector 404, the sub-program of block 914 proceeds to block 1112.

At block 1106, the data analyzer 204 determines whether the first profile exactly matches one or more of the second profile, the additional profiles, or the comprehensive profile. More specifically, at block 1106, the digital comparator 402 determines whether the first profile exactly matches one or more of the second profile, the additional profiles, or the comprehensive profile. The digital comparator 402, at block 1106, determines the first profile exactly matches one or more of the second profile, the additional profiles, or the comprehensive profile is the first profile meets a second threshold of profile similarity. The second threshold of profile similarity higher than the first threshold of profile similarity. If the first profile meets the second threshold value of similarity (block 1106: YES), the digital comparator 402 generates a signal to the anomaly detector 404 that indicates the anomaly detector 404, at block 1108, is to transmit an acknowledgement to the other nodes in the environment that the first profile is exactly the same as one or more of the second profile, the additional profiles, or the comprehensive profile. If the first profile does not meet the second threshold value of profile similarity (block 1106: NO), the digital comparator 402 transmits a signal to the anomaly detector 404 that the first profile does not meet the second threshold value of similarity and the sub-program of block 914 proceeds to block 1110.

At block 1108, the data analyzer 204 transmits an acknowledgement to the other nodes in the environment that the first profile is exactly the same as one or more of the second profile, the additional profiles, or the comprehensive profile. More specifically, at block 1108, the anomaly detector 404 transmits the acknowledgement to the other nodes in the environment that the first profile is exactly the same as one or more of the second profile, the additional profiles, or the comprehensive profile. Next, the sub-program of block 914 proceeds from block 1108 to block 1116.

At block 1110, the data analyzer 204 determines whether the first profile is significantly the same as one or more of the second profile, the additional profiles, or the comprehensive profile. More specifically, at block 1110, the anomaly detector 404 determines whether the first profile is significantly the same as one or more of the second profile, the additional profiles, or the comprehensive profile. At block 1110, the anomaly detector 404 detects differences between the first profile and one or more of the second profile, the additional profiles, or the comprehensive profile. The anomaly detector 404, at block 1110, determines the significance and the type of the differences between the first profile and one or more of the second profile, the additional profiles, or the comprehensive profile based on the comparison between the first profile, the second profile, the additional profiles, and the comprehensive profile. The anomaly detector 404, at block 1110, determines whether the first profile is significantly the same as one or more of the second profile, the additional profiles, or the comprehensive profile. For example, the anomaly detector 404, at block 1110, determines the first profile is significantly the same as one or more of the second profile, the additional profiles, or the comprehensive profile if the first profile meets a third threshold value of profile similarity to one or more of the second profile, the additional profiles, or the comprehensive profile. The third threshold value of profile less than the first threshold value of profile similarity. If the first profile does not meet the third threshold value of profile similarity to one or more of the second profile, the additional profiles, or the comprehensive profile (block 1110: NO), the sub-program of block 914 proceeds to block 1114. If the first profile does meet the third threshold value of profile similarity to one or more of the second profile, the additional profiles, or the comprehensive profile (block 1110: YES), the sub-program of block 914 proceeds to block 1112.

At block 1112, the data analyzer 204 transmits a part of the first profile to the other nodes in the environment to update the profiles in the other nodes. More specifically, at block 1112, the anomaly detector 404 transmits a part of the first profile to the other nodes in the environment to update the profiles in the other nodes. In a first examples, the first profile is 50% the same as one or more of the second profile, the additional profiles, or the comprehensive profile. In the first example, the anomaly detector 404, at block 1112, transmits the 50% of the first profile that is the same as one or more of the second profile, the additional profiles, or the comprehensive profile to one or more of the second profile, the additional profiles, or the comprehensive profile. In a second examples, the first profile is 75% the same as one or more of the second profile, the additional profiles, or the comprehensive profile. In the second example, the anomaly detector 404, at block 1112, transmits the 75% of the first profile that is the same as one or more of the second profile, the additional profiles, or the comprehensive profile to one or more of the second profile, the additional profiles, or the comprehensive profile. In a third examples, the first profile is 100% the same as one or more of the second profile, the additional profiles, or the comprehensive profile. In the third example, the anomaly detector 404, at block 1112, transmits the first profile to one or more of the second profile, the additional profiles, or the comprehensive profile.

At block 1114, the data analyzer 204 incorporates the differences between the first profile and one or more of the second profile, the additional profiles, or the comprehensive profile and notifies other nodes in the environment of the differences. More specifically, at block 1114, the anomaly detector 404 incorporates the differences between the first profile and one or more of the second profile, the additional profiles, or the comprehensive profile and notifies other nodes in the environment of the differences. At block 1114, the anomaly detector 404 classifies the differences between the first profile and one or more of the second profile, the additional profiles, or the comprehensive profile as an anomaly and transmits, via the first transceiver 208, a notification including the anomaly to the other nodes in the environment (e.g., the second autonomous vehicle 106, the control center 108, etc.). Additionally, at block 1114, the anomaly detector 404 transmits the notification to the vehicle control system 206 via the communication bus 210. At block 1116, the sub-program of block 914 returns to the program 900 at block 918.

Figure 12:
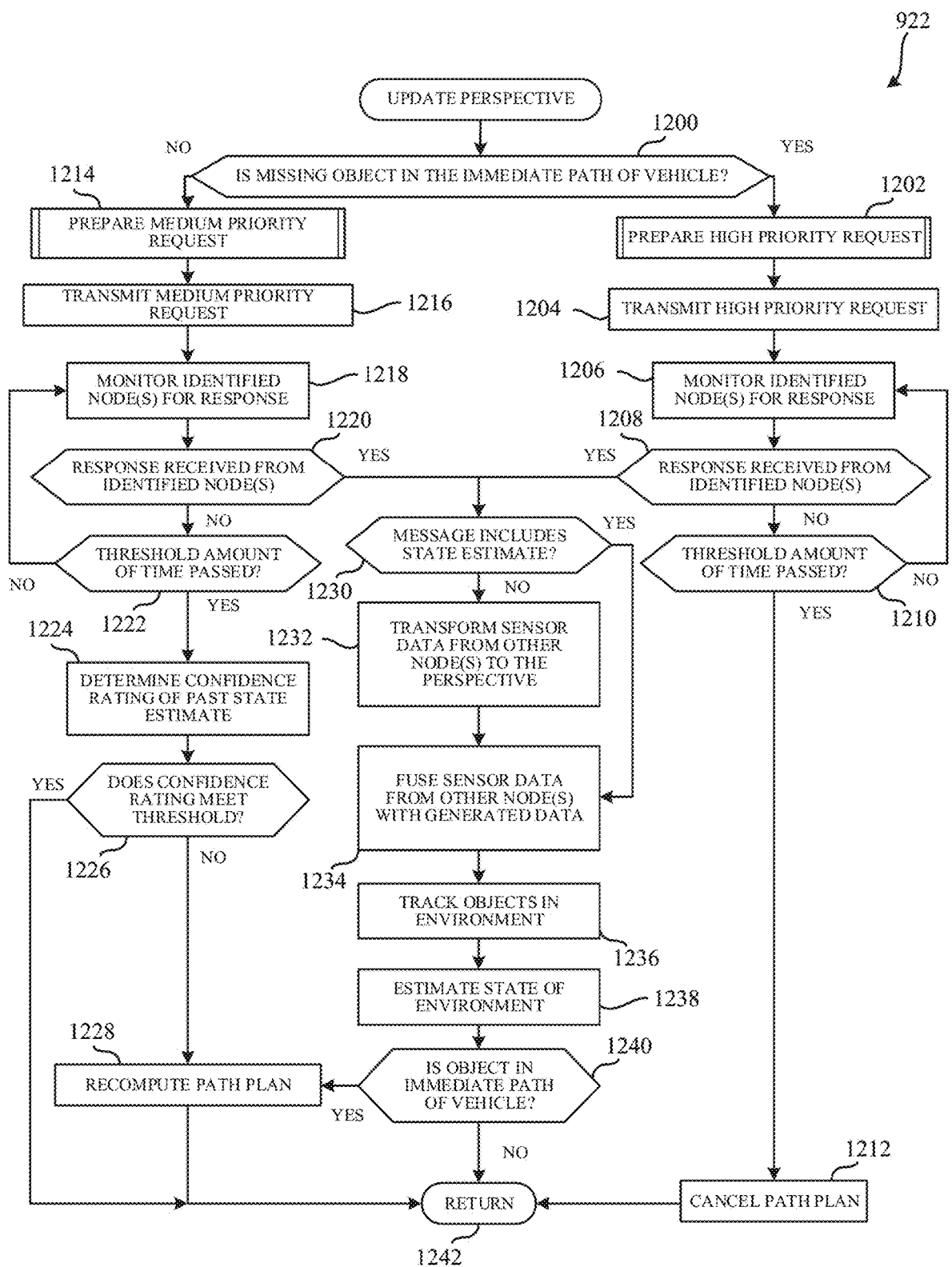
FIG. 12 is a flowchart representative of example machine readable instructions that may be executed to implement the environment analyzer of FIG. 2 to update a perspective of an environment.

FIG. 12 is a flowchart representative of machine readable instructions that may be executed to implement the environment analyzer 104 of FIG. 2 to update a perspective of an environment at block 922 of the program 900 of FIG. 9.

The sub-program of block 922 begins at block 1200 where the vehicle control center 206 determines whether the missing object is in the immediate path of the first vehicle. More specifically, at block 1200, the state determiner/object tracker 506 determines whether the missing object is in the immediate path of the first vehicle. The example state determiner/object tracker 506, at block 1200, determines the trajectory and intent of the objects in the environment (e.g., environment A, environment B, etc.). Based on a past state estimate (e.g., a state estimate including the missing object), the example state determiner/object tracker 506, at block 1200, determines whether the trajectory and intent of the missing object intersects with the first path plan for the first vehicle. If the trajectory and intent of the missing object intersects with the first path plan (block 1200: YES) the sub-program of block 922 proceeds to block 1202. If the trajectory and intent of the missing object do not intersect with the first path plan (block 1200: NO) the sub-program of block 922 proceeds to block 1214.

At block 1202, the vehicle control system 206 prepares a high priority request to transmit to the identified nodes in the environment. The high priority request identifies the nodes in the environment based on an first attribute of the nodes (e.g., pseudonyms, physical attributes, etc.). Additionally, the high priority request also indicates the missing object for which the identified nodes in the environment are to respond with one or more of sensor data or state estimates. The high priority request indication the missing object based on a second attribute of the missing object.

At block 1204, the vehicle control system 206 transmits the high priority request to the identified nodes in the environment via the first transceiver 208. More specifically, the state determiner/object tracker 506, at block 1204, transmits the high priority request to the first transceiver 208 via the control system bus 520 and the communication bus 210. The first transceiver 208 forwards the high priority requests to the identified nodes in the environment.

At block 1206, the vehicle control system 206 monitors the identified nodes for a response to the request. More specifically, at block 1206, the example first observer input 510a, the example second observer input 510b, the example third observer input 510c, the example nth−2 observer input 510d, the example nth−1 observer input 510e, and the example nth observer input 510f monitor the identified nodes in the environment for a response to the request. The response is to include second data from the identified nodes in the environment. In the example the second data includes one or more of state estimates for the missing objects or raw sensor data for the missing objects in the environment.

At block 1208, the vehicle control system 206 determines whether the response to the request has been received from the identified nodes. More specifically, at block 1208, the example first observer input 510a, the example second observer input 510b, the example third observer input 510c, the example nth−2 observer input 510d, the example nth−1 observer input 510e, and the example nth observer input 510f determine whether the response to the request has been received from the identified nodes. If no response has been received (block 1208: NO), the sub-program of block 922 proceeds to block 1210. If a response has been received (block 1208: YES), the sub-program of block 922 proceeds to block 1230.

At block 1210, the vehicle control system 206 determines whether a first threshold amount of time has passed between the transmission of the request and the current time step. More specifically, at block 1210, the example first observer input 510a, the example second observer input 510b, the example third observer input 510c, the example nth-2 observer input 510d, the example nth-1 observer input 510e, and the example nth observer input 510f determine whether the first threshold amount of time has passed between the transmission of the request and the current time step. In the example the first threshold amount of time is very short because the request is high priority. If the first threshold amount of time has not passed (block 1210: NO) the sub-program of block 922 proceeds to block 1206. If the first threshold amount of time has passed (block 1210: YES) one or more of the example first observer input 510a, the example second observer input 510b, the example third observer input 510c, the example nth-2 observer input 510d, the example nth-1 observer input 510e, or the example nth observer input 510f transmit a signal indicating the first threshold amount of time has passed the motion planning engine 508 over the control system bus 520 and the sub-program of block 922 proceeds to block 1212.

At block 1212, the vehicle control system 206 cancels the first path plan. More specifically, at block 1212, the motion planning engine 508 cancels the first path plan. After cancelling the first path plan, the motion planning engine 508 After block 1212, the sub-program of block 922 proceeds to block 1242.

The sub-program of block 922 proceeds to block 1214 if the trajectory and intent of the missing object do not intersect with the first path plan (block 1200: NO). At block 1214, the vehicle control system 206 prepares a medium priority request to transmit to the identified nodes in the environment. The medium priority request identifies the nodes in the environment based on a first attribute of the nodes (e.g., pseudonyms, physical attributes, etc.). Additionally, the medium priority request also indicates the missing object for which the identified nodes in the environment are to respond with one or more of sensor data or state estimates. The medium priority request indication the missing object based on a second attribute of the missing object.

At block 1216, the vehicle control system 206 transmits the medium priority request to the identified nodes in the environment via the first transceiver 208. More specifically, the state determiner/object tracker 506, at block 1216, transmits the medium priority request to the first transceiver 208 via the control system bus 520 and the communication bus 210. The first transceiver 208 forwards the medium priority requests to the identified nodes in the environment.

At block 1218, the vehicle control system 206 monitors the identified nodes for a response to the request. More specifically, at block 1218, the example first observer input 510a, the example second observer input 510b, the example third observer input 510c, the example nth-2 observer input 510d, the example nth-1 observer input 510e, and the example nth observer input 510f monitor the identified nodes in the environment for a response to the request. The response is to include second data from the identified nodes in the environment. In the example the second data includes one or more of state estimates for the missing objects or raw sensor data for the missing objects in the environment.

At block 1220, the vehicle control system 206 determines whether the response to the request has been received from the identified nodes. More specifically, at block 1220, the example first observer input 510a, the example second observer input 510b, the example third observer input 510c, the example nth-2 observer input 510d, the example nth-1 observer input 510e, and the example nth observer input 510f determine whether the response to the request has been received from the identified nodes. If no response has been received (block 1220: NO), the sub-program of block 922 proceeds to block 1222. If a response has been received (block 1220: YES), the sub-program of block 922 proceeds to block 1230.

At block 1222, the vehicle control system 206 determines whether a second threshold amount of time has passed between the transmission of the request and the current time step. More specifically, at block 1222, the example first observer input 510a, the example second observer input 510b, the example third observer input 510c, the example nth-2 observer input 510d, the example nth-1 observer input 510e, and the example nth observer input 510f determine whether the second threshold amount of time has passed between the transmission of the request and the current time step. In the example the second threshold amount of time is longer than the first threshold because the request is medium priority. If the second threshold amount of time has not passed (block 1222: NO) the sub-program of block 922 proceeds to block 1218. If the second threshold amount of time has passed (block 1222: YES) one or more of the example first observer input 510a, the example second observer input 510b, the example third observer input 510c, the example nth-2 observer input 510d, the example nth-1 observer input 510e, or the example nth observer input 510f transmit a signal indicating the second threshold amount of time has passed the state determiner/object tracker 506 over the control system bus 520 and the sub-program of block 922 proceeds to block 1224.

At block 1224, the vehicle control system 206 determines a confidence rating for the most recent state estimate of the environment. More specifically, at block 1224, the state determiner/object tracker 506 determines a confidence rating for the most recent state estimate of the environment. The confidence rating of the state estimate is diminished in proportion to the number of time steps for which the sensor data corresponding to the object has been missing. For example, if an object has been missing for 5 time steps, the confidence rating is high; however, if the object has been missing for 50 time steps, the confidence rating is low.

At block 1226, the vehicle control system 206 determines whether the confidence rating of the past state estimate meets a confidence threshold. More specifically, at block 1226, the state determiner/object tracker 506 determines whether the confidence rating of the past state estimate meets a confidence threshold. At block 1226, the state determiner/object tracker 506 compares the confidence rating for the past state estimate to the confidence threshold. If the confidence rating for the past state estimate is below the confidence threshold (block 1226: NO), the sub-program of block 922 proceeds to block 1228. If the confidence rating for the past state estimate is at or above the confidence threshold (block 1226: YES), the sub-program of block 922 proceeds to block 1242.

At block 1228, the vehicle control system 206 recomputes the path plan for the first vehicle. More specifically, at block 1228, the motion planning engine 508 determines a second path plan based on one or more of the sensor data generated by the data generator 200, the sensor data obtained from the identified nodes, the state estimates obtained from the identified nodes, the first profile, or other profile obtained from other nodes.

If a response to the high priority request has been received (block 1208: YES), or if a response to the medium priority request has been received (block 1220: YES) the sub-program of block 922 proceeds to block 1230. At block 1230, the vehicle control system 206 determines whether the response to the request includes state estimated for the missing object. More specifically, at block 1230, the example first observer input 510a, the example second observer input 510b, the example third observer input 510c, the example nth-2 observer input 510d, the example nth-1 observer input 510e, and the example nth observer input 510f determine whether the response to the request includes state estimated for the missing object. If the response to the request includes state estimates (block 1230: YES), the sub-program of block 922 proceeds to block 1236. If the response to the request does not include state estimates (block 1230: NO), the sub-program of block 922 proceeds to block 1232.

At block 1232, the vehicle control system 206 transforms the sensor data from the identified nodes to the first perspective. More specifically, at block 1232, the first rigid transformer 512a, the second rigid transformer 512b, and the third rigid transformer 512c transform the sensor data from the identified nodes to the first perspective. The sub-program of block 922 proceeds to block 1234.

At block 1234, the vehicle control system 206 fuses the transformed sensor data and the sensor data generated by the data generator 200. More specifically, at block 1234, the raw sensor fusor 500 fuses the transformed sensor data and the sensor data generated by the data generator 200.

At block 1236, the vehicle control system 206 tracks objects in the environment. More specifically, at block 1236, the state determiner/object tracker 506 tracks the objects in the environment using one or more of the raw sensor data obtained from the identified nodes fused with the raw sensor data generated by the data generator 200 or the state estimates obtained from the identified nodes. At block 1238, the vehicle control system 206 estimates the state of the environment. More specifically, at block 1236, the state determiner/object tracker 506 estimates the state of the environment.

At block 1240, the vehicle control system 206 determines whether the missing object is in the immediate path of the first vehicle. More specifically, at block 1240, the state determiner/object tracker 506 determines whether the missing object is in the immediate path of the first vehicle based on the updated state estimates and object tracking. If the missing object is in the immediate path of the vehicle (block 1240: YES), the sub-program of block 922 proceeds to block 1228. If the missing object is not in the immediate path of the vehicle (block 1240: NO), the sub-program of block 922 proceeds to block 1242. At block 1242, the sub-program of block 922 returns to the program 900 at block 924.

Figure 13:
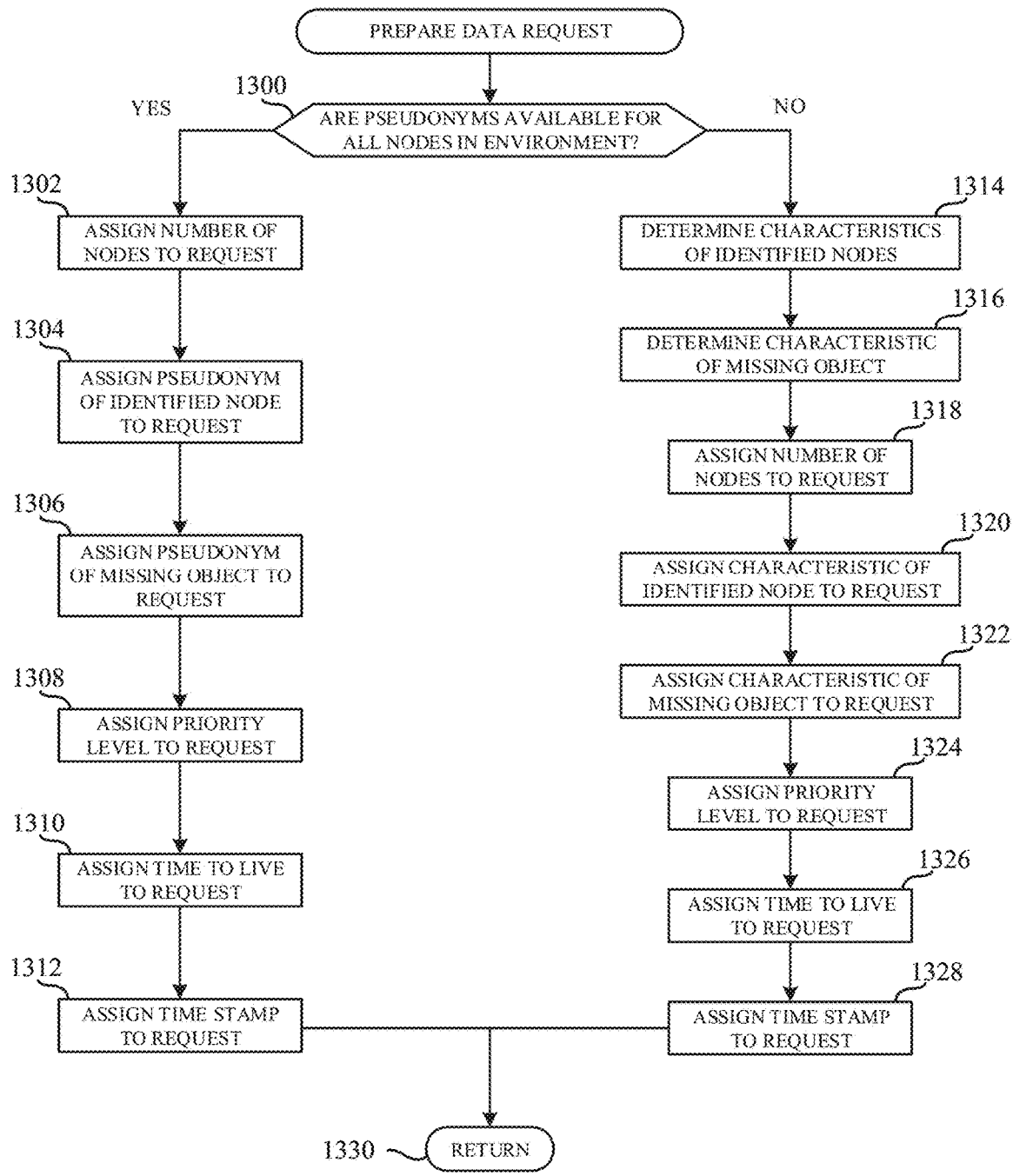
FIG. 13 is a flowchart representative of example machine readable instructions that may be executed to implement the vehicle control system of FIG. 2 to prepare a data request.

FIG. 13 is a flowchart representative of machine readable instructions that may be executed to implement the vehicle control system 206 of FIG. 2 to prepare a data request 600 at block 1202 and/or block 1214 of the sub-program of block 922 of FIG. 12. The sub-program of block 1202 and or block 1214 begins at block 1300 where the state determiner/object tracker 506 determines whether there are pseudonyms for all of the identified nodes in the environment and the missing object. For example, at block 1300, the state determiner/object tracker 506 can determine based whether the scene analyzer 502 detected pseudonyms for all of the identified nodes in the environment and the missing object based on analyzing the fused sensor data and or an indication from an infrastructure node (e.g., the control center 108) that there are pseudonyms for all of the identified nodes and the missing object. If either (a) one of the identified nodes in the environment or (b) the missing object does not have a corresponding pseudonym (block 1300: NO), the sub-program of block 1202 and/or block 1214 proceeds to block 1314. If all of the identified nodes in the environment and the missing object has a corresponding pseudonym (block 1300: YES), the sub-program of block 1202 and/or block 1214 proceeds to block 1302.

At block 1302, the state determine/object tracker 506 assigns a number of nodes that the request for data is to be transmitted to. For example, the state determiner/object tracker 506 populates the number of nodes field 710. At block 1302, the state determine/object tracker 506 assigns the number of nodes to the request based on the nodes in the environment identified to have a better FOV of the missing object than the first autonomous vehicle 102.

At block 1304, the state determiner/object tracker 506 assigns the pseudonym for each of the identified nodes to the request for data. For example, the state determiner/object tracker 506 populates the example first pseudonym of the identified node field 712. At block 1306, the state determiner/object tracker 506 assigns the pseudonym of the missing object to the request for data. For example, the state determiner/object tracker 506 populates the example message request field 716. The message request field 716 indicates to the identified nodes in the environment that receive the request for data that the identified node(s) is/are to collect one or more of the sensor data or state estimates for the missing object and transmit one or more of the sensor data or the state estimates to the requesting entity (e.g., the first autonomous vehicle 102, the second autonomous vehicle 106, the control center 108). In this way, the state determiner/object tracker 506 and more generally, the environment analyzer 104 can request data for an individual object in the environment specified by an attribute (e.g., a pseudonym) of the object.

At block 1308, the state determine/object tracker 506 assigns a priority level to the request for data. For example, the state determine/object tracker 506 populates the network header field 704 with transparent data describing the information included in the request for data. The transparent data includes the priority level of the request. In some examples, the priority level of the request is high if the trajectory and intent of the missing object intersect with the first path plan of a vehicle (e.g., the first autonomous vehicle 102, the second autonomous vehicle 106, etc.). In other examples the priority level of the request is medium if the trajectory and intent of the missing object do not intersect with the first path plan of the vehicle (e.g., the first autonomous vehicle 102, the second autonomous vehicle 106, etc.).

At block 1310, the state determine/object tracker 506 assigns a time to live to the request. For example, the state determine/object tracker 506 populates the time to live field 708. The time to live field 708 indicates the amount of time that the request for data is to be active. In examples where the priority level is high, the time to live is short. The short time to live indicates that the request for data is only relevant for a short amount of time. In examples where the priority level is medium, the time to live is longer than the time to live for a high priority request. The longer time to live indicates that the request for data is relevant for a longer amount of time. If an identified node processes the request for data after the time to live has expired, the identified node will determine that a response to the request for data is irrelevant. Alternatively, if an identified node processes the request for data before the time to live has expired, the identified node determines that the response to the request for data is relevant and prepares a response to the request for data.

At block 1312, the state determine/object tracker 506 assigns a time stamp to the request for data. For example, the state determine/object tracker 506 populates the timestamp field 706. The timestamp field 706 indicates the time at which the request for data was prepared and transmitted to the identified nodes in the environment, via the first transceiver 208, by the state determine/object tracker 506. The timestamp field 706 is populated using data (e.g., global timer data) generated by the data generator 200. From block 1312, the sub-program of block 1202 and/or block 1214 proceeds to block 1330.

At block 1314, the scene analyzer 502 determines a characteristic of the identified nodes. At block 1316, the scene analyzer 502 determines a characteristic of the missing object. For example, the characteristics of the identified nodes and missing object are physical characteristics of the identified nodes and missing object (e.g., size, make, model, manufacturer, color, license plate number). Other suitable characteristics may be used to identify the missing object or identified nodes in the request. The scene analyzer 502 determines a characteristic of the identified nodes, at block 1314, and the missing object, at block 1316, by analyzing the first perspective generated by the raw sensor fusor 500. Based on an analysis of the first perspective, the scene analyzer 502 characterizes the objects (e.g., the other nodes in the environment).

At block 1318, the state determine/object tracker 506 assigns a number of nodes that the request for data is to be transmitted to. For example, the state determiner/object tracker 506 populates the number of nodes field 610. At block 1318, the state determine/object tracker 506 assigns the number of nodes to the request based on the nodes in the environment identified to have a better FOV of the missing object than the first autonomous vehicle 102. At block 1320, the state determiner/object tracker 506 assigns a characteristic of the identified node(s) to the request for data. For example, the state determiner/object tracker 506 populates the example first characteristic of the identified node field 612. At block 1322, the state determiner/object tracker 506 assigns a characteristic of the missing object to the request for data. For example, the state determiner/object tracker 506 populates the example message request field 616. The message request field 616 indicates to the identified nodes in the environment that receive the request for data that the identified node(s) is/are to collect one or more of the sensor data or state estimates for the missing object and transmit one or more of the sensor data or the state estimates to the requesting entity (e.g., the first autonomous vehicle 102, the second autonomous vehicle 106, the control center 108). In this way, the state determiner/object tracker 506 and more generally, the environment analyzer 104 can request data for an individual object in the environment specified by an attribute (e.g., a characteristic) of the object.

At block 1324, the state determine/object tracker 506 assigns a priority level to the request for data. For example, the state determine/object tracker 506 populates the network header 604 with transparent data describing the information included in the request for data. The transparent data includes the priority level of the request. In some examples, the priority level of the request is high if the trajectory and intent of the missing object intersect with the first path plan of a vehicle (e.g., the first autonomous vehicle 102, the second autonomous vehicle 106, etc.). In other examples the priority level of the request is medium if the trajectory and intent of the missing object do not intersect with the first path plan of the vehicle (e.g., the first autonomous vehicle 102, the second autonomous vehicle 106, etc.).

At block 1326, the state determine/object tracker 506 assigns a time to live to the request. For example, the state determine/object tracker 506 populates the time to live field 608. The time to live field 608 indicates the amount of time that the request for data is to be active. In examples where the priority level is high, the time to live is short. The short time to live indicates that the request for data is only relevant for a short amount of time. In examples where the priority level is medium, the time to live is longer than the time to live for a high priority request. The longer time to live indicates that the request for data is relevant for a longer amount of time. If an identified node processes the request for data after the time to live has expired, the identified node will determine that a response to the request for data is irrelevant. Alternatively, if an identified node processes the request for data before the time to live has expired, the identified node determines that the response to the request for data is relevant and prepares a response to the request for data.

At block 1328, the state determine/object tracker 506 assigns a time stamp to the request for data. For example, the state determine/object tracker 506 populates the timestamp field 606. The timestamp field 604 indicates the time at which the request for data was prepared and transmitted to the identified nodes in the environment, via the first transceiver 208, by the state determine/object tracker 506. The timestamp field 606 is populated using data (e.g., global timer data) generated by the data generator 200. At block 1330, the sub-program of block 1202 and/or block 1214 returns to the sub-program of block 922 at block 1204 and/or block 1216.

Figure 14:
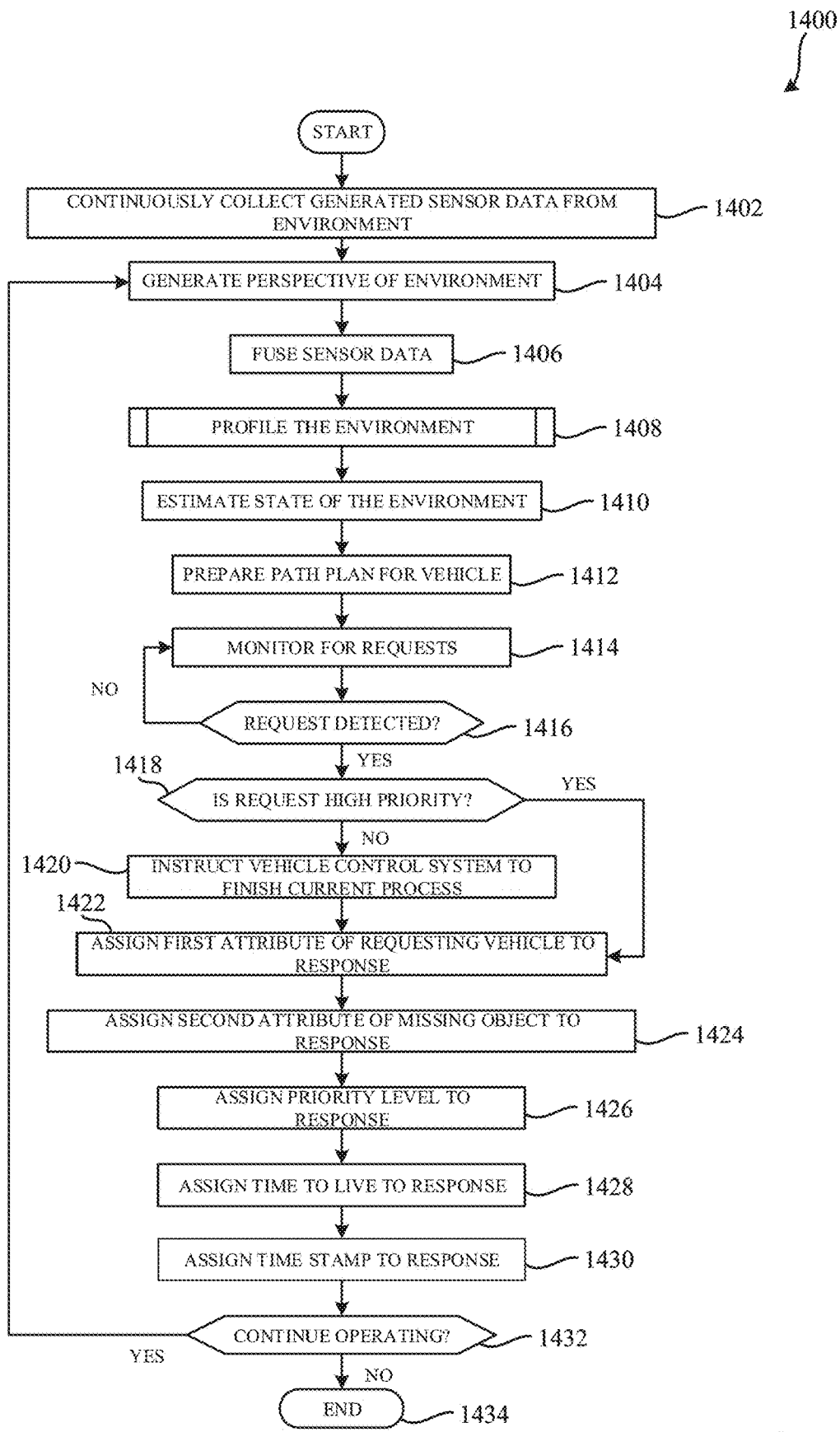
FIG. 14 is a flowchart representative of example machine readable instructions that may be executed to implement the environment analyzer of FIG. 2 to prepare a response to a data request.

FIG. 14 is a flowchart representative of machine readable instructions that may be executed to implement the environment analyzer 104 of FIG. 2 to prepare a response to a data request. In some examples, the response is the example response 602 to the example request 600. In other examples the response is the example response 702 to the example request 700. The example program 1400 begins at the block 1402. At block 1402, the example profile generator 202 continuously collects data generated by the data generator 200. The example profile generator also transmits collected data to the example vehicle control system 206 via the communication bus 210. Next, at block 1404, the example vehicle control system 206 fuses the raw sensor data obtained from the example profile generator 202. More specifically, at block 1404, the example raw sensor fusor 500 included in the example vehicle control system 206 fuses the raw sensor data obtained from the data generator 200 via the profile generator 202. At block 1404, the example raw sensor fusor 500 fuses the sparse or dense point clouds (e.g., the first data, the raw sensor data) obtained from the data generator 200 via the profile generator 202 by transforming the unordered point cloud (e.g., the first data) into an evenly spaced rectangular grid. The raw sensor fusor 500, at block 1404, fuses the first data by processing the first data through a deep convolution network.

At block 1406, the example vehicle control system 206 generates a first perspective of the environment. More specifically, at block 1406, the example raw sensor fusor 500 fuses the first data generated by the data generator 200 into the first perspective of an autonomous vehicle (e.g., the first autonomous vehicle 102, the second autonomous vehicle 106, etc.).

At block 1408, the example profile generator 202 profiles the environment (e.g., environment A, environment B, etc.). For example, the profile generator 202 interprets the data generated by the data generator 200 using sensor interpreters. Depending on the sensor, the sensor interpreter changes. For example, for a GPS sensor or a global timer sensor, the sensor interpreter is a software interface (e.g., the Garmin SDK). However, for LIDAR sensor, cameras, or radar sensors, the sensor interpreter is a deep learning system that can analyze the data generated by the LIDAR sensor, the cameras, and/or the radar sensors to generate a perspective of the environment. The deep learning system is, for example, YOLO. In other examples, the deep learning system is a Kalman filter. At block 1408, the example profile generator 202 filters the first data for the second data. In the example, the second data is data pertinent to a profile template. At block 1408, the profile generator 202 filters the first data generated by the data generator 200 using the sensor interpreters. Additionally, at block 1408, the profile generator 202 populates the profile template including data objects defined by a developer of the profile template. At block 1408, the example profile generator 202 inputs the second data filtered from the first data by the sensor interpreters into the profile template to generate the first profile. Furthermore, at block 1408, the profile generator 202 requests profiles from the nodes in the environment.

At block 1410, the example vehicle control system 206 estimates the state of the environment. More specifically, at block 1410, the example state determiner/object tracker 506 determines the state of the environment utilizing multimodal probabilistic techniques. For example, at block 1410, the state determiner/object tracker 506 determines the state of the environment by applying a Kalman filter to the first perspective.

At block 1412, the example vehicle control system 206 prepares a path plan for a vehicle (e.g., the first autonomous vehicle 102, the second autonomous vehicle 106, etc.) More specifically, at block 1412, the example motion planning engine 508 determines the first path plan for a vehicle based on the state estimate and the trajectory and intent of the objects in the environment. For example, at block 1412, the motion planning engine 508 computes a path in the environment that is on the drivable area described in the drivability map 504 and does not intersect with any of the trajectories of the objects in the environment. The motion planning engine 508 determines the first path plan and transmits the first path plan to controller 516.

At block 1414, the example vehicle control system 206 monitors the nodes in the environment for requests for data. More specifically, at block 1414, the example first observer input 510*a*, the example second observer input 510*b*, the example third observer input 510*c*, the example nth−2 observer input 510*d*, the example nth−1 observer input 510*e*, and the example nth observer input 510*f* monitor the nodes in the environment for requests for data. At block 1416, the vehicle control system 206 determines whether a request for data has been detected. More specifically, at block 1416, the example first observer input 510*a*, the example second observer input 510*b*, the example third observer input 510*c*, the example nth−2 observer input 510*d*, the example nth−1 observer input 510*e*, and the example nth observer input 510*f* determine whether a request for data has been detected. If the example first observer input 510*a*, the example second observer input 510*b*, the example third observer input 510*c*, the example nth−2 observer input 510*d*, the example nth−1 observer input 510*e*, and the example nth observer input 510*f* determine that a request for data has been detected (block 1416: YES), the program 1400 proceeds to block 1418. If the example first observer input 510*a*, the example second observer input 510*b*, the example third observer input 510*c*, the example nth−2 observer input 510*d*, the example nth−1 observer input 510*e*, and the example nth observer input 510*f* determine that a request for data has not been detected (block 1416: NO), the program 1400 proceeds to block 1414.

At block 1418, the example vehicle control system 206 determines whether the detected request is a high priority request. More specifically, at block 1418, the example first observer input 510*a*, the example second observer input 510*b*, the example third observer input 510*c*, the example nth−2 observer input 510*d*, the example nth−1 observer input 510*e*, and the example nth observer input 510*f* determine whether the detected request is a high priority request. If the example first observer input 510*a*, the example second observer input 510*b*, the example third observer input 510*c*, the example nth−2 observer input 510*d*, the example nth−1 observer input 510*e*, and the example nth observer input 510*f* determine that the detected request is a high priority request (block 1418: YES), the program 1400 proceeds to block 1422. If the example first observer input 510*a*, the example second observer input 510*b*, the example third observer input 510*c*, the example nth−2 observer input 510*d*, the example nth−1 observer input 510*e*, and the example nth observer input 510*f* determine that the detected request is not a high priority request (block 1418: NO), the program 1400 proceeds to block 1420.

At block 1420, the example vehicle control system 206 finishes the current process. More specifically, at block 1420, the example first observer input 510*a*, the example second observer input 510*b*, the example third observer input 510*c*, the example nth−2 observer input 510*d*, the example nth−1 observer input 510*e*, and the example nth observer input 510*f* instructs the controller 516 to complete the current process executing on the vehicle (e.g., the first autonomous vehicle 102, the second autonomous vehicle 106, etc.).

At block 1422, the vehicle control system 206 assigns an attribute of the requesting vehicle to the response. More specifically, at block 1422, the state determiner/object tracker 506 assigns an attribute of the requesting vehicle to the response. In some examples, the response is the example response 602. In other examples, the response is the example response 702. For example, the state determiner/object tracker 506 populates the characteristic of the requesting node field 624. In other examples, the state determiner/object tracker 506 populates the pseudonym of the requesting node field 724. The characteristic of the requesting node field 624 and the pseudonym of the requesting node field 724 describe an attribute of the node that requested one or more of the sensor data or the state estimates. The example state determiner/object tracker 506 identifies the attribute of the requesting node based on the first perspective. In this way, the state determiner/object tracker 506 and more generally, the environment analyzer 104 can direct the response to the request for data from individual nodes specified to the requesting node by an attribute of the requesting node. In some examples, the attribute is a physical characteristic of the requesting node. In other examples, the attribute is a pseudonym of requesting node. In some examples where the attribute is a pseudonym, the state determiner/object tracker 506 populates the pseudonym of the requesting node field 724 with the previous pseudonym of the requesting node. In other examples where the attribute is a pseudonym, the state determiner/object tracker 506 populates the pseudonym of the requesting node field 724 based on a pseudonym for the requesting node accessed from a pseudonym provider.

At block 1424, the example vehicle control system 206 assigns an attribute of the missing object to the response. More specifically, at block 1424, the state determiner/object tracker 506 assigns an attribute of the missing object to the response. For example, the state determiner/object tracker 506 populates the example message response field 626. In other examples, the state determiner/object tracker 506 populates the example message response field 726. The message request field 626 and the message response field 726 indicate to the requesting nodes in the environment that the response to the request for data includes one or more of the sensor data or state estimates for the missing object. In this way, the state determiner/object tracker 506 and more generally, the environment analyzer 104 can send data for an individual object in the environment specified by an attribute of the object to requesting nodes in the environment.

At block 1426, the vehicle control system 206 assigns a priority level to the response. More specifically, at block 1426, the state determiner/object tracker 506 assigns a priority level to the response. For example, the state determiner/object tracker 506 populates the network header field 618 with transparent data describing the information included in the response to the request for data. In other examples, the state determiner/object tracker 506 populates the network header field 718. The transparent data includes the priority level of the response. In some examples, the priority level of the response is high if the priority level of the request was high. In other examples the priority level of the request is medium if the priority level for the request was medium. In this way, the priority level of the response is based on the priority level of the request for data.

At block 1428, the vehicle control system 206 assigns a time to live to the response. More specifically, at block 1428, the state determiner/object tracker 506 assigns a time to live to the response. For example, the state determiner/object tracker 506 populates the time to live field 622. In other examples, the state determiner/object tracker 506 populates the time to live field 722 The time to live field 622 and the time to live field 722 indicate the amount of time that the response to the request for data is to be active. In examples where the priority level is high, the time to live is short. The short time to live indicates that the request for data is only relevant for a short amount of time. In examples where the priority level is medium, the time to live is longer than the time to live for a high priority request. The longer time to live indicates that the response to the request for data is relevant for a longer amount of time.

At block 1430, the vehicle control system 206 assigns a timestamp to the response to the request for data. More specifically, at block 1430, the state determiner/object tracker 506 assigns a timestamp to the response to the request for data. For example, the state determiner/object tracker 506 populates the timestamp field 620. In other examples, the state determiner/object tracker 506 populates the timestamp field 720. The timestamp field 620 and the timestamp field 720 indicate the time at which the response to the request for data was prepared and transmitted to the requesting nodes in the environment, via the first transceiver 208, by the scene analyze state determiner/object tracker 506. The timestamp field is populated using data (e.g., global timer data) generated by the data generator 200.

At block 1432, the vehicle control system 206 determines whether to continue operating. More specifically, the controller 516 determines whether to continue operating, at block 1432, based on the previous path plan state estimate determined by the motion planning engine 508 and the state determiner/object tracker 506, respectively. If the controller 516, at block 1432, determines to stop operating, the program 1400 proceeds to block 1434 and ends. However, if the controller 516 determines to continue operating, at block 1432, the program 1400 continues to block 1404. Examples of previous path plan and state estimate that cause the controller 516 to determine to stop operating include parking the first vehicle and turning the power off, a vehicle accident, etc.

Figure 15:
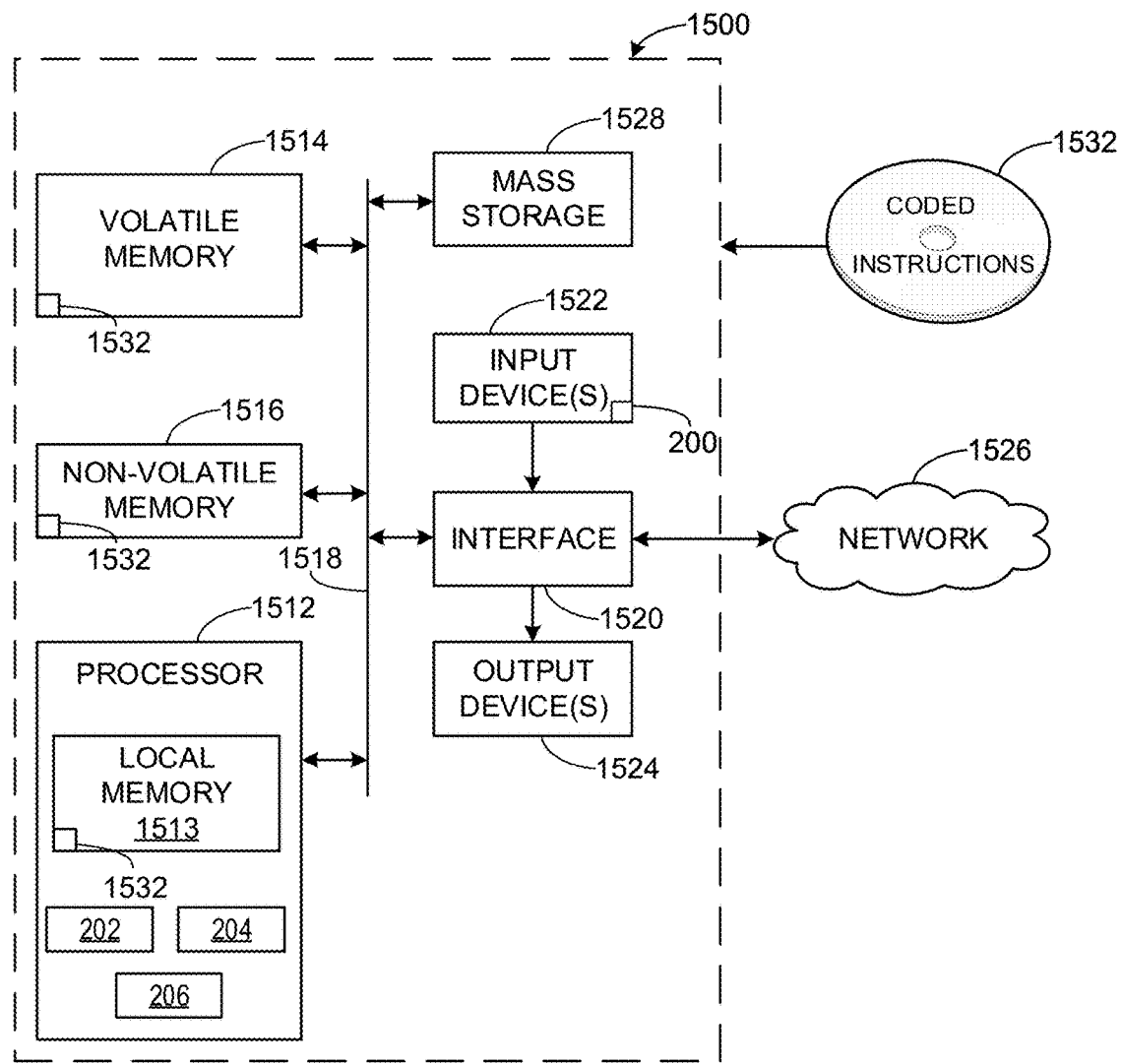
FIG. 15 is a block diagram of an example processing platform structured to execute the instructions of FIGS. 9, 10, 11, 12, 13, and 14 to implement the environment analyzer of FIG. 2.

FIG. 15 is a block diagram of an example processor platform 1500 structured to execute the instructions of FIGS. 9, 10, 11, 12, 13, and 14 to implement the environment analyzer 104 of FIG. 1. The processor platform 1500 can be, for example, processing system of a vehicle, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1500 of the illustrated example includes a processor 1512. The processor 1512 of the illustrated example is hardware. For example, the processor 1512 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements profile generator 202, data analyzer 204, the vehicle control system 206 and more generally, the environment analyzer 104.

The processor 1512 of the illustrated example includes a local memory 1513 (e.g., a cache). The processor 1512 of the illustrated example is in communication with a main memory including a volatile memory 1514 and a non-volatile memory 1516 via a bus 1518. The volatile memory 1514 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1516 may be implemented by flash memory and/or any other desired type of memory device. Access to the main memory 1514, 1516 is controlled by a memory controller.

The processor platform 1500 of the illustrated example also includes an interface circuit 1520. The interface circuit 1520 may be implemented by any type of interface standard, such as an Ethernet interface, a universal serial bus (USB), a Bluetooth® interface, a near field communication (NFC) interface, and/or a PCI express interface.

In the illustrated example, one or more input devices 1522 are connected to the interface circuit 1520. The input device(s) 1522 permit(s) a user to enter data and/or commands into the processor 1512. The input device(s) can be implemented by, for example, an audio sensor, a microphone, a camera (still or video), a keyboard, a button, a mouse, a touchscreen, a track-pad, a trackball, isopoint and/or a voice recognition system. In this example, the input device(s) 1522 include the data generator 200.

One or more output devices 1524 are also connected to the interface circuit 1520 of the illustrated example. The output devices 1524 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1520 of the illustrated example, thus, typically includes a graphics driver card, a graphics driver chip and/or a graphics driver processor.

The interface circuit 1520 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1526. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1500 of the illustrated example also includes one or more mass storage devices 1528 for storing software and/or data. Examples of such mass storage devices 1528 include floppy disk drives, hard drive disks, compact disk drives, Blu-ray disk drives, redundant array of independent disks (RAID) systems, and digital versatile disk (DVD) drives.

The machine executable instructions 1532 of FIGS. 9, 10, 11, 12, 13, and 14 may be stored in the mass storage device 1528, in the volatile memory 1514, in the non-volatile memory 1516, and/or on a removable non-transitory computer readable storage medium such as a CD or DVD.

From the foregoing, it will be appreciated that example methods, apparatus and articles of manufacture have been disclosed that provide a communicative framework to share raw data, computed estimates of an environment, and/or profiles of the environment between autonomous vehicles in the environment. Examples disclosed herein allow autonomous vehicles to accurately track one or more objects that are out of the FOV of the autonomous vehicles to safely navigate an environment and adapt the path plan of each of autonomous vehicle. Examples disclosed herein provide systems, methods, and apparatus to request one or more of raw data, state estimates, or profiles of the environment generated by other vehicles in the environment based on the position of the other vehicles relative to the autonomous vehicles. Examples disclosed herein provide a framework for requesting data on a third-party vehicle from second-party vehicles in the FOV of the autonomous vehicles. The raw data and state estimates provide the autonomous vehicles with data that can be used to track vehicles out of the FOV of the autonomous vehicles. The profiles reduce the computational burden for the autonomous vehicles of analyzing the environment because the profile includes an analysis of the environment generated by other autonomous vehicles.

Additionally, examples disclosed herein allow autonomous vehicles in an environment to collaboratively communicate anomalous behavior of the environment. For example, an autonomous vehicle may detect a vehicle accident in the environment and record the vehicle accident in a profile. In response to detecting that other profiles generated by other autonomous vehicles in the environment do not include a record of the vehicle accident, the autonomous vehicle sends a part of or a complete version of the profile to the other autonomous vehicles in the environment. Examples disclosed herein provide autonomous vehicles with the ability to update and/or change a path plan associated with each of the autonomous vehicles according to the raw sensor data and/or state estimates from the second-party vehicles in the environment. For example, in response to obtaining a profile including a record of an anomalous activity, for example a vehicle accident, the other autonomous vehicles in the environment engage braking systems to stop the path plan and avoid the anomalous activity, for example the identified vehicle accident. With respect to this example, the examples disclosed herein prevent undesirable hard reaction and hard detection events, such as chain car accidents.

In other examples, the profiles from the other autonomous vehicles in an environment include a map of the environment. Examples disclosed herein allow an autonomous vehicle to request profiles including the map from the other autonomous vehicles in the environment. The example map includes a route for a roadway showing a curve in the path plan of the autonomous vehicle. Examples disclosed herein allow the autonomous vehicle to identify the curve prior to the curve being in the FOV of the autonomous vehicle. Examples disclosed herein allow the autonomous vehicle to engage smooth braking to avoid abruptly braking the autonomous vehicle when the autonomous vehicle would have detected the curve.

The disclosed methods, apparatus and articles of manufacture improve the efficiency of using a computing device by reducing the computational complexity of analyzing an environment because autonomous vehicles entering an environment can prefetch profiles of the environment. The prefetched profile of examples disclosed herein serves as the source of the perspective generated by autonomous vehicles. Furthermore, examples disclosed herein allow the autonomous vehicle to obtain raw data and/or state estimates from other autonomous vehicles in the environment such that the autonomous vehicle processes the raw data and/or state estimates obtained from the other autonomous vehicles in the environment rather than continuing to monitor the environment for raw data. In this manner, examples disclosed herein allow the autonomous vehicle to conserve power resources by not continuously monitoring the environment for raw data when an impairment exists. The disclosed methods, apparatus and articles of manufacture are accordingly directed to one or more improvement(s) in the functioning of a computer.

Example 1 includes an apparatus to analyze vehicle perspectives, the apparatus comprising a profile generator to generate a first profile of an environment based on a profile template and first data generated by a first vehicle, the first profile characterizing the environment, a data analyzer to determine a difference between the first profile and a second profile obtained from a first one of one or more nodes in the environment, and in response to a trigger event, update the first profile based on the difference, and a vehicle control system to in response to the trigger event, update a first perspective of the environment based on one or more of second data from the first one of the one or more nodes or the updated first profile, the first perspective corresponding to a fusion of the first data, update a path plan for the first vehicle based on the updated first perspective, and execute the updated path plan.

Example 2 includes the apparatus of example 1, wherein the one or more nodes in the environment includes a second vehicle, additional vehicles, and a control center, the one or more nodes to collect the second data from the environment.

Example 3 includes the apparatus of example 1, wherein the profile generator is to filter the first data generated by the first vehicle for third data pertinent to the profile template, the profile template including one or more data objects to characterize the environment, insert the third data into the one or more data objects to generate the first profile, and compress the first profile.

Example 4 includes the apparatus of example 1, wherein the data analyzer is further to generate a comprehensive profile of the environment, the comprehensive profile characterizing the environment based on additional profiles obtained from the one or more nodes in the environment.

Example 5 includes the apparatus of example 4, wherein to update the first profile, the data analyzer is to incorporate differences between the first profile and one or more of the second profile, the additional profiles, or the comprehensive profile, and transmit the differences to the one or more nodes in the environment.

Example 6 includes the apparatus of example 1, wherein the trigger event includes one or more of a first determination that the first profile meets a first threshold of profile similarity and a second threshold of profile similarity, a second determination that the first profile meets the first threshold of profile similarity and a third threshold of profile similarity, but not the second threshold of profile similarity, a third determination that the first profile does not meet the first threshold of profile similarity, or a fourth determination that a portion of the first data is missing for multiple iterations due to an impairment, the portion corresponding to an object in the first perspective.

Example 7 includes the apparatus of example 6, wherein the impairment is a condition of the environment that affects an ability of the first vehicle to accurately generate the first data.

Example 8 includes the apparatus of example 6, wherein the first threshold of profile similarity is less than the second threshold of profile similarity and the third threshold of profile similarity is greater than the first threshold of profile similarity, but less than the second profile of threshold similarity.

Example 9 includes the apparatus of example 6, wherein to determine the difference the data analyzer is to determine whether the first profile meets the first threshold of profile similarity to one or more of the second profile, additional profiles, or a comprehensive profile, determine whether the first profile meets the second threshold of profile similarity to one or more of the second profile, the additional profiles, or the comprehensive profile, and determine whether the first profile meets the third threshold of profile similarity to one or more of the second profile, the additional profiles, or the comprehensive profile.

Example 10 includes the apparatus of example 6, wherein to transmit the difference, the data analyzer is to in response to the first determination, transmit an acknowledgement to the one or more nodes in the environment, and in response to the second determination or the third determination, transmit a part of the first profile to the one or more nodes in the environment.

Example 11 includes the apparatus of example 10, wherein the part of the first profile includes at least one of a portion of the first profile less than a full value of the first profile or the full value of the first profile.

Example 12 includes the apparatus of example 6, wherein the object is a missing object, the path plan is a first path plan and, the vehicle control system is further to identify the first one of the one or more nodes in the environment from which to request the second data, determine whether a trajectory and an intent for the missing object, based on a number of iterations of the first perspective for which some of the first data is missing, intersects with the first path plan, prepare a request for the second data from the first one of the one or more nodes in the environment, in response to obtaining a response to the request for the second data within a threshold amount of time, determine whether the second data includes a state estimate or sensor data generated by the first one of the one or more nodes, in response to the second data including sensor data transform the second data to the first perspective of the first vehicle, and generate an updated first perspective by fusing the first data generated by the first vehicle with the second data, track the missing object included in the updated first perspective throughout iterations of the updated first perspective, determine whether the trajectory and the intent of the missing object based on the updated first perspective, and in response to the trajectory and the intent of the missing object based on the updated first perspective intersecting the first path plan, recompute a second path plan such that the second path plan does not intersect with the trajectory and the intent of the missing object based on the updated first perspective.

Example 13 includes the apparatus of example 12, wherein, to identify the first one of the one or more nodes, the vehicle control system is to identify the first one of the one or more nodes with a second perspective that includes the missing object, the second perspective better than the first perspective.

Example 14 includes the apparatus of example 12, wherein, to prepare the request for the second data from the first one of the one or more nodes in the environment, the vehicle control system is to determine whether there are pseudonyms corresponding to the first one of the one or more nodes in the environment and the missing object, in response to a determination that there are pseudonyms corresponding to the first one of the one or more nodes in the environment and the missing object assign a number of nodes to which to transmit the request to the request, assign a first pseudonym of the identified node to the request, assign a second pseudonym of the missing object to the request, and assign a priority level to the request.

Example 15 includes the apparatus of example 14, wherein the first pseudonym and the second pseudonym correspond to a first identifier for the first vehicle and a second identifier for the missing object that can be changed to prevent the one or more nodes that receive the request from identifying the first vehicle or the missing object.

Example 16 includes the apparatus of example 15, wherein when the trajectory and the intent for the missing object, based on the number of iterations of the first perspective in which data is missing for the missing object, intersects with the first path plan, the priority level is high, and when the trajectory and the intent for the missing object, based on the number of iterations of the first perspective in which data is missing for the missing object, does not intersect with the first path plan, the priority level is medium.

Example 17 includes the apparatus of example 16, wherein when the priority level is high, the threshold amount of time is a first threshold amount of time that is low, and when the priority level is medium, the threshold amount of time is a second threshold amount of time higher than the first threshold amount of time.

Example 18 includes the apparatus of example 16, wherein when the priority level is high and the threshold amount of time has passed without obtaining the response, the vehicle control system is to cancel the first path plan, when the priority level is medium and the threshold amount of time has passed without obtaining the response, the vehicle control system is to determine, based on a confidence rating of the trajectory and the intent for the missing object, whether the trajectory and the intent of the missing object intersects with the first path plan, and in response to the confidence rating not meeting a confidence threshold, the vehicle control system is to recompute the second path plan, such that the second path plan does not intersect with the trajectory and the intent for the missing object, the trajectory and the intent for the missing object based on the number of iterations of the first perspective in which data is missing for the missing object.

Example 19 includes the apparatus of example 18, wherein the confidence rating is based on the number of iterations of the first perspective in which data is missing for the missing object.

Example 20 includes the apparatus of example 18, wherein the vehicle control system is to reset the path plan to the first path plan in response to determining that the confidence rating meets the confidence threshold.

Example 21 includes a non-transitory computer readable storage medium comprising instructions that, when executed, cause a machine to at least generate a first profile of an environment based on a profile template and first data generated by a first vehicle, the first profile characterizing the environment, determine a difference between the first profile and a second profile obtained from a first one of one or more nodes in the environment, and in response to a trigger event, update the first profile based on the difference, and in response to the trigger event, update a first perspective of the environment based on one or more of second data from the first one of the one or more nodes or the updated first profile, the first perspective corresponding to a fusion of the first data, update a path plan for the first vehicle based on the updated first perspective, and execute the updated path plan.

Example 22 includes the non-transitory computer readable storage medium of example 21, wherein the one or more nodes in the environment includes a second vehicle, additional vehicles, and a control center, the one or more nodes to collect the second data from the environment.

Example 23 includes the non-transitory computer readable storage medium of example 21, wherein the instructions, when executed, cause the machine to filter the first data generated by the first vehicle for third data pertinent to the profile template, the profile template including one or more data objects to characterize the environment, insert the third data into the one or more data objects to generate the first profile, and compress the first profile.

Example 24 includes the non-transitory computer readable storage medium of example 21, wherein the instructions, when executed, cause the machine to generate a comprehensive profile of the environment, the comprehensive profile characterizing the environment based on additional profiles obtained from the one or more nodes in the environment.

Example 25 includes the non-transitory computer readable storage medium of example 24, wherein the instructions, when executed, cause the machine to incorporate differences between the first profile and one or more of the second profile, the additional profiles, or the comprehensive profile, and transmit the differences to the one or more nodes in the environment.

Example 26 includes the non-transitory computer readable storage medium of example 21, wherein the trigger event includes one or more of a first determination that the first profile meets a first threshold of profile similarity and a second threshold of profile similarity, a second determination that the first profile meets the first threshold of profile similarity and a third threshold of profile similarity, but not the second threshold of profile similarity, a third determination that the first profile does not meet the first threshold of profile similarity, or a fourth determination that a portion of the first data is missing for multiple iterations due to an impairment, the portion corresponding to an object in the first perspective.

Example 27 includes the non-transitory computer readable storage medium of example 26, wherein the impairment is a condition of the environment that affects an ability of the first vehicle to accurately generate the first data.

Example 28 includes the non-transitory computer readable storage medium of example 26, wherein the first threshold of profile similarity is less than the second threshold of profile similarity and the third threshold of profile similarity is greater than the first threshold of profile similarity, but less than the second profile of threshold similarity.

Example 29 includes the non-transitory computer readable storage medium of example 26, wherein the instructions, when executed, cause the machine to determine whether the first profile meets the first threshold of profile similarity to one or more of the second profile, additional profiles, or a comprehensive profile, determine whether the first profile meets the second threshold of profile similarity to one or more of the second profile, the additional profiles, or the comprehensive profile, and determine whether the first profile meets the third threshold of profile similarity to one or more of the second profile, the additional profiles, or the comprehensive profile.

Example 30 includes the non-transitory computer readable storage medium of example 26, wherein the instructions, when executed, cause the machine to in response to the first determination, transmit an acknowledgement to the one or more nodes in the environment, and in response to the second determination or the third determination, transmit a part of the first profile to the one or more nodes in the environment.

Example 31 includes the non-transitory computer readable storage medium of example 30, wherein the part of the first profile includes at least one of a portion of the first profile less than a full value of the first profile or the full value of the first profile.

Example 32 includes the non-transitory computer readable storage medium of example 26, wherein the object is a missing object, the path plan is a first path plan and, the instructions, when executed, cause the machine to identify the first one of the one or more nodes in the environment from which to request the second data, determine whether a trajectory and an intent for the missing object, based on a number of iterations of the first perspective for which some of the first data is missing, intersects with the first path plan, prepare a request for the second data from the first one of the one or more nodes in the environment, in response to obtaining a response to the request for the second data within a threshold amount of time, determine whether the second data includes a state estimate or sensor data generated by the first one of the one or more nodes, in response to the second data including sensor data transform the second data to the first perspective of the first vehicle, and generate an updated first perspective by fusing the first data generated by the first vehicle with the second data, track the missing object included in the updated first perspective throughout iterations of the updated first perspective, determine whether the trajectory and the intent of the missing object based on the updated first perspective, and in response to the trajectory and the intent of the missing object based on the updated first perspective intersecting the first path plan, recompute a second path plan such that the second path plan does not intersect with the trajectory and the intent of the missing object based on the updated first perspective.

Example 33 includes the non-transitory computer readable storage medium of example 32, wherein the instructions, when executed, cause the machine to identify the first one of the one or more nodes with a second perspective that includes the missing object, the second perspective better than the first perspective.

Example 34 includes the non-transitory computer readable storage medium of example 32, wherein the instructions, when executed, cause the machine to determine whether there are pseudonyms corresponding to the first one of the one or more nodes in the environment and the missing object, in response to a determination that there are pseudonyms corresponding to the first one of the one or more nodes in the environment and the missing object assign a number of nodes to which to transmit the request to the request, assign a first pseudonym of the identified node to the request, assign a second pseudonym of the missing object to the request, and assign a priority level to the request.

Example 35 includes the non-transitory computer readable storage medium of example 34, wherein the first pseudonym and the second pseudonym correspond to a first identifier for the first vehicle and a second identifier for the missing object that can be changed to prevent the one or more nodes that receive the request from identifying the first vehicle or the missing object.

Example 36 includes the non-transitory computer readable storage medium of example 35, wherein when the trajectory and the intent for the missing object, based on the number of iterations of the first perspective in which data is missing for the missing object, intersects with the first path plan, the priority level is high, and when the trajectory and the intent for the missing object, based on the number of iterations of the first perspective in which data is missing for the missing object, does not intersect with the first path plan, the priority level is medium.

Example 37 includes the non-transitory computer readable storage medium of example 36, wherein when the priority level is high, the threshold amount of time is a first threshold amount of time that is low, and when the priority level is medium, the threshold amount of time is a second threshold amount of time higher than the first threshold amount of time.

Example 38 includes the non-transitory computer readable storage medium of example 36, wherein the instructions, when executed, cause the machine to when the priority level is high and the threshold amount of time has passed without obtaining the response, cancel the first path plan, when the priority level is medium and the threshold amount of time has passed without obtaining the response, determine, based on a confidence rating of the trajectory and the intent for the missing object, whether the trajectory and the intent of the missing object intersects with the first path plan, and in response to the confidence rating not meeting a confidence threshold, recompute the second path plan, such that the second path plan does not intersect with the trajectory and the intent for the missing object, the trajectory and the intent for the missing object based on the number of iterations of the first perspective in which data is missing for the missing object.

Example 39 includes the non-transitory computer readable storage medium of example 38, wherein the confidence rating is based on the number of iterations of the first perspective in which data is missing for the missing object.

Example 40 includes the non-transitory computer readable storage medium of example 38, wherein the instructions, when executed, cause the machine to reset the path plan to the first path plan in response to determining that the confidence rating meets the confidence threshold.

Example 41 includes a method to analyze vehicle perspective, the method comprising generating a first profile of an environment based on a profile template and first data generated by a first vehicle, the first profile characterizing the environment, determining a difference between the first profile and a second profile obtained from a first one of one or more nodes in the environment, and in response to a trigger event, updating the first profile based on the difference, and in response to the trigger event, updating a first perspective of the environment based on one or more of second data from the first one of the one or more nodes or the updated first profile, the first perspective corresponding to a fusion of the first data, updating a path plan for the first vehicle based on the updated first perspective, and executing the updated path plan.

Example 42 includes the method of example 41, wherein the one or more nodes in the environment includes a second vehicle, additional vehicles, and a control center, the one or more nodes to collect the second data from the environment.

Example 43 includes the method of example 41, further including filtering the first data generated by the first vehicle for third data pertinent to the profile template, the profile template including one or more data objects to characterize the environment, inserting the third data into the one or more data objects to generate the first profile, and compressing the first profile.

Example 44 includes the method of example 41, further including generating a comprehensive profile of the environment, the comprehensive profile characterizing the environment based on additional profiles obtained from the one or more nodes in the environment.

Example 45 includes the method of example 44, further including incorporating differences between the first profile and one or more of the second profile, the additional profiles, or the comprehensive profile, and transmitting the differences to the one or more nodes in the environment.

Example 46 includes the method of example 41, wherein the trigger event includes one or more of a first determination that the first profile meets a first threshold of profile similarity and a second threshold of profile similarity, a second determination that the first profile meets the first threshold of profile similarity and a third threshold of profile similarity, but not the second threshold of profile similarity, a third determination that the first profile does not meet the first threshold of profile similarity, or a fourth determination that a portion of the first data is missing for multiple iterations due to an impairment, the portion corresponding to an object in the first perspective.

Example 47 includes the method of example 46, wherein the impairment is a condition of the environment that affects an ability of the first vehicle to accurately generate the first data.

Example 48 includes the method of example 46, wherein the first threshold of profile similarity is less than the second threshold of profile similarity and the third threshold of profile similarity is greater than the first threshold of profile similarity, but less than the second profile of threshold similarity.

Example 49 includes the method of example 46, further including determining whether the first profile meets the first threshold of profile similarity to one or more of the second profile, additional profiles, or a comprehensive profile, determining whether the first profile meets the second threshold of profile similarity to one or more of the second profile, the additional profiles, or the comprehensive profile, and determining whether the first profile meets the third threshold of profile similarity to one or more of the second profile, the additional profiles, or the comprehensive profile.

Example 50 includes the method of example 46, further including in response to the first determination, transmit an acknowledgement to the one or more nodes in the environment, and in response to the second determination or the third determination, transmit a part of the first profile to the one or more nodes in the environment.

Example 51 includes the method of example 50, wherein the part of the first profile includes at least one of a portion of the first profile less than a full value of the first profile or the full value of the first profile.

Example 52 includes the method of example 46, wherein the object is a missing object, the path plan is a first path plan and, the method further including identifying the first one of the one or more nodes in the environment from which to request the second data, determining whether a trajectory and an intent for the missing object, based on a number of iterations of the first perspective for which some of the first data is missing, intersects with the first path plan, preparing a request for the second data from the first one of the one or more nodes in the environment, in response to obtaining a response to the request for the second data within a threshold amount of time, determining whether the second data includes a state estimate or sensor data generated by the first one of the one or more nodes, in response to the second data including sensor data transforming the second data to the first perspective of the first vehicle, and generating an updated first perspective by fusing the first data generated by the first vehicle with the second data, tracking the missing object included in the updated first perspective throughout iterations of the updated first perspective, determining whether the trajectory and the intent of the missing object based on the updated first perspective, and in response to the trajectory and the intent of the missing object based on the updated first perspective intersecting the first path plan, recomputing a second path plan such that the second path plan does not intersect with the trajectory and the intent of the missing object based on the updated first perspective.

Example 53 includes the method of example 52, further including identifying the first one of the one or more nodes with a second perspective that includes the missing object, the second perspective better than the first perspective.

Example 54 includes the method of example 52, further including determining whether there are pseudonyms corresponding to the first one of the one or more nodes in the environment and the missing object, in response to a determination that there are pseudonyms corresponding to the first one of the one or more nodes in the environment and the missing object assigning a number of nodes to which to transmit the request to the request, assigning a first pseudonym of the identified node to the request, assigning a second pseudonym of the missing object to the request, and assigning a priority level to the request.

Example 55 includes the method of example 54, wherein the first pseudonym and the second pseudonym correspond to a first identifier for the first vehicle and a second identifier for the missing object that can be changed to prevent the one or more nodes that receive the request from identifying the first vehicle or the missing object.

Example 56 includes the method of example 55, wherein when the trajectory and the intent for the missing object, based on the number of iterations of the first perspective in which data is missing for the missing object, intersects with the first path plan, the priority level is high, and when the trajectory and the intent for the missing object, based on the number of iterations of the first perspective in which data is missing for the missing object, does not intersect with the first path plan, the priority level is medium.

Example 57 includes the method of example 56, wherein when the priority level is high, the threshold amount of time is a first threshold amount of time that is low, and when the priority level is medium, the threshold amount of time is a second threshold amount of time higher than the first threshold amount of time.

Example 58 includes the method of example 56, further including when the priority level is high and the threshold amount of time has passed without obtaining the response, canceling the first path plan, when the priority level is medium and the threshold amount of time has passed without obtaining the response, determining, based on a confidence rating of the trajectory and the intent for the missing object, whether the trajectory and the intent of the missing object intersects with the first path plan, and in response to the confidence rating not meeting a confidence threshold, recomputing the second path plan, such that the second path plan does not intersect with the trajectory and the intent for the missing object, the trajectory and the intent for the missing object based on the number of iterations of the first perspective in which data is missing for the missing object.

Example 59 includes the method of example 58, wherein the confidence rating is based on the number of iterations of the first perspective in which data is missing for the missing object.

Example 60 includes the method of example 58, further including resetting the path plan to the first path plan in response to determining that the confidence rating meets the confidence threshold.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to analyze vehicle perspectives, the apparatus comprising:
    data generation circuitry to obtain first data generated by a first vehicle; and
    processor circuitry to at least one of execute or instantiate operations corresponding to:
        profile generator instructions to:
            filter the first data for second data associated with a profile template, the profile template is a data structure including one or more predefined data objects configured to be populated based on at least some of the first data;
            insert the second data into the one or more predefined data objects to generate a first profile, the first profile to characterize an environment; and
            compress the first profile;
        data analyzer instructions to:
            determine a difference between the first profile and a second profile obtained from a first node in the environment; and
            in response to a first trigger event corresponding to the first profile, update the first profile based on the difference; and
        vehicle control instructions to:
            in response to a second trigger event corresponding to a missing object in a first perspective of the environment, prepare a request to be sent to a second node in the environment that can provide third data associated with the missing object;
            in response to a determination that there is a first pseudonym corresponding to the second node and a second pseudonym corresponding to the missing object, assign to the request (1) a number of nodes to which to transmit the request, (2) the first pseudonym and the second pseudonym; and (3) a priority level;

update the first perspective based on one or more of the third data from the second node or the updated first profile, the first perspective corresponding to a fusion of the first data;

update a path plan to transport the first vehicle from a first location to a second location based on the updated first perspective; and execute the updated path plan.

2. The apparatus of claim 1, wherein at least one of the first node or the second node includes at least one of a second vehicle, an additional vehicle, or a control center, the second node to collect the third data from the environment.

3. The apparatus of claim 1, wherein the determination is a first determination, and the second trigger event corresponds to a second determination that a portion of the first data is missing from multiple iterations due to an impairment, the impairment including a condition of the environment that affects an ability of the first vehicle to accurately generate the first data.

4. The apparatus of claim 1, wherein the data analyzer instructions are to cause the processor circuitry to:

in response to a first determination that the first profile meets a first threshold of profile similarity and a second threshold of profile similarity, cause transmission of an acknowledgement to the first node and the second node; and in response to at least one of (A) a second determination that the first profile meets the first threshold of profile similarity and a third threshold of profile similarity or (B) a third determination that the first profile does not meet the first threshold of profile similarity, cause transmission of a part of the first profile to the first node and the second node.

5. The apparatus of claim 4, wherein the part of the first profile includes at least one of a portion of the first profile less than a full value of the first profile or the full value of the first profile.

6. The apparatus of claim 1, wherein the missing object corresponds to a portion of the first data that is missing for multiple iterations due to an impairment, the path plan is a first path plan, and the vehicle control instructions are to cause the processor circuitry to:

identify the second node in the environment from which to request the third data;

determine whether a trajectory and an intent for the missing object, based on a number of iterations of the first perspective for which some of the first data is missing, intersects with the first path plan;

in response to obtaining a response to the request for the third data within a threshold amount of time, determine whether the third data includes a state estimate or sensor data generated by the second node;

in response to the third data including the sensor data:
transform the third data to the first perspective of the first vehicle; and
generate an updated first perspective by fusing the first data generated by the first vehicle with the third data;

track the missing object included in the updated first perspective throughout iterations of the updated first perspective;

determine the trajectory and the intent of the missing object based on the updated first perspective; and in response to the trajectory and the intent of the missing object, based on the updated first perspective, intersecting the first path plan, recompute a second path plan such that the second path plan does not intersect with the trajectory and the intent of the missing object based on the updated first perspective.

7. A non-transitory computer readable storage medium comprising instructions that, when executed, cause a machine to at least:

filter first data generated by a first vehicle for second data associated with a profile template, the profile template is a data structure including one or more predefined data objects configured to be populated based on at least some of the first data;

insert the second data into the one or more predefined data objects to generate a first profile, the first profile to characterize an environment;

compress the first profile;

determine a difference between the first profile and a second profile obtained from a first node in the environment;

in response to a first trigger event corresponding to the first profile, update the first profile based on the difference;

in response to a second trigger event corresponding to a missing object in a first perspective of the environment, prepare a request to be sent to a second node in the environment that can provide third data associated with the missing object;

in response to a determination that there is a first pseudonym corresponding to the second node and a second pseudonym corresponding to the missing object, assign to the request (1) a number of nodes to which to transmit the request, (2) the first pseudonym and the second pseudonym; and (3) a priority level;

update the first perspective based on one or more of the third data from the second node or the updated first profile, the first perspective corresponding to a fusion of the first data;

update a path plan to transport the first vehicle from a first location to a second location based on the updated first perspective; and execute the updated path plan.

8. The non-transitory computer readable storage medium of claim 7, wherein at least one of the first node or the second node includes at least one of a second vehicle, an additional vehicle, or a control center, the second node to collect the third data from the environment.

9. A method to analyze vehicle perspective, the method comprising:

filtering first data generated by a first vehicle for second data associated with a profile template, the profile template is a data structure including one or more predefined data objects configured to be populated based on at least some of the first data;

inserting the second data into the one or more predefined data objects to generate a first profile, the first profile to characterize an environment;

compressing the first profile;

determining a difference between the first profile and a second profile obtained from a first node in the environment;

in response to a first trigger event corresponding to the first profile, updating the first profile based on the difference;

in response to a second trigger event corresponding to a missing object in a first perspective of the environment, preparing a request to be sent to a second node in the environment that can provide third data associated with the missing object;

in response to a determination that there is a first pseudonym corresponding to the second node and a second pseudonym corresponding to the missing object, assigning to the request (1) a number of nodes to which to transmit the request, (2) the first pseudonym and the second pseudonym; and (3) a priority level;

updating the first perspective based on one or more of the third data from the second node or the updated first profile, the first perspective corresponding to a fusion of the first data;

updating a path plan to transport the first vehicle from a first location to a second location based on the updated first perspective; and executing the updated path plan.

10. The method of claim 9, wherein at least one of the first node or the second node includes at least one of a second vehicle, an additional vehicle, or a control center, the second node to collect the third data from the environment.

11. The non-transitory computer readable storage medium of claim 7, wherein the determination is a first determination, and the second trigger event corresponds to a second determination that a portion of the first data is missing from multiple iterations due to an impairment, the impairment including a condition of the environment that affects an ability of the first vehicle to accurately generate the first data.

12. The non-transitory computer readable storage medium of claim 7, wherein the instructions, when executed, cause the machine to:

in response to a first determination that the first profile meets a first threshold of profile similarity and a second threshold of profile similarity, cause transmission of an acknowledgement to the first node and the second node; and in response to at least one of (A) a second determination that the first profile meets the first threshold of profile similarity and a third threshold of profile similarity or (B) a third determination that the first profile does not meet the first threshold of profile similarity, cause transmission of a part of the first profile to the first node and the second node.

13. The non-transitory computer readable storage medium of claim 12, wherein the part of the first profile includes at least one of a portion of the first profile less than a full value of the first profile or the full value of the first profile.

14. The non-transitory computer readable storage medium of claim 7, wherein the missing object corresponds to a portion of the first data is missing for multiple iterations due to an impairment, the path plan is a first path plan, and the instructions, when executed, cause the machine to:

identify the second node in the environment from which to request the third data;

determine whether a trajectory and an intent for the missing object, based on a number of iterations of the first perspective for which some of the first data is missing, intersects with the first path plan;

in response to obtaining a response to the request for the third data within a threshold amount of time, determine whether the third data includes a state estimate or sensor data generated by the second node;

in response to the third data including the sensor data: transform the third data to the first perspective of the first vehicle; and generate an updated first perspective by fusing the first data generated by the first vehicle with the third data;

track the missing object included in the updated first perspective throughout iterations of the updated first perspective;

determine the trajectory and the intent of the missing object based on the updated first perspective; and in response to the trajectory and the intent of the missing object, based on the updated first perspective, intersecting the first path plan, recompute a second path plan such that the second path plan does not intersect with the trajectory and the intent of the missing object based on the updated first perspective.

15. The method of claim 9, wherein the determination is a first determination, and the second trigger event corresponds to a second determination that a portion of the first data is missing from multiple iterations due to an impairment, the impairment including a condition of the environment that affects an ability of the first vehicle to accurately generate the first data.

16. The method of claim 9, wherein further including:

in response to a first determination that the first profile meets a first threshold of profile similarity and a second threshold of profile similarity, transmitting an acknowledgement to the first node and the second node; and in response to at least one of (A) a second determination that the first profile meets the first threshold of profile similarity and a third threshold of profile similarity or (B) a third determination that the first profile does not meet the first threshold of profile similarity, transmitting a part of the first profile to the first node and the second node.

17. The method of claim 16, wherein the part of the first profile includes at least one of a portion of the first profile less than a full value of the first profile or the full value of the first profile.

18. The method of claim 9, wherein the missing object corresponds to a portion of the first data that is missing for multiple iterations due to an impairment, the path plan is a first path plan, and the method further includes:

identifying the second node in the environment from which to request the third data;

determining whether a trajectory and an intent for the missing object, based on a number of iterations of the first perspective for which some of the first data is missing, intersects with the first path plan;

in response to obtaining a response to the request for the third data within a threshold amount of time, determining whether the third data includes a state estimate or sensor data generated by the second node;

in response to the third data including the sensor data: transforming the third data to the first perspective of the first vehicle; and generating an updated first perspective by fusing the first data generated by the first vehicle with the third data;

tracking the missing object included in the updated first perspective throughout iterations of the updated first perspective;

determining the trajectory and the intent of the missing object based on the updated first perspective; and in response to the trajectory and the intent of the missing object, based on the updated first perspective, intersecting the first path plan, recomputing a second path plan such that the second path plan does not intersect with the trajectory and the intent of the missing object based on the updated first perspective.

19. An apparatus to analyze a first perspective generated by a first vehicle, the apparatus comprising:
  at least one memory;
  instructions in the apparatus; and
  processor circuitry to execute the instructions to:
    filter first data for second data associated a profile template, the first data generated by the first vehicle, the profile template being a data structure including at least one predefined data objects to be populated based on at least some of the first data;
    populate the at least one predefined data objects with the second data to generate a first profile, the first profile to characterize an environment;
    compress the first profile;
    in response to a first trigger event corresponding to the first profile, update the first profile based on a difference between the first profile and a second profile, the second profile obtained from a first node in the environment;
    in response to a second trigger event corresponding to a missing object in the first perspective of the environment, prepare a request to be sent to a second node in the environment, the second node capable of providing third data associated with the missing object;
    in response to a determination that there is a first pseudonym corresponding to the second node and a second pseudonym corresponding to the missing object, assign to the request (1) a number of nodes to which to transmit the request, (2) the first pseudonym and the second pseudonym; and (3) a priority level;
    update the first perspective based on one or more of the third data from the second node or the updated first profile, the first perspective corresponding to a fusion of the first data generated by the first vehicle;
    update a path plan to transport the first vehicle from a first location to a second location based on the updated first perspective; and
    execute the updated path plan.

20. The apparatus of claim 19, wherein at least one of the first node or the second node includes at least one of a second vehicle, an additional vehicle, or a control center, the second node to collect the third data based on the environment.

21. The apparatus of claim 19, wherein the determination is a first determination, and the second trigger event is indicative of a second determination that some of the first data is missing from more than one iteration due to an impairment, the impairment associated with a condition of the environment that impacts an ability of the first vehicle to accurately generate the first data.

22. The apparatus of claim 19, wherein the processor circuitry is to:
  in response to a first determination that the first profile meets a first threshold of similarity to the second profile and a second threshold of similarity to the second profile, cause transmission of an acknowledgement to the first node and the second node; and
  in response to at least one of (A) a second determination that the first profile meets the first threshold of similarity to the second profile and a third threshold of similarity to the second profile or (B) a third determination that the first profile does not meet the first threshold of similarity to the second profile, cause transmission of a part of the first profile to the first node and the second node.

23. The apparatus of claim 22, wherein the part of the first profile includes at least one of a portion of the first profile less than a full value of the first profile or the full value of the first profile.

24. The apparatus of claim 19, wherein the missing object corresponds to some of the first data is missing for more than one iteration due to an impairment, the path plan is a first path plan, and the processor circuitry is to:
  identify the second node in the environment from which to request the third data;
  determine whether a trajectory and an intent for the missing object intersects with the first path plan, the trajectory and the intent for the missing object based on a number of iterations of the first perspective for which some of the first data is missing;
  in response to obtaining a response to the request within a threshold amount of time, determine whether the third data includes a state estimate or sensor data generated by the second node;
  in response to the third data including the sensor data:
    transform the third data to the first perspective; and
    generate an updated first perspective by fusing the first data with the third data;
  track the missing object throughout iterations of the updated first perspective;
  determine the trajectory and the intent of the missing object based on the updated first perspective; and
  in response to the trajectory and the intent of the missing object intersecting the first path plan, recompute a second path plan that does not intersect with the trajectory and the intent of the missing object, the trajectory and the intent of the missing object based on the updated first perspective.

* * * * *